US012579523B2

(12) United States Patent
Manoharan et al.

(10) Patent No.: US 12,579,523 B2
(45) Date of Patent: Mar. 17, 2026

(54) SYSTEM, METHOD, AND COMPUTER PROGRAM PRODUCT FOR AN ACCOUNT-TO-ACCOUNT TRANSACTION NETWORK

(71) Applicant: Visa International Service Association, San Francisco, CA (US)

(72) Inventors: Hemanth Kumar Manoharan, Bengaluru (IN); Ashish Kulpati, Singapore (SG); Swapnil Vasant Mhasde, Singapore (SG); Ankur Kumar Singh, Singapore (SG); David Alan Brown, Singapore (SG)

(73) Assignee: Visa International Service Association, San Francisco, CA (US)

( * ) Notice: Subject to any disclaimer, the term of this patent is extended or adjusted under 35 U.S.C. 154(b) by 68 days.

(21) Appl. No.: 18/563,487

(22) PCT Filed: May 19, 2022

(86) PCT No.: PCT/US2022/030046
§ 371 (c)(1),
(2) Date: Nov. 22, 2023

(87) PCT Pub. No.: WO2022/251035
PCT Pub. Date: Dec. 1, 2022

(65) Prior Publication Data
US 2024/0249254 A1      Jul. 25, 2024

(30) Foreign Application Priority Data
May 26, 2021      (IN) ............................ 202141023448

(51) Int. Cl.
G06Q 20/02      (2012.01)
G06Q 20/32      (2012.01)
G06Q 20/38      (2012.01)

(52) U.S. Cl.
CPC ....... *G06Q 20/027* (2013.01); *G06Q 20/3223* (2013.01); *G06Q 20/386* (2020.05)

(58) Field of Classification Search
CPC ............ G06Q 20/027; G06Q 20/3223; G06Q 20/108; G06Q 20/326
See application file for complete search history.

(56) References Cited

U.S. PATENT DOCUMENTS 8,577,803 B2 * 11/2013 Chatterjee ............ G06Q 20/326
                                                                    705/41
9,105,027 B2 * 8/2015 Hammad ............... G06Q 20/12
                    (Continued)

FOREIGN PATENT DOCUMENTS

GB          2466810 A * 7/2010 ............. G06F 21/31
WO    WO-2015051074 A1 * 4/2015 ......... G06Q 20/3674

OTHER PUBLICATIONS

"NIST Privacy Framework: A Tool For Improving Privacy Through Enterprise Risk Management"; Jan. 16, 2020, 43 pages. Available at: https://www.nist.gov/system/files/documents/2020/01/16/NIST%20Privacy%20Framework_V1.0.pdf. (Year: 2020).*
                    (Continued)

*Primary Examiner* — Gregory Harper
(74) *Attorney, Agent, or Firm* — The Webb Law Firm

(57)                    ABSTRACT

Provided are a system, method, and computer program product for an account-to-account transaction network. The method includes receiving, via a first application programming interface (API), a transaction request for a transaction including a transaction amount, an issuer identifier, and a merchant identifier. The method includes determining an issuer uniform resource locator (URL) based on the issuer identifier, generating an intent identifier associated with the transaction request, and transmitting the issuer URL and the intent identifier via the first API. The method includes transmitting the intent identifier, the transaction amount, and
                    (Continued)

300a the merchant identifier to an issuer system associated with the issuer identifier via a second API. The method includes, in response to receiving an authenticated consent identifier from the issuer system, determining a merchant account identifier and an issuer account identifier, and transmitting a combined authorization and settlement message to cause settlement for the transaction amount.

20 Claims, 31 Drawing Sheets

(56) References Cited

U.S. PATENT DOCUMENTS

| | | | | |
|---|---|---|---|---|
| 9,773,212 | B2 * | 9/2017 | Hammad | G06Q 10/00 |
| 10,269,018 | B2 | 4/2019 | Kumnick et al. | |
| 10,692,085 | B2 | 6/2020 | Zagarese et al. | |
| 10,902,418 | B2 * | 1/2021 | Kaja | H04L 63/083 |
| 11,132,655 | B2 * | 9/2021 | Swaminathan | G06Q 20/102 |
| 11,663,591 | B2 * | 5/2023 | Singh | G06Q 20/42 |
| | | | | 705/44 |
| 2007/0214080 | A1 * | 9/2007 | Babi | G06Q 20/108 |
| | | | | 705/42 |
| 2008/0162318 | A1 * | 7/2008 | Butler | G06Q 40/00 |
| | | | | 705/65 |
| 2010/0030688 | A1 * | 2/2010 | Patterson | G06Q 20/385 |
| | | | | 705/44 |
| 2011/0035302 | A1 | 2/2011 | Martell et al. | |
| 2012/0011065 | A1 | 1/2012 | Winfield-Chislett et al. | |
| 2012/0221468 | A1 * | 8/2012 | Kumnick | G06Q 20/306 |
| | | | | 705/44 |
| 2013/0268333 | A1 * | 10/2013 | Ovick | G06Q 30/0226 |
| | | | | 705/14.17 |
| 2013/0304648 | A1 | 11/2013 | O'Connell et al. | |
| 2013/0311379 | A1 | 11/2013 | Smith | |
| 2014/0101036 | A1 | 4/2014 | Phillips et al. | |
| 2014/0249999 | A1 * | 9/2014 | Johnson | G06Q 20/20 |
| | | | | 705/39 |
| 2014/0358789 | A1 * | 12/2014 | Boding | G06Q 20/405 |
| | | | | 705/44 |
| 2014/0379578 | A1 * | 12/2014 | Chan | G06Q 20/02 |
| | | | | 705/44 |
| 2015/0095225 | A1 * | 4/2015 | Appana | G06Q 20/227 |
| | | | | 705/41 |
| 2015/0178708 | A1 * | 6/2015 | Reutov | G06Q 20/10 |
| | | | | 705/44 |
| 2015/0199689 | A1 * | 7/2015 | Kumnick | G06Q 20/3674 |
| | | | | 705/67 |
| 2016/0063481 | A1 * | 3/2016 | Gupta | G06Q 20/3223 |
| | | | | 705/72 |
| 2016/0379217 | A1 * | 12/2016 | Hammad | G06Q 20/425 |
| | | | | 705/75 |
| 2018/0240115 | A1 | 8/2018 | Wong et al. | |
| 2018/0324184 | A1 * | 11/2018 | Kaja | H04L 63/10 |
| 2018/0341948 | A1 * | 11/2018 | Kumnick | G06Q 20/4016 |
| 2019/0034924 | A1 | 1/2019 | Prabhu et al. | |
| 2019/0197522 | A1 * | 6/2019 | Jangid | G06Q 20/3674 |
| 2019/0259018 | A1 * | 8/2019 | Jain | G06Q 20/10 |
| 2019/0394192 | A1 * | 12/2019 | Kale | G06Q 20/102 |
| 2020/0004986 | A1 * | 1/2020 | Brannon | G06F 3/0482 |
| 2020/0380503 | A1 * | 12/2020 | Prokop | G06Q 20/12 |
| 2020/0394656 | A9 * | 12/2020 | Seshadri | G06Q 20/425 |
| 2021/0019716 | A1 * | 1/2021 | Prokop | G06Q 20/3829 |
| 2022/0012738 | A1 * | 1/2022 | Lakka | G06Q 20/108 |
| 2022/0101302 | A1 * | 3/2022 | Hope | G16Y 20/40 |
| 2022/0215392 | A1 * | 7/2022 | Wied | G06F 9/547 |
| 2022/0300917 | A1 * | 9/2022 | Wied | G06Q 20/085 |

OTHER PUBLICATIONS

"Enabling the UK Open Banking Specification—A ForgeRock Technical Solution Guide", Open Banking Technical Solution Guide, 2021, accessed at <https://www.forgerock.com/industries/financial-services/open-banking/UK-Spec#nb-3req-consent'>.

* cited by examiner

300a

300d

<u>300f</u>

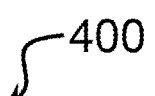
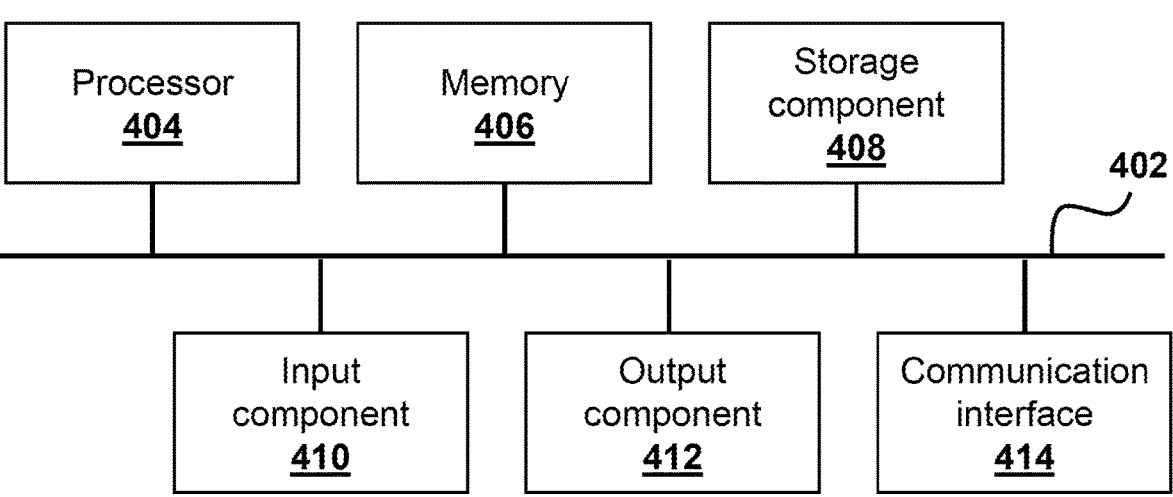
FIG. 8

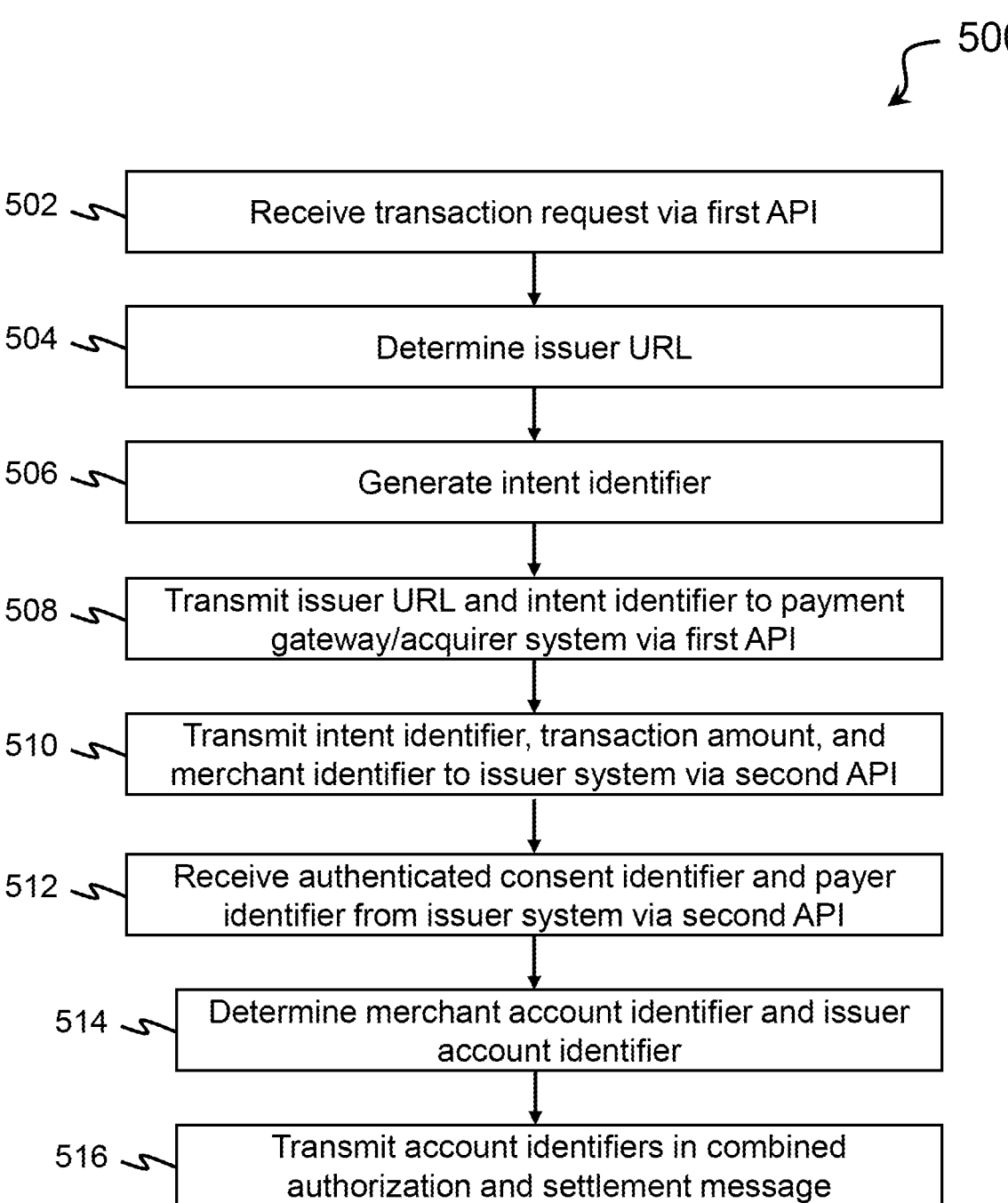

500

502 — Receive transaction request via first API

504 — Determine issuer URL

506 — Generate intent identifier

508 — Transmit issuer URL and intent identifier to payment gateway/acquirer system via first API 510 — Transmit intent identifier, transaction amount, and merchant identifier to issuer system via second API 512 — Receive authenticated consent identifier and payer identifier from issuer system via second API 514 — Determine merchant account identifier and issuer account identifier 516 — Transmit account identifiers in combined authorization and settlement message

FIG. 9

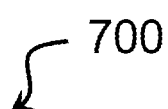
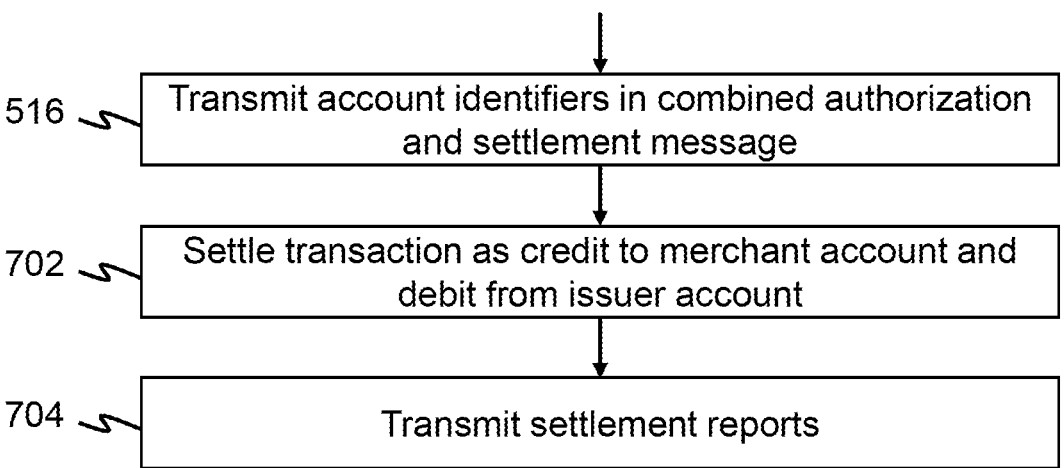
516 — Transmit account identifiers in combined authorization and settlement message
702 — Settle transaction as credit to merchant account and debit from issuer account
704 — Transmit settlement reports
FIG. 11

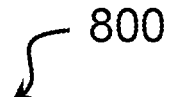
| Unique Account Identifier 802 | 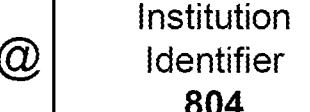 @ | Institution Identifier 804 | . | Regional Identifier 806 |
|---|---|---|---|---|
FIG. 12

SYSTEM, METHOD, AND COMPUTER PROGRAM PRODUCT FOR AN ACCOUNT-TO-ACCOUNT TRANSACTION NETWORK

CROSS-REFERENCE TO RELATED APPLICATIONS

This application is the United States national phase of International Application No. US2230046 filed May 19, 2022, and claims priority to Indian Provisional Patent Application No. 202141023448, filed May 26, 2021, titled "System, Method, and Computer Program Product for an Account-to-Account Transaction Network", the disclosures of which are hereby incorporated by reference in their entirety.

BACKGROUND

1. Technical Field

This disclosure relates generally to electronic payment processing networks and, in some non-limiting embodiments or aspects, to a system, method, and computer program product for an account-to-account (A2A) transaction network.

2. Technical Considerations

A2A transacting may include electronic account transfers between a transaction account (e.g., a bank account) of a payer and a transaction account of a payee. This may be contrasted with card-present (CP) or card-not-present (CNP) transactions where a payment device (e.g., a credit card) or payment device data (e.g., a credit card number) is used instead of providing information about the payer's transaction account or issuer to the payee. A2A transactions may include electronic account transfers for person-to-person (P2P) transactions, person-to-merchant (P2M) transactions, merchant-to-person (M2P) transactions, and merchant-to-merchant (M2M) transactions.

Payers require an improved A2A network to eliminate the need for maintaining one or more physical payment devices or for storing payment device data. Issuers and acquirers (e.g., financial institutions) seek an improved A2A network to eliminate the need for system integration with multiple A2A providers over multiple communication channels. Merchants require an improved A2A network to increase the number of electronic transaction channels for in-person or remote transactions. All entities in the electronic payment processing network require a secure A2A network to reduce fraudulent transactions and disputed transactions, which create not only economic loss but also computer resource loss (e.g., wasted processing bandwidth, number of communications, etc.) to be remedied.

There is a need in the art for an A2A transaction network that securely and efficiently addresses the foregoing technical requirements.

SUMMARY

Accordingly, provided are improved systems, methods, and computer program products for an A2A transaction network.

According to some non-limiting embodiments or aspects, provided is a computer-implemented method for an A2A transaction network. The method may include receiving, with at least one processor, from a payment gateway or an acquirer system via a first application programming interface (API), a transaction request for a transaction. The transaction request may include a transaction amount, an issuer identifier, and a merchant identifier. The method may also include determining, with the at least one processor, an issuer uniform resource locator (URL) based on the issuer identifier. The method may further include generating, with the at least one processor, an intent identifier associated with the transaction request. The method may further include transmitting, with the at least one processor, the issuer URL and the intent identifier to the payment gateway or the acquirer system via the first API. The method may further include transmitting, with the at least one processor, the intent identifier, the transaction amount, and the merchant identifier to an issuer system associated with the issuer identifier via a second API. The method may further include receiving, with the at least one processor, from the issuer system via the second API, an authenticated consent identifier and a payer identifier. The method may further include, in response to receiving the authenticated consent identifier from the issuer system, determining, with the at least one processor, a merchant account identifier associated with the merchant identifier and an issuer account identifier associated with the payer identifier. The method may further include, in response to receiving the authenticated consent identifier from the issuer system, transmitting, with the at least one processor, the transaction amount, the merchant account identifier, and the issuer account identifier in a combined authorization and settlement message configured to cause settlement for the transaction amount between a merchant account associated with the merchant account identifier and an issuer account associated with the issuer account identifier.

In some non-limiting embodiments or aspects, the transaction request received from the payment gateway or the acquirer system via the first API may be originated by a merchant interface of a client device of a user associated with the issuer account. The authenticated consent identifier received from the issuer system via the second API may be originated by a payment interface of the client device. The issuer URL transmitted to the payment gateway or the acquirer system may be forwarded to the merchant interface to trigger the payment interface.

In some non-limiting embodiments or aspects, the method may include receiving, with the at least one processor, an approval message associated with approval of the combined authorization and settlement message. The method may further include transmitting, with the at least one processor, a first success message to the payment gateway or the acquirer system via the first API. The first success message may be configured to cause the merchant interface of the client device to display a confirmation of completion of the transaction. The method may further include transmitting, with the at least one processor, a second success message to the issuer system via the second API. The second success message may be configured to cause the payment interface of the client device to display confirmation of completion of the transaction.

In some non-limiting embodiments or aspects, the payer identifier may include a unique account identifier, an institution identifier associated with the issuer system, and a regional identifier. The payer identifier may be a globally unique identifier associated with the issuer account. The unique account identifier may be a device address of the client device.

In some non-limiting embodiments or aspects, the transaction request may be received from the payment gateway via the first API. The issuer URL and the intent identifier may be transmitted to the payment gateway via the first API. The payment gateway may be configured to communicate on behalf of the acquirer system for completion of the transaction.

In some non-limiting embodiments or aspects, the method may include settling, with the at least one processor, the transaction as a credit to the merchant account for the transaction amount and a debit from the issuer account for the transaction amount, by communicating with the issuer system and the payment gateway, or with the issuer system and the acquirer system. The method may further include transmitting, with the at least one processor, a first settlement report associated with the transaction to the payment gateway or the acquirer system, and a second settlement report associated with the transaction to the issuer system.

According to some non-limiting embodiments or aspects, provided is a system for an A2A transaction network. The system may include a server including at least one processor. The server may be programmed or configured to receive, from a payment gateway or an acquirer system via a first API, a transaction request for a transaction. The transaction request may include a transaction amount, an issuer identifier, and a merchant identifier. The server may be further programmed or configured to determine an issuer URL based on the issuer identifier. The server may be further programmed or configured to generate an intent identifier associated with the transaction request. The server may be further programmed or configured to transmit the issuer URL and the intent identifier to the payment gateway or the acquirer system via the first API. The server may be further programmed or configured to transmit the intent identifier, the transaction amount, and the merchant identifier to an issuer system associated with the issuer identifier via a second API. The server may be further programmed or configured to receive, from the issuer system via the second API, an authenticated consent identifier and a payer identifier. The server may be further programmed or configured to, in response to receiving the authenticated consent identifier from the issuer system, determine a merchant account identifier associated with the merchant identifier and an issuer account identifier associated with the payer identifier. The server may be further programmed or configured to, in response to receiving the authenticated consent identifier from the issuer system, transmit the transaction amount, the merchant account identifier, and the issuer account identifier in a combined authorization and settlement message configured to cause settlement for the transaction amount between a merchant account associated with the merchant account identifier and an issuer account associated with the issuer account identifier.

In some non-limiting embodiments or aspects, the transaction request received from the payment gateway or the acquirer system via the first API may be originated by a merchant interface of a client device of a user associated with the issuer account. The authenticated consent identifier received from the issuer system via the second API may be originated by a payment interface of the client device. The issuer URL transmitted to the payment gateway or the acquirer system may be forwarded to the merchant interface to trigger the payment interface.

In some non-limiting embodiments or aspects, the server may be further programmed or configured to receive an approval message associated with approval of the combined authorization and settlement message. The server may be further programmed or configured to transmit a first success message to the payment gateway or the acquirer system via the first API, the first success message being configured to cause the merchant interface of the client device to display a confirmation of completion of the transaction. The server may be further programmed or configured to transmit a second success message to the issuer system via the second API, the second success message being configured to cause the payment interface of the client device to display confirmation of completion of the transaction.

In some non-limiting embodiments or aspects, the payer identifier may include a unique account identifier, an institution identifier associated with the issuer system, and a regional identifier. The payer identifier may be a globally unique identifier associated with the issuer account. The unique account identifier may be a device address of the client device.

In some non-limiting embodiments or aspects, the transaction request may be received from the payment gateway via the first API. The issuer URL and the intent identifier may be transmitted to the payment gateway via the first API. The payment gateway may be configured to communicate on behalf of the acquirer system for completion of the transaction.

In some non-limiting embodiments or aspects, the server may be further programmed or configured to settle the transaction as a credit to the merchant account for the transaction amount and a debit from the issuer account for the transaction amount, by communicating with the issuer system and the payment gateway, or with the issuer system and the acquirer system. The server may be further programmed or configured to transmit a first settlement report associated with the transaction to the payment gateway or the acquirer system, and a second settlement report associated with the transaction to the issuer system.

According to some non-limiting embodiments or aspects, provided is a computer program product for an A2A transaction network. The computer program product may include at least one non-transitory computer-readable medium including program instructions that, when executed by at least one processor, cause the at least one processor to receive, from a payment gateway or an acquirer system via a first API, a transaction request for a transaction. The transaction request may include a transaction amount, an issuer identifier, and merchant identifier. The program instructions may further cause the at least one processor to determine an issuer uniform resource locator URL based on the issuer identifier. The program instructions may further cause the at least one processor to generate an intent identifier associated with the transaction request. The program instructions may further cause the at least one processor to transmit the issuer URL and the intent identifier to the payment gateway or the acquirer system via the first API. The program instructions may further cause the at least one processor to transmit the intent identifier, the transaction amount, and the merchant identifier to an issuer system associated with the issuer identifier via a second API. The program instructions may further cause the at least one processor to receive, from the issuer system via the second API, an authenticated consent identifier and a payer identifier. The program instructions may further cause the at least one processor to, in response to receiving the authenticated consent identifier from the issuer system, determine a merchant account identifier associated with the merchant identifier and an issuer account identifier associated with the payer identifier. The program instructions may further cause the at least one processor to, in response to receiving the authenticated consent identifier from the issuer system, transmit the transaction amount, the merchant account identifier, and the issuer account identifier in a combined authorization and settlement message configured to cause settlement for the transaction amount between a merchant account associated with the merchant account identifier and an issuer account associated with the issuer account identifier.

In some non-limiting embodiments or aspects, the transaction request received from the payment gateway or the acquirer system via the first API may be originated by a merchant interface of a client device of a user associated with the issuer account. The authenticated consent identifier received from the issuer system via the second API may be originated by a payment interface of the client device. The issuer URL transmitted to the payment gateway or the acquirer system may be forwarded to the merchant interface to trigger the payment interface.

In some non-limiting embodiments or aspects, the program instructions may further cause the at least one processor to receive an approval message associated with approval of the combined authorization and settlement message. The program instructions may further cause the at least one processor to transmit a first success message to the payment gateway or the acquirer system via the first API, the first success message being configured to cause the merchant interface of the client device to display a confirmation of completion of the transaction. The program instructions may further cause the at least one processor to transmit a second success message to the issuer system via the second API, the second success message being configured to cause the payment interface of the client device to display confirmation of completion of the transaction.

In some non-limiting embodiments or aspects, the payer identifier may include a unique account identifier, an institution identifier associated with the issuer system, and a regional identifier. The payer identifier may be a globally unique identifier associated with the issuer account. The unique account identifier may be a device address of the client device.

In some non-limiting embodiments or aspects, the transaction request may be received from the payment gateway via the first API. The issuer URL and the intent identifier may be transmitted to the payment gateway via the first API. The payment gateway may be configured to communicate on behalf of the acquirer system for completion of the transaction.

In some non-limiting embodiments or aspects, the program instructions may further cause the at least one processor to settle the transaction as a credit to the merchant account for the transaction amount and a debit from the issuer account for the transaction amount, by communicating with the issuer system and the payment gateway, or with the issuer system and the acquirer system. The program instructions may further cause the at least one processor to transmit a first settlement report associated with the transaction to the payment gateway or the acquirer system, and a second settlement report associated with the transaction to the issuer system.

Further non-limiting embodiments or aspects are set forth in the following numbered clauses:

Clause 1: A computer-implemented method comprising: receiving, with at least one processor, from a payment gateway or an acquirer system via a first application programming interface (API), a transaction request for a transaction, the transaction request comprising a transaction amount, an issuer identifier, and a merchant identifier; determining, with the at least one processor, an issuer uniform resource locator (URL) based on the issuer identifier; generating, with the at least one processor, an intent identifier associated with the transaction request; transmitting, with the at least one processor, the issuer URL and the intent identifier to the payment gateway or the acquirer system via the first API; transmitting, with the at least one processor, the intent identifier, the transaction amount, and the merchant identifier to an issuer system associated with the issuer identifier via a second API; receiving, with the at least one processor, from the issuer system via the second API, an authenticated consent identifier and a payer identifier; and, in response to receiving the authenticated consent identifier from the issuer system: determining, with the at least one processor, a merchant account identifier associated with the merchant identifier and an issuer account identifier associated with the payer identifier; and transmitting, with the at least one processor, the transaction amount, the merchant account identifier, and the issuer account identifier in a combined authorization and settlement message configured to cause settlement for the transaction amount between a merchant account associated with the merchant account identifier and an issuer account associated with the issuer account identifier.

Clause 2: The computer-implemented method of clause 1, wherein the transaction request received from the payment gateway or the acquirer system via the first API is originated by a merchant interface of a client device of a user associated with the issuer account, the authenticated consent identifier received from the issuer system via the second API is originated by a payment interface of the client device, and the issuer URL transmitted to the payment gateway or the acquirer system is forwarded to the merchant interface to trigger the payment interface.

Clause 3: The computer-implemented method of clause 1 or clause 2, further comprising: receiving, with the at least one processor, an approval message associated with approval of the combined authorization and settlement message; transmitting, with the at least one processor, a first success message to the payment gateway or the acquirer system via the first API, the first success message configured to cause the merchant interface of the client device to display a confirmation of completion of the transaction; and transmitting, with the at least one processor, a second success message to the issuer system via the second API, the second success message configured to cause the payment interface of the client device to display confirmation of completion of the transaction.

Clause 4: The computer-implemented method of any of clauses 1-3, wherein the payer identifier comprises a unique account identifier, an institution identifier associated with the issuer system, and a regional identifier, the payer identifier further being a globally unique identifier associated with the issuer account.

Clause 5: The computer-implemented method of any of clauses 1-4, wherein the unique account identifier is a device address of the client device.

Clause 6: The computer-implemented method of any of clauses 1-5, wherein the transaction request is received from the payment gateway via the first API, the issuer URL and the intent identifier are transmitted to the payment gateway via the first API, and the payment gateway is configured to communicate on behalf of the acquirer system for completion of the transaction.

Clause 7: The computer-implemented method of any of clauses 1-6, further comprising: settling, with the at least one processor, the transaction as a credit to the merchant account for the transaction amount and a debit from the issuer account for the transaction amount, by communicating with the issuer system and the payment gateway, or with the issuer system and the acquirer system; and transmitting, with the at least one processor, a first settlement report associated with the transaction to the payment gateway or the acquirer system, and a second settlement report associated with the transaction to the issuer system.

Clause 8: A system comprising a server comprising at least one processor, the server being programmed or configured to: receive, from a payment gateway or an acquirer system via a first application programming interface (API), a transaction request for a transaction, the transaction request comprising a transaction amount, an issuer identifier, and a merchant identifier; determine an issuer uniform resource locator (URL) based on the issuer identifier; generate an intent identifier associated with the transaction request; transmit the issuer URL and the intent identifier to the payment gateway or the acquirer system via the first API; transmit the intent identifier, the transaction amount, and the merchant identifier to an issuer system associated with the issuer identifier via a second API; receive from the issuer system via the second API, an authenticated consent identifier and a payer identifier; and, in response to receiving the authenticated consent identifier from the issuer system: determine a merchant account identifier associated with the merchant identifier and an issuer account identifier associated with the payer identifier; and transmit the transaction amount, the merchant account identifier, and the issuer account identifier in a combined authorization and settlement message configured to cause settlement for the transaction amount between a merchant account associated with the merchant account identifier and an issuer account associated with the issuer account identifier.

Clause 9: The system of clause 8, wherein the transaction request received from the payment gateway or the acquirer system via the first API is originated by a merchant interface of a client device of a user associated with the issuer account, the authenticated consent identifier received from the issuer system via the second API is originated by a payment interface of the client device, and the issuer URL transmitted to the payment gateway or the acquirer system is forwarded to the merchant interface to trigger the payment interface.

Clause 10: The system of clause 8 or clause 9, wherein the server is further programmed or configured to: receive an approval message associated with approval of the combined authorization and settlement message; transmit a first success message to the payment gateway or the acquirer system via the first API, the first success message configured to cause the merchant interface of the client device to display a confirmation of completion of the transaction; and transmit a second success message to the issuer system via the second API, the second success message configured to cause the payment interface of the client device to display confirmation of completion of the transaction.

Clause 11: The system of any of clauses 8-10, wherein the payer identifier comprises a unique account identifier, an institution identifier associated with the issuer system, and a regional identifier, the payer identifier further being a globally unique identifier associated with the issuer account.

Clause 12: The system of any of clauses 8-11, wherein the unique account identifier is a device address of the client device.

Clause 13: The system of any of clauses 8-12, wherein the transaction request is received from the payment gateway via the first API, the issuer URL and the intent identifier are transmitted to the payment gateway via the first API, and the payment gateway is configured to communicate on behalf of the acquirer system for completion of the transaction.

Clause 14: The system of any of clauses 8-13, wherein the server is further programmed or configured to: settle the transaction as a credit to the merchant account for the transaction amount and a debit from the issuer account for the transaction amount, by communicating with the issuer system and the payment gateway, or with the issuer system and the acquirer system; and transmit a first settlement report associated with the transaction to the payment gateway or the acquirer system, and a second settlement report associated with the transaction to the issuer system.

Clause 15: A computer program product comprising at least one non-transitory computer-readable medium including program instructions that, when executed by at least one processor, cause the at least one processor to: receive, from a payment gateway or an acquirer system via a first application programming interface (API), a transaction request for a transaction, the transaction request comprising a transaction amount, an issuer identifier, and merchant identifier; determine an issuer uniform resource locator (URL) based on the issuer identifier; generate an intent identifier associated with the transaction request; transmit the issuer URL and the intent identifier to the payment gateway or the acquirer system via the first API; transmit the intent identifier, the transaction amount, and the merchant identifier to an issuer system associated with the issuer identifier via a second API; receive from the issuer system via the second API, an authenticated consent identifier and a payer identifier; and, in response to receiving the authenticated consent identifier from the issuer system: determine a merchant account identifier associated with the merchant identifier and an issuer account identifier associated with the payer identifier; and transmit the transaction amount, the merchant account identifier, and the issuer account identifier in a combined authorization and settlement message configured to cause settlement for the transaction amount between a merchant account associated with the merchant account identifier and an issuer account associated with the issuer account identifier.

Clause 16: The computer program product of clause 15, wherein the transaction request received from the payment gateway or the acquirer system via the first API is originated by a merchant interface of a client device of a user associated with the issuer account, the authenticated consent identifier received from the issuer system via the second API is originated by a payment interface of the client device, and the issuer URL transmitted to the payment gateway or the acquirer system is forwarded to the merchant interface to trigger the payment interface.

Clause 17: The computer program product of clause 15 or clause 16, wherein the program instructions further cause the at least one processor to: receive an approval message associated with approval of the combined authorization and settlement message; transmit a first success message to the payment gateway or the acquirer system via the first API, the first success message configured to cause the merchant interface of the client device to display a confirmation of completion of the transaction; and transmit a second success message to the issuer system via the second API, the second success message configured to cause the payment interface of the client device to display confirmation of completion of the transaction.

Clause 18: The computer program product of any of clauses 15-17, wherein the payer identifier comprises a unique account identifier, an institution identifier associated with the issuer system, and a regional identifier, the payer identifier further being a globally unique identifier associated with the issuer account, and wherein the unique account identifier is a device address of the client device.

Clause 19: The computer program product of any of clauses 15-18, wherein the transaction request is received from the payment gateway via the first API, the issuer URL and the intent identifier are transmitted to the payment gateway via the first API, and the payment gateway is configured to communicate on behalf of the acquirer system for completion of the transaction.

Clause 20: The computer program product of any of clauses 15-19, wherein the program instructions further cause the at least one processor to: settle the transaction as a credit to the merchant account for the transaction amount and a debit from the issuer account for the transaction amount, by communicating with the issuer system and the payment gateway, or with the issuer system and the acquirer system; and transmit a first settlement report associated with the transaction to the payment gateway or the acquirer system, and a second settlement report associated with the transaction to the issuer system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments or aspects that are illustrated in the accompanying schematic figures, in which:

FIG. 8 is a diagram of non-limiting embodiments or aspects of components of one or more devices or systems of FIGS. 1-7;

FIG. 9 is a flowchart illustrating a non-limiting embodiment or aspect of a method for an A2A transaction network, according to the principles of the present disclosure;

FIG. 11 is a flowchart illustrating a non-limiting embodiment or aspect of a method for an A2A transaction network, according to the principles of the present disclosure;

FIG. 12 is a schematic diagram illustrating a non-limiting embodiment or aspect of a payer or payee identifier for use in an A2A transaction network, according to the principles of the present disclosure;

Figure 1:
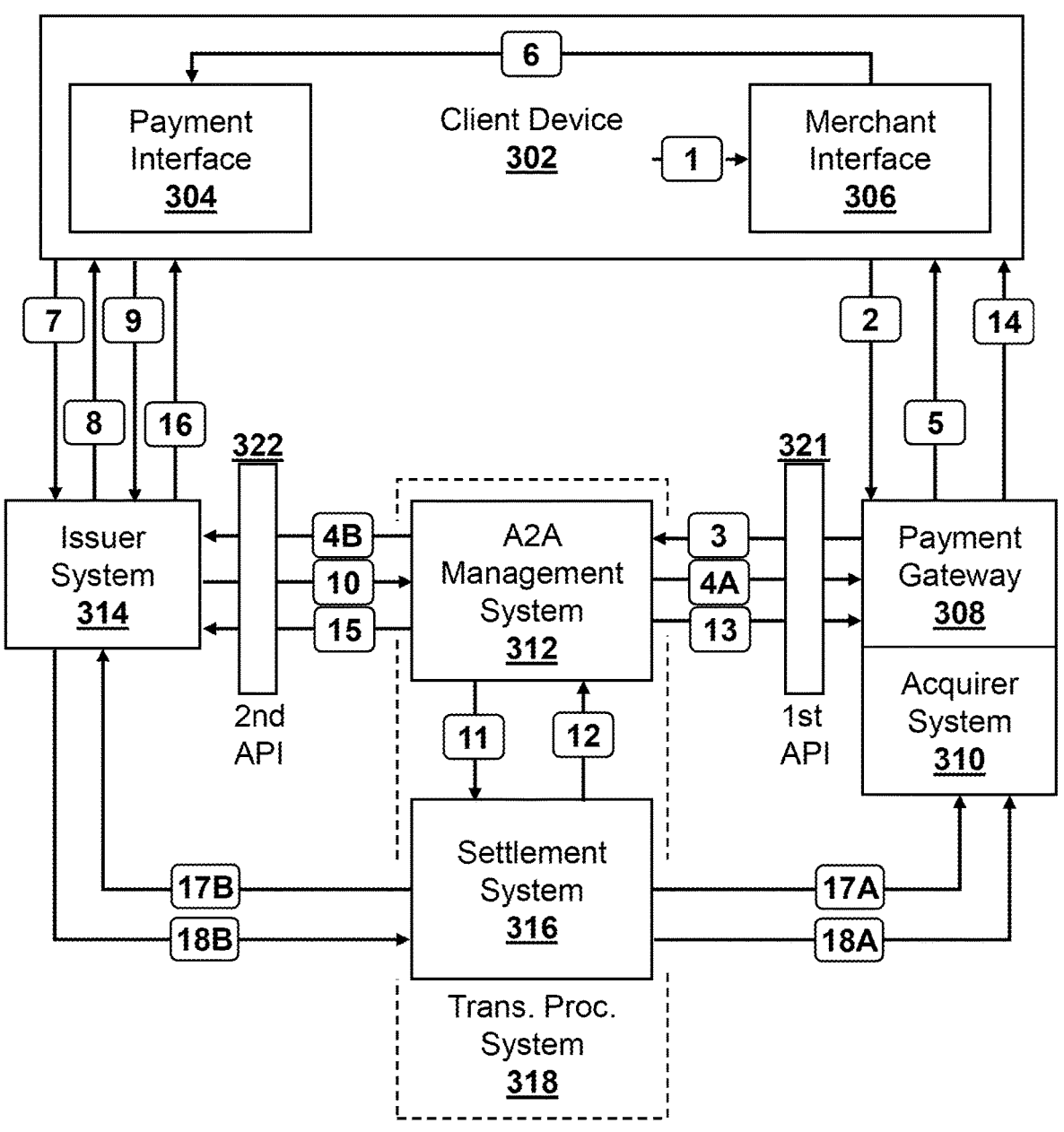
FIG. 1 is a diagram of a non-limiting embodiment or aspect of an environment in which systems, apparatuses, and/or methods, as described herein, may be implemented.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment, aspect, or implementation of the present subject matter described herein as "exemplary" is not necessarily to be construed as preferred or advantageous over other embodiments or aspects.

The terms "comprises", "includes", "comprising", "including", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet, and/or the like) that includes data. Any known electronic communication protocols and/or algorithms may be used, such as, for example, Transmission Control Protocol/Internet Protocol (TCP/IP) (including Hypertext Transfer Protocol (HTTP) and other protocols), wireless local area network (WLAN) (including 802.11 and other radio frequency-based protocols and methods), analog transmissions, cellular networks (e.g., Global System for Mobile Communications (GSM), Code-Division Multiple Access (CDMA), Long-Term Evolution (LTE®), Worldwide Interoperability for Microwave Access (WiMAX®), a third generation (3G) network, a fourth generation (4G) network, a fifth generation (5G) network, etc.), and/or the like. It will be appreciated that numerous other arrangements are possible.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, a radio-frequency identification (RFID) transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa@ or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments or aspects, may be operated by or on behalf of a transaction service provider.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the terms "request," "response," "request message," and "response message" may refer to one or more messages, data packets, signals, and/or data structures used to communicate data between two or more components or units.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a user, a merchant, an acquirer, and/or the like) that owns, utilizes, and/or operates a client device for initiating transactions (e.g., for initiating transactions with a transaction service provider).

As used herein, the term "computing device" may refer to one or more electronic devices configured to process data. A computing device may be configured to directly or indirectly communicate with or over one or more networks. A computing device may, in some examples, include the necessary components to receive, process, and output data, such as a processor, a display, a memory, an input device, a network interface, and/or the like. A computing device may be a mobile device, a desktop computer, and/or any other like device. Furthermore, the term "computer" may refer to any computing device that includes the necessary components to receive, process, and output data, and normally includes a display, a processor, a memory, an input device, and a network interface. As used herein, the term "server" may refer to or include one or more processors or computers, storage devices, or similar computer arrangements that are operated by or facilitate communication and/or processing in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

The term "processor," as used herein, may represent any type of processing unit, such as a single processor having one or more cores, one or more cores of one or more processors, multiple processors each having one or more cores, and/or other arrangements and combinations of processing units.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the terms "request," "response," "request message," and "response message" may refer to one or more messages, data packets, signals, and/or data structures used to communicate data between two or more components or units.

Non-limiting embodiments or aspects of the present disclosure are directed to systems, methods, and computer program products for an A2A transaction network. Described systems and methods provide the technical improvement of reducing and/or removing physical storage and data storage requirements for account holders, including removing the requirement for a separate payment device for transacting. The use of party identifiers rather than account identifiers improves system security by avoiding exposing such sensitive account identifiers in the network. Described systems and methods further provide the technical improvement of reducing the number of communication channels, ports, and system integrations required for issuer systems, acquirer systems, and payment gateways to enable A2A transactions for its account holders in the context of an electronic payment processing network, including removing multiple third party A2A provider systems. A centralized A2A management system, accessible and connected via one or more APIs, allows A2A transactions to be implemented between system users (e.g., payers, payees, merchants) by enabling issuer systems, payment gateways, and acquirer systems to communicate in an A2A transaction flow. The system users need not manage multiple A2A transaction accounts across multiple A2A transaction network providers, given that the existing financial institutions can now operate on A2A transactions via the APIs and A2A management system.

Described systems and methods further provide the technical improvement of increasing the number of viable electronic transaction channels for merchant systems to transact with payers. Besides card-present and card-not present transactions, merchants and payers may complete transactions using the described A2A transaction flow. Furthermore, described systems and methods provide the technical improvement of reducing computer resource loss (e.g., wasted processing bandwidth, number of communications, etc.) due to fraudulent transactions and disputed transactions, by implementing a secure authentication process that does not require payee devices and systems to receive or retain account-identifying information. The described party identifiers (e.g., user identifiers, merchant identifiers) can be used to identify participants and execute transactions while also preventing sensitive account identifiers (e.g., PANs) from being exposed outside of financial institutions and the A2A management system.

Figure 6:
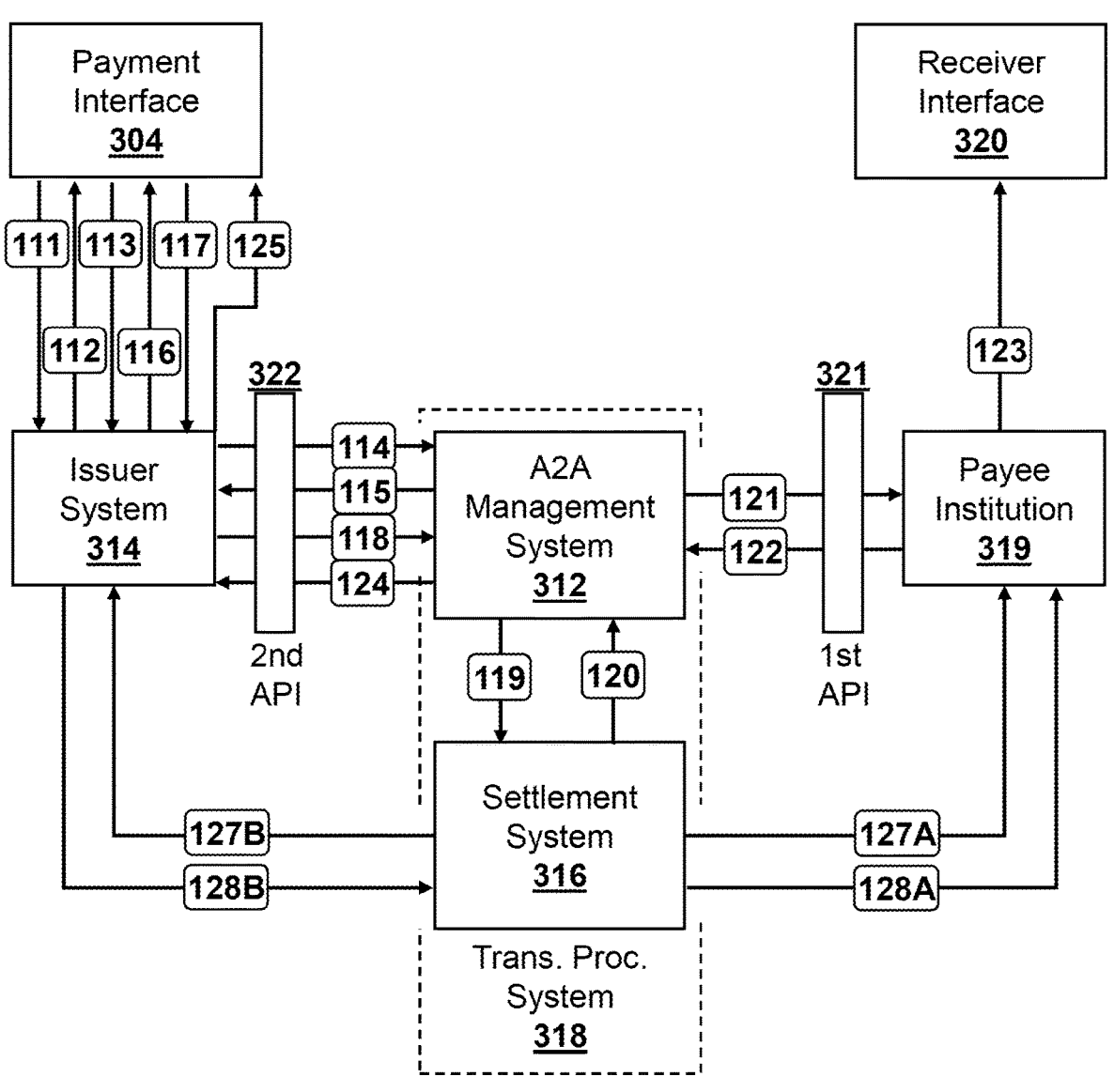
FIG. 6 is a diagram of a non-limiting embodiment or aspect of an environment in which systems, apparatuses, and/or methods, as described herein, may be implemented.
Figure 7:
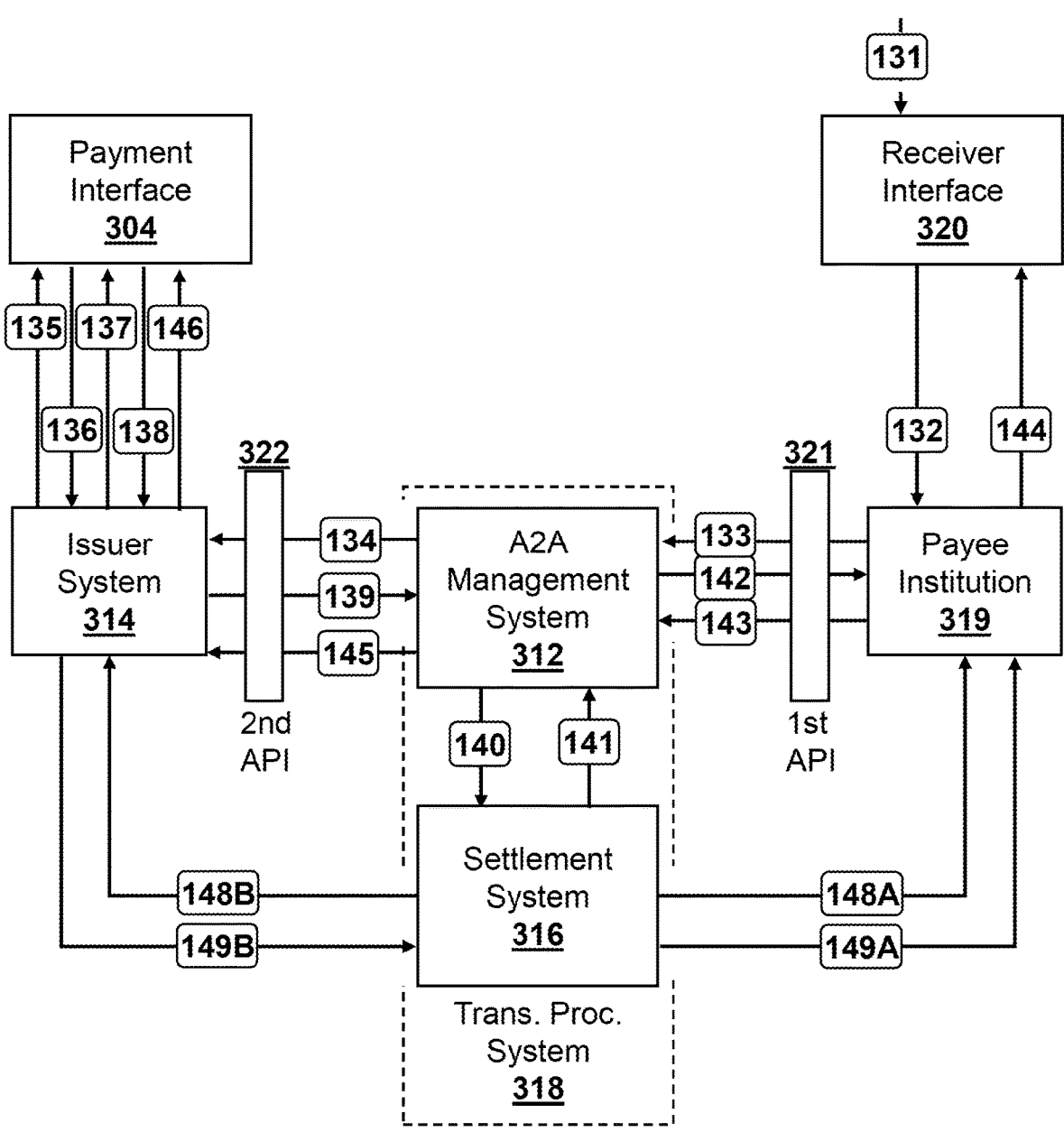
FIG. 7 is a diagram of a non-limiting embodiment or aspect of an environment in which systems, apparatuses, and/or methods, as described herein, may be implemented.

Referring now to FIG. 1, illustrated is a schematic diagram of an environment 300a, according to non-limiting embodiments or aspects of the present disclosure. In particular, the arrangement and steps of environment 300a may be used for P2M transactions executed on a same computing device, e.g., a client device 302. The environment 300a may include client device 302, payment gateway 308, acquirer system 310, A2A management system 312, issuer system 314, settlement system 316, and transaction processing system 318. Transaction processing system 318 may include A2A management system 312 and settlement system 316. A2A management system 312, settlement system 316, and/or transaction processing system 318 may comprise the same computing devices, servers, and/or processors. It will be appreciated that the environment 300a shown in FIG. 1 may also be employed for P2P transactions, such as shown in FIGS. 6 and 7.

Client device 302 may include a computing device, such as a mobile device, personal computer, tablet, and/or the like, used by a user associated with an issuer account (e.g., a banking account) provided by an issuer. Client device 302 may be configured with a payment interface 304 associated with an issuer for a user of the client device 302 to authenticate transactions, including, but not limited to, a web browser accessing a banking website, a downloadable application of a financial institution, and/or the like. Client device 302 may further be configured with a merchant interface 306 associated with a merchant for initiation of transactions, including, but not limited to, a web browser accessing a store website, a downloadable application of a merchant, and/or the like. Client device 302 may be configured to communicate over a communication network with payment gateway 308 and/or acquirer system 310, via the merchant interface 306. Client device 302 may be further configured to communicate over a communication network with issuer system 314 via the payment interface 304.

Payment gateway 308 and/or acquirer system 310 may be configured in the position of the process flow as shown in the environment 300*a*. Additionally or alternatively, payment gateway 308 may be configured to communicate on behalf of the acquirer system 310 for completion of transactions in the environment 300*a*. Additionally or alternatively, the acquirer system 310 may handle all communications shown as being directed to the payment gateway 308 and without involvement of a payment gateway 308. Payment gateway 308 and/or acquirer system 310 may include one or more computing devices, servers, processors, and/or the like for communicating with a merchant interface 306 over a communication network, communicating with an A2A management system 312 over a same or different communication network via a first API 321, and communicating with settlement system 316 via a same or different communication network as the preceding communication networks. Payment gateway 308 and/or acquirer system 310 may be integrated with the first API 321 and may include a database for storing transaction logs, settlement reports, and/or the like. Acquirer system 310 may be associated with an acquirer (e.g., a financial institution) providing a transaction account for the payee (e.g., a merchant banking account).

A2A management system 312 may include one or more computing devices, servers, processors, and/or the like configured to communicate in one or more communication networks for facilitation of an A2A transaction network. A2A management system 312 may be configured to communicate with payment gateway 308 and/or acquirer system 310 via a first API 321, issuer system 314 via a second API 322, and settlement system 316. The A2A management system 312 may be centrally executed, such as part of a transaction processing system 318.

Issuer system 314 may include one or more computing devices, servers, processors, and/or the like configured to communicate with a payment interface 304 over a communication network, communicating with an A2A management system 312 over a same or different communication network via a second API 322, and communicating with settlement system 316 via a same or different communication network as the preceding communication networks. Issuer system 314 may be integrated with the second API 322 and may include a database for storing transaction logs, settlement reports (messages including data of metrics pertaining to one or more settled transactions), and/or the like.

Settlement system 316 may include one or more computing devices, servers, processors, and/or the like configured to communicate in one or more communication networks for settlement and clearance of electronic payment transactions. Settlement system 316 may be configured to communicate with A2A management system 312 to receive settlement request messages and transmit settlement response messages. Settlement system 316 may be configured to communicate with issuer system 314, payment gateway 308, and/or acquirer system 310 to clear and settle transactions from payer accounts to payee accounts.

Environment 300*a* is further shown in FIG. 1 with an internal communication flow diagram demonstrating non-limiting embodiments or aspects of a method for an A2A transaction network (described below). The process flow described below is further depicted in the illustrated screens of FIGS. 26-31.

In step 1, a transaction request may be initiated in the merchant interface 306. For example, a user may initiate a transaction request for a transaction in the merchant interface 306 of a client device 302 of the user. In some non-limiting embodiments or aspects, the user may identify an issuer with which the user has a transaction account (e.g., a banking account). For example, the user may type in an issuer name, search from a list of suggested issuers, identify the issuer by geographic location, and/or the like. The transaction request originated in the merchant interface 306 may include a transaction amount for the transaction that the user is seeking to complete (e.g., in exchange for goods and/or services).

In step 2, the transaction request may be routed to a payment gateway 308 and/or acquirer system 310. For example, merchant interface 306 may transmit the transaction request to a payment gateway 308 and/or acquirer system 310 over a communication network. In some non-limiting embodiments or aspects, the transaction request may be routed through a merchant server of a merchant system associated with the merchant with which the user is seeking to transact. The transaction request transmitted to the payment gateway 308 and/or acquirer system 310 may include, be modified to include, or be replaced with a transaction request including a merchant identifier.

In step 3, the transaction request may be transmitted to the A2A management system 312. For example, payment gateway 308 and/or acquirer system 310 may transmit, and A2A management system 312 may receive, a transaction request for the transaction. The transaction request transmitted to and received by the A2A management system 312 may include, be modified to include, or be replaced with a transaction request including a transaction amount, an issuer identifier, a merchant identifier, and/or a merchant name. The transaction request may be communicated via a first API 321 integrated with the payment gateway 308 and/or acquirer system 310. API integration at the payment gateway 308 and/or acquirer system 310 allows for simplification of network onboarding, reduced downtime for network integration or updates, and centralization and security of code management by a transaction processing system 318.

In step 4A, an intent identifier and an issuer URL may be transmitted to the payment gateway 308 and/or acquirer system 310, in same or separate messages. For example, the A2A management system 312 may determine an issuer URL based on the issuer identifier received in the transaction request via the first API 321. A2A management system 312 may be configured with a database of issuer URLs associated with issuer identifiers. Issuer URL may include an address of an internet resource, including, but not limited to, an address of an issuer website, a redirect link to an issuer application, and/or the like. Issuer URL may, when executed by client device 302, prompt the display of the payment interface 304. A2A management system 312 may transmit the determined issuer URL to the payment gateway 308 and/or acquirer system 310 via the first API 321.

Additionally or alternatively, A2A management system 312 may generate an intent identifier associated with the transaction request received via the first API 321. Intent identifier may include a unique identifier associated with the transaction that is representative of an intent by at least one party to transact. Intent identifier may be paired with a consent identifier, later in the process flow, to establish consent by the paying party (e.g., payer) to transact. A2A management system 312 may transmit the generated intent identifier to the payment gateway 308 and/or acquirer system 310 via the first API 321.

In step 4B, the intent identifier, transaction amount, issuer identifier, merchant identifier, and/or merchant name may be transmitted to the issuer system 314 via the second API 322 in same or separate messages. For example, the A2A management system 312 may transmit the generated intent identifier, the transaction amount received in the transaction request, and the merchant identifier received in the transaction request to the issuer system 314 via the second API 322.

In step 5, the intent identifier and the issuer URL may be transmitted to the merchant interface 306. For example, the payment gateway 308 and/or acquirer system 310 may transmit the intent identifier and the issuer URL, received from the A2A management system 312, to the merchant interface 306.

In step 6, the issuer URL may trigger the payment interface 304 and the intent identifier may be imported to the payment interface 304. For example, the client device 302 may access the issuer URL, which may trigger the payment interface 304 to be displayed on the client device 302. The intent identifier, received from the payment gateway 308 and/or acquirer system 310, may be imported (e.g., delivered as a data payload) to the payment interface 304.

In step 7, the user may provide credentials to the payment interface 304, and user authentication data and the intent identifier may be transmitted to the issuer system 314, in a same or separate message. For example, the payment interface 304 may prompt the user to provide credentials (e.g., biometric information, username and password, one-time password (OTP), and/or the like). In some non-limiting embodiments or aspects, the credentials may be authenticated locally on the client device 302, in which case the user authentication data transmitted to the issuer system 314 may include a user authentication success message. In some non-limiting embodiments or aspects, the credentials may be authenticated at the issuer system 314, in which case the user authentication data transmitted to the issuer system 314 may include the credentials. After input of the user credentials, payment interface 304 may transmit the user authentication data and the intent identifier to the issuer system 314.

In step 8, the user authentication data may be reviewed, the intent identifier may be verified, and transaction data may be transmitted to the payment interface 304. If the user credentials were not authenticated locally at the client device 302, the issuer system 314 may review the credentials and authenticate the user. If the user is not authenticated (e.g., a username and password do not match a stored username and password), the issuer system 314 may request, via the payment interface 304, the user to re-enter user credentials. If the user is authenticated, the issuer system 314 may proceed. If the user credentials were authenticated locally at the client device 302, the issuer system 314 may review and verify the success of the user authentication.

In some non-limiting embodiments or aspects, the issuer system 314 may compare the intent identifier received from the payment interface 304 with one or more intent identifiers received from the A2A management system 312 via the second API 322. The issuer system 314 may determine a match between an intent identifier received from a payment interface 304 and an intent identifier received from the A2A management system 312 via the second API 322. After matching intent identifiers, the issuer system 314 may retrieve transaction data associated with the intent identifier that was received from the A2A management system 312, including, but not limited to, transaction amount, merchant name, and/or merchant identifier. Some or all of the transaction data may be transmitted from the issuer system 314 to the payment interface 304 for display to the user, including, but not limited to, transaction amount and merchant name.

In step 9, confirmation of the transaction may be transmitted to the issuer system 314. For example, the user may review the transaction data received from the issuer system 314 and verify that the transaction should be completed. The user may then confirm the transaction, triggering communication of confirmation to the issuer system 314 from the payment interface 304. By way of further example, the user may select a button in the payment interface 304 displaying "Pay", "Submit", "Confirm", and/or the like, which may trigger a confirmation communication to be transmitted to the issuer system 314 from the payment interface 304.

In step 10, an authenticated consent identifier, the intent identifier, and/or the payer identifier may be transmitted to the A2A management system 312. For example, the issuer system 314 may generate a consent identifier corresponding to the intent identifier, the consent identifier comprising a unique identifier and representing consent by the payer to complete the transaction associated with the intent identifier. In view of successful user authentication and user confirmation of the transaction in steps 7-9, the generated consent identifier may also be referred to as an "authenticated consent identifier" herein. The issuer system 314 may transmit the authenticated consent identifier to the A2A management system 312 via the second API 322.

In some non-limiting embodiments or aspects, issuer system 314 may determine a payer identifier associated with the user that successfully completed authentication in steps 7 and 8. Issuer system 314 may be configured with a database of payer identifiers associated with user authentication data. The payer identifier may be a globally unique identifier associated with an issuer account (e.g., a banking account) that is associated with the user. The payer identifier may further include a unique account identifier (e.g., an identifier unique to at least the issuer), an institution identifier associated with the issuer system (e.g., an identifier of the issuer as a financial institution), and a regional identifier (e.g., an area of deployment identifier, a country identifier, a multi-national group identifier, etc.). In some non-limiting embodiments or aspects, the unique account identifier may be a device address (e.g., a phone number, a media access control (MAC) address, etc.) of the client device 302. Issuer system 314 may determine the payer identifier associated with an issuer account of the user and transmit the payer identifier to the A2A management system 312 via the second API 322, in a same or separate message as the authenticated consent identifier.

In step 11, a merchant account identifier and an issuer account identifier may be determined, and a combined authorization and settlement message may be transmitted. For example, the A2A management system 312 may correspond the merchant identifier of the transaction request, received with the intent identifier via the first API 321, to a merchant account identifier (e.g., a banking account identifier, such as a PAN, of the merchant). By way of further example, the A2A management system 312 may correspond to the payer identifier, received via the second API 322, to an issuer account identifier (e.g., a banking account identifier, such as a PAN, of the user). In some non-limiting embodiments or aspects, A2A management system 312 may be configured with a database of account identifiers associated with merchant identifiers and payer identifiers.

In some non-limiting embodiments or aspects, A2A management system 312 may generate a combined authorization and settlement message (e.g., an Original Credit Transaction (OCT) message) configured to request and/or cause settlement for the transaction amount between a merchant account associated with the merchant account identifier and an issuer account associated with the issuer account identifier. The combined authorization and settlement message may be a combination of a transaction authorization request message and a transaction settlement request message. The combined authorization and settlement message may be transmitted to a settlement system 316 of a transaction processing system 318. In some non-limiting embodiments or aspects, the combined authorization and settlement message may trigger a push payment directly from the issuer account to the merchant account.

In some non-limiting embodiments or aspects, settlement system 316 may settle the transaction as a credit to the merchant account for the transaction amount and a debit from the issuer account for the transaction amount, by communicating with the issuer system 314, the payment gateway 308, and/or the acquirer system 310.

In step 12, an approval message may be received by the A2A management system 312. For example, the settlement system 316 may process the combined authorization and settlement message and transmit an approval message associated with approval of the combined authorization and settlement message to the A2A management system 312. In some non-limiting embodiments or aspects, the combined authorization and settlement message may be approved by stand-in processing (STIP), by which the transaction processing system acts on behalf of the issuer system 314 and/or as a backup to the issuer in the authorization process.

In step 13, a first success message may be transmitted to the payment gateway 308 and/or the acquirer system 310. For example, the A2A management system 312 may transmit a first success message to the payment gateway 308 and/or the acquirer system 310 via the first API 321. In some non-limiting embodiments or aspects, the first success message may be configured to cause the merchant interface 306 of the client device 302 to display a confirmation of completion of the transaction, such as by triggering the payment gateway 308 and/or acquirer system 310 to communicate with the merchant interface 306 to display the confirmation.

In step 14, the first success message may be transmitted to the merchant interface 306. For example, the payment gateway 308 and/or the acquirer system 310 may transmit the first success message received from the A2A management system 312 via the first API 321 to the merchant interface 306. In some non-limiting embodiments or aspects, the first success message may be modified or replaced with another first success message before being communicated to the merchant interface 306. Upon receiving the first success message, the merchant interface 306 may display confirmation of completion of the transaction.

In step 15, a second success message may be transmitted to the issuer system 314. For example, the A2A management system 312 may transmit a second success message to the issuer system 314 via the second API 322. In some non-limiting embodiments or aspects, the second success message may be configured to cause the payment interface 304 of the client device 302 to display a confirmation of completion of the transaction, such as by triggering the issuer system 314 to communicate with the payment interface 304 to display the confirmation.

In step 16, the second success message may be transmitted to the payment interface 304. For example, the issuer system 314 may transmit the second success message received from the A2A management system 312 via the second API 322 to the payment interface 304. In some non-limiting embodiments or aspects, the second success message may be modified or replaced with another second success message before being communicated to the payment interface 304. Upon receiving the second success message, the payment interface 304 may display confirmation of completion of the transaction.

In step 17A, a first settlement report may be transmitted to the payment gateway 308 and/or the acquirer system 310. For example, the settlement system 316 may transmit a first settlement report (e.g., a message including data of metrics pertaining to one or more transactions settled in relation to the payment gateway 308 and/or acquirer system 310) to the payment gateway 308 and/or acquirer system 310. In some non-limiting embodiments or aspects, settlement system 316 may aggregate a plurality of settlement reports, including the first settlement report, for transmission at regular intervals (e.g., end of day), including by a Single Message System (SMS).

In step 17B, a second settlement report may be transmitted to the issuer system 314. For example, the settlement system 316 may transmit a second settlement report (e.g., a message including data of metrics pertaining to one or more transactions settled in relation to the issuer system 314) to the issuer system 314. In some non-limiting embodiments or aspects, settlement system 316 may aggregate a plurality of settlement reports, including the second settlement report, for transmission at regular intervals (e.g., end of day), including by a Single Message System (SMS).

In steps 18A and 18B, net settlement for the transaction may be completed. For example, settlement system 316, through communications with issuer system 314, payment gateway 308, and/or acquirer system 310, may complete settlement for the transaction by crediting the merchant account of the merchant for the transaction amount, and by debiting the issuer account of the user for the transaction amount.

Figure 2:
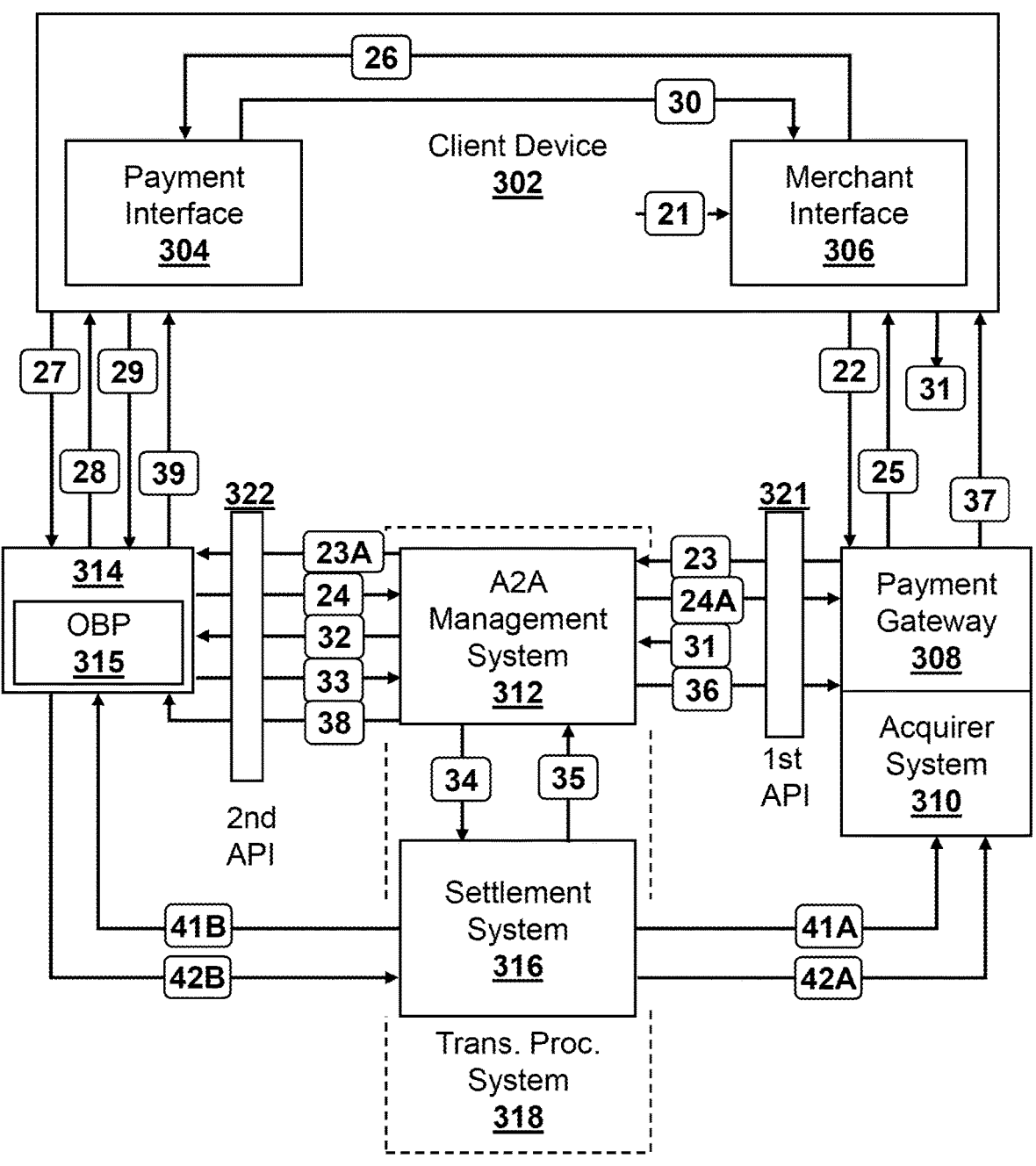
FIG. 2 is a diagram of a non-limiting embodiment or aspect of an environment in which systems, apparatuses, and/or methods, as described herein, may be implemented.

Referring now to FIG. 2, illustrated is a schematic diagram of an environment 300b according to non-limiting embodiments or aspects of the present disclosure. In particular, the arrangement and steps of environment 300b may be used for P2M transactions executed on a same computing device, e.g., the client device 302, and using an Open Banking Platform (OBP) protocol. The environment 300b may include client device 302, payment gateway 308, acquirer system 310, A2A management system 312, issuer system 314 (which may include or be associated with an OBP provider 315), settlement system 316, and transaction processing system 318. Transaction processing system 318 may include A2A management system 312 and settlement system 316. A2A management system 312, settlement system 316, and/or transaction processing system 318 may comprise the same computing devices, servers, and/or processors. Non-limiting embodiments or aspects of the computing devices in environment 300b may be the same as those devices described in environment 300a, shown in FIG. 1.

Environment 300b is further shown in FIG. 2 with an internal communication flow diagram demonstrating non-limiting embodiments or aspects of a method for an A2A transaction network (described below).

In step 21, a transaction may be initiated. For example, a user may initiate a transaction by selecting a payment option in the merchant interface 306, inputting an issuer identifier in the merchant interface 306, and expressing intent to complete the transaction by submitting one or more inputs to the merchant interface 306. The merchant interface 306 may include various types of interfaces on the client device 302, such as a merchant website on a mobile browser, a merchant application, and/or the like.

In step 22, a message representative of the intent for the transaction is routed to the payment gateway 308. For example, the merchant system (e.g., backend servers) associated with the merchant interface 306 may transmit a message representative of the transaction intent to the payment gateway 308. The message received by the payment gateway 308 may include a transaction amount and the issuer identifier selected by the user.

In step 23, payment details may be transmitted to the A2A management system 312. For example, the payment gateway 308 may connect with the A2A management system 312 via the first API 321 and transmit a message including payment details for the transaction between the user and the merchant. The message transmitted by the payment gateway 308 may include a transaction amount, the issuer identifier, a merchant name, a merchant identifier, and/or the like.

In step 23A, the payment details may be transmitted to the OBP provider 315 associated with the issuer system 314. For example, the A2A management system 312 may generate a new intent identifier and connect with the OBP provider 315 via a second API 322 to transmit a message to the OBP provider 315. The message transmitted to the OBP provider 315 may include the generated intent identifier, the transaction amount, the issuer identifier, the merchant name, the merchant identifier, and/or the like.

In step 24, a consent identifier and issuer URL may be transmitted to the A2A management system 312. For example, the OBP provider 315 may generate a consent identifier corresponding to the intent identifier and transmit a message to the A2A management system 312 via the second API 322. The message may include the consent identifier, the issuer URL, and/or the like.

In step 24A, the consent identifier and issuer URL may be transmitted to the payment gateway 308. For example, the A2A management system 312 may transmit a message via the first API 321 to the payment gateway 308. The message transmitted to the payment gateway 308 may include the consent identifier generated by the OBP provider 315, the issuer URL, and/or the like.

In step 25, the consent identifier and issuer URL may be transmitted to the merchant interface 306. For example, the payment gateway 308 may transmit the consent identifier and the issuer URL to the merchant interface 306 via a message to the merchant system.

In step 26, the issuer URL may be used to trigger payment interface 304 to continue the transaction. For example, the merchant interface 306 may use the issuer URL to trigger the payment interface 304 to update and trigger user-side steps for authenticating and continuing with the transaction. The message between the merchant interface 306 and the payment interface 304 may include the consent identifier and the issuer URL.

In step 27, the user may be prompted to complete a second client-side transaction step. For example, the payment interface 304 may update to prompt the user to log in to an issuer payment process. The user may log in by providing their user credentials. As part of the log in process, the consent identifier received via the merchant interface 306 may be forwarded to the issuer system 314 via the payment interface 304.

In step 28, the consent identifier may be matched with the intent identifier. For example, the issuer system 314 may match the consent identifier with the intent identifier received from the OBP provider 315 associated with the issuer system 314. With a successful match, the issuer system 314 may transmit transaction data to the payment interface 304, which may include transaction amount, merchant name, and/or the like.

In step 29, the user may confirm the intent to complete payment for the transaction. For example, the transaction data received from the issuer system 314 may be displayed in the payment interface 304, and the user may review the transaction data to assure satisfaction with the transaction. After reviewing the transaction data, the user may confirm the intent to complete payment for the transaction by providing an input (e.g., selection of an "OK", "Pay", or "Submit" button) to the payment interface 304.

In step 30, the client device 302 may redirect the user back to the merchant interface 306. For example, after the user provides an input confirming the intent to complete payment for the transaction, the client device 302 may change the display from the payment interface 304 to the merchant interface 306. During this transition, an authenticated consent identifier may be transmitted from the payment interface 304 to the merchant interface 306.

In step 31, the merchant interface 306 may connect to the A2A management system 312. For example, the merchant interface 306 may connect to the A2A management system 312 via a communication channel between the merchant system and the A2A management system 312, such as provided through a software development kit (SDK) (e.g., which may include an API). When making this connection, the merchant interface 306 may transmit a message to the A2A management system 312 that includes the authenticated consent identifier, a payer identifier, and/or the like.

In step 32, the payer and/or merchant identifiers may be translated into (e.g., corresponded to) account identifiers and a push payment may be triggered. For example, the A2A management system 312 may translate the payer identifier into an issuer account identifier (e.g., a payer PAN) and the merchant identifier into a merchant account identifier (e.g., a merchant PAN), such as by performing a lookup in a lookup table based at least partly on the corresponding identifier. The A2A management system 312 may trigger the push payment using OCT protocol in the transaction processing system 318.

In step 33, the transaction may be approved. For example, the OBP provider 315 may approve the OCT using Smarter Stand-In Processing (STIP) protocol. In doing so, the OBP provider 315 may transmit a message to the A2A management system 312 including the authenticated consent identifier and the payer identifier.

In step 34, the A2A management system 312 may transmit the merchant PAN and the payer PAN to the settlement system 316 and/or transaction processing system 318 for completion of the transaction. In step 35, the settlement system 316 and/or transaction processing system 318 may transmit a message back to the A2A management system 312 indicating that the transaction has been approved (e.g., STIP approved).

In step 36, a success message may be transmitted to the payment gateway 308. For example, the A2A management system 312 may transmit a message to the payment gateway 308 via the first API 321 indicating that the transaction was successful.

In step 37, a success message may be transmitted to the merchant system. For example, in response to receiving the success message from the A2A management system 312, the payment gateway 308 may transmit a success message to the merchant system, including the merchant interface 306, indicating that the transaction was successful. The merchant interface 306 may be updated to display a notification indicating the transaction was successful.

In step 38, a success message may also be transmitted to the OBP provider 315. For example, the A2A management system 312 may transmit a message via the second API 322 to the OBP provider 315 indicating that the transaction was successful. The success message may therein be forwarded to the issuer system 314.

In step 39, a success message may be further transmitted to the payment interface 304. For example, issuer system 314, in response to receiving a success message from the A2A management system 312, may trigger a message to the payment interface 304 indicating that the transaction was successful. The payment interface 304 may be updated to display a notification indicating the transaction was successful.

In step 41A, a first settlement report may be transmitted to the payment gateway 308 and/or the acquirer system 310. For example, the settlement system 316 may transmit a first settlement report (e.g., a message including data of metrics pertaining to one or more transactions settled in relation to the payment gateway 308 and/or acquirer system 310) to the payment gateway 308 and/or acquirer system 310. In some non-limiting embodiments or aspects, settlement system 316 may aggregate a plurality of settlement reports, including the first settlement report, for transmission at regular intervals (e.g., end of day), including by SMS.

In step 41B, a second settlement report may be transmitted to the issuer system 314. For example, the settlement system 316 may transmit a second settlement report (e.g., a message including data of metrics pertaining to one or more transactions settled in relation to the issuer system 314) to the issuer system 314. In some non-limiting embodiments or aspects, settlement system 316 may aggregate a plurality of settlement reports, including the second settlement report, for transmission at regular intervals (e.g., end of day), including by SMS.

In steps 42A and 42B, net settlement for the transaction may be completed. For example, settlement system 316, through communications with issuer system 314, payment gateway 308, and/or acquirer system 310, may complete settlement for the transaction by crediting the merchant account of the merchant for the transaction amount, and by debiting the issuer account of the user for the transaction amount.

Figure 3:
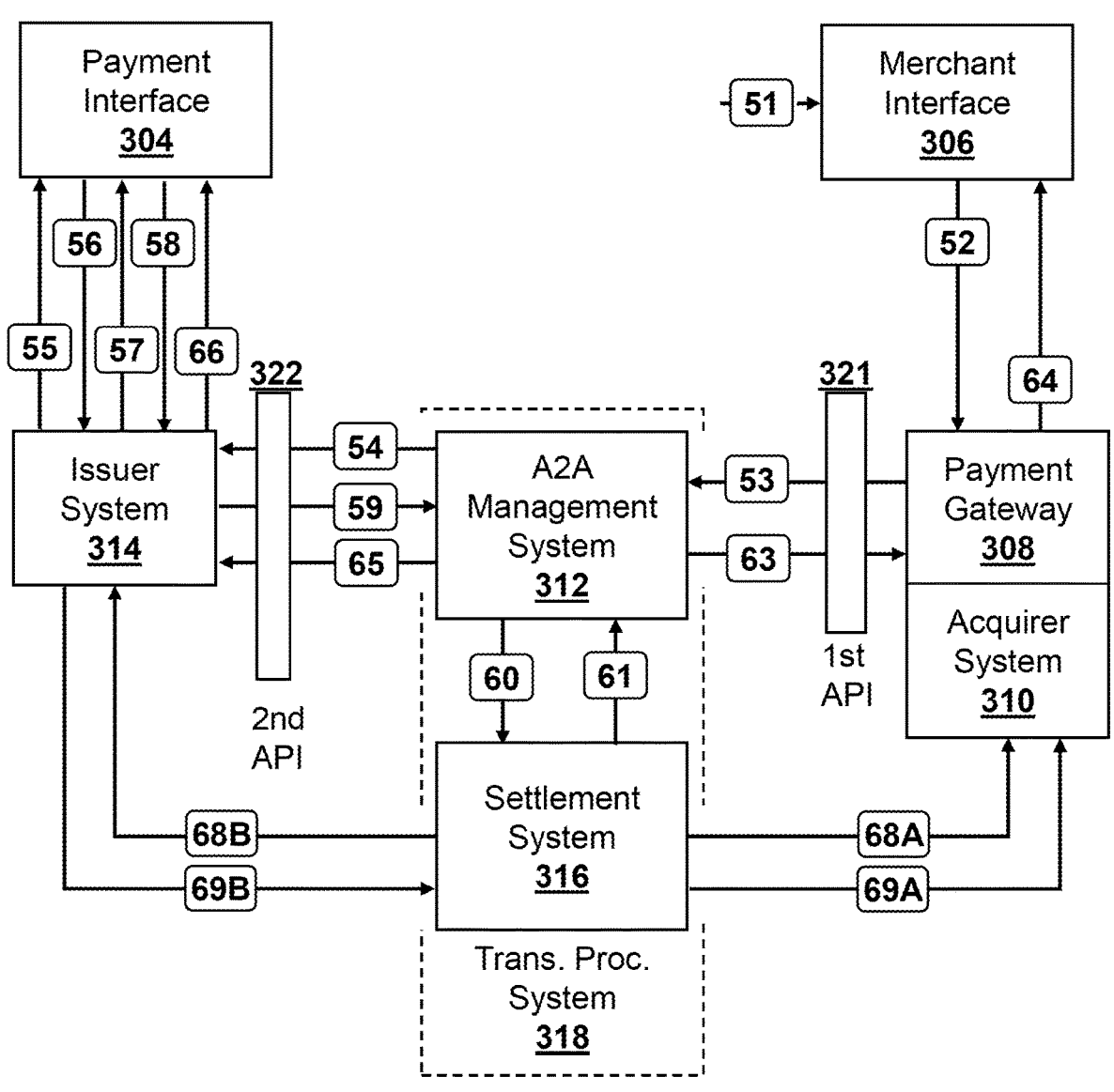
FIG. 3 is a diagram of a non-limiting embodiment or aspect of an environment in which systems, apparatuses, and/or methods, as described herein, may be implemented.

Referring now to FIG. 3, illustrated is a schematic diagram of an environment 300c according to non-limiting embodiments or aspects of the present disclosure. In particular, the arrangement and steps of environment 300c may be used for P2M transactions where the payment interface 304 and merchant interface 306 are executed on separate computing devices. The environment 300c may include a payment interface 304 executed on a first computing device (e.g., a client device 302), a merchant interface 306 executed on a second computing device, payment gateway 308, acquirer system 310, A2A management system 312, issuer system 314, settlement system 316, and transaction processing system 318. Transaction processing system 318 may include A2A management system 312 and settlement system 316. A2A management system 312, settlement system 316, and/or transaction processing system 318 may comprise the same computing devices, servers, and/or processors. Non-limiting embodiments or aspects of the computing devices in environment 300c may be the same as those devices described in environment 300a, shown in FIG. 1.

Environment 300c is further shown in FIG. 3 with an internal communication flow diagram demonstrating non-limiting embodiments or aspects of a method for an A2A transaction network (described below).

In step 51, a transaction may be initiated. For example, the user may provide an input (e.g., selection of a "Checkout" button) in the merchant interface 306 to express an intent to complete a transaction between the user and a merchant associated with the merchant interface 306. The user may confirm and/or provide (e.g., via interface input) a transaction amount, an issuer identifier, and a payer identifier in the merchant interface 306.

In step 52, the intent to complete the transaction may be transmitted to the payment gateway 308. For example, the merchant interface 306 may transmit a message to the payment gateway 308 indicating that the user intends to complete a transaction with the merchant. The message transmitted to the payment gateway 308 may include the transaction amount, issuer identifier, payer identifier, and/or the like.

In step 53, the payment details may be transmitted to the A2A management system 312. For example, the payment gateway 308, in response to receiving the message from the merchant interface 306, may transmit a message to the A2A management system 312 via the first API 321. The message transmitted to the A2A management system 312 may include transaction data including, but not limited to, transaction amount, issuer identifier, payer identifier, merchant name, merchant identifier, and/or the like.

In step 54, the payment details may be transmitted to the issuer system 314. For example, in response to receiving the message from the payment gateway 308, the A2A management system 312 may transmit a message to the issuer system 314 via the second API 322. This may include generating an intent identifier corresponding to the user's intent to complete the transaction. The message transmitted to the issuer system 314 may include transaction data including, but not limited to, the intent identifier, transaction amount, payer identifier, merchant name, merchant identifier, and/or the like.

In step 55, an authentication request message may be transmitted to the payment interface 304. For example, issuer system 314 may transmit an authentication request message to the payment interface 304 to seek authentication of the user. In response, the payment interface 304 may be updated to display a login screen, to allow the user to input user credentials for authenticating the user.

In step 56, the user may authenticate themselves in the payment interface 304. For example, the user may input user credentials in the payment interface 304 to authenticate the user. The user credentials may include, but are not limited to, a username, a password, biometric data, and/or the like. The user credentials may be communicated from the payment interface 304 to the issuer system 314 to authenticate the user.

In step 57, transaction data may be transmitted to the payment interface 304. For example, in response to successful authentication of the user, the issuer system 314 may transmit a message containing transaction data to the payment interface 304. The message to the payment interface 304 may include, but is not limited to, transaction amount, merchant name, and/or the like. Upon receipt of the transaction data, the transaction data may be displayed to the user in the payment interface 304, so that the user may review the details of the transaction.

In step 58, the user may confirm their intent to complete payment of the transaction. For example, after reviewing the transaction data in the payment interface 304, the user may provide an input to the payment interface 304 (e.g., selecting an "OK", "Pay", or "Submit" button) to confirm the user's intent to complete payment of the transaction. The confirmation from the user may be transmitted to the issuer system 314 in a message from the payment interface 304.

In step 59, an authenticated consent identifier may be generated and transmitted to the A2A management system 312. For example, in response to receiving confirmation from the user of the user's intent to complete payment of the transaction, the issuer system 314 may generate and transmit an authenticated consent identifier to the A2A management system 312. The consent identifier may correspond to the intent identifier.

In step 60, data for processing the transaction may be transmitted to the settlement system 316 and/or transaction processing system 318. For example, the A2A management system 312 may translate (e.g., correspond) the payer identifier to a payer PAN and the merchant identifier to a merchant PAN, and transmit the merchant PAN and the payer PAN to the settlement system 316 and/or transaction processing system 318 for completion of the transaction. In step 61, the settlement system 316 and/or transaction processing system 318 may transmit a message back to the A2A management system 312 indicating that the transaction has been approved (e.g., STIP approved).

In step 63, a success message may be transmitted to the payment gateway 308. For example, the A2A management system 312 may transmit a message to the payment gateway 308 via the first API 321 indicating that the transaction was successful.

In step 64, a success message may be transmitted to the merchant system. For example, in response to receiving the success message from the A2A management system 312, the payment gateway 308 may transmit a success message to the merchant system, including the merchant interface 306, indicating that the transaction was successful. The merchant interface 306 may be updated to display a notification indicating that the transaction was successful.

In step 65, a success message may also be transmitted to the issuer system 314. For example, the A2A management system 312 may transmit a message via the second API 322 to the issuer system 314 indicating that the transaction was successful.

In step 66, a success message may be further transmitted to the payment interface 304. For example, issuer system 314, in response to receiving a success message from the A2A management system 312, may trigger a message to the payment interface 304 indicating that the transaction was successful. The payment interface 304 may be updated to display a notification indicating that the transaction was successful.

In step 68A, a first settlement report may be transmitted to the payment gateway 308 and/or the acquirer system 310. For example, the settlement system 316 may transmit a first settlement report (e.g., a message including data of metrics pertaining to one or more transactions settled in relation to the payment gateway 308 and/or acquirer system 310) to the payment gateway 308 and/or acquirer system 310. In some non-limiting embodiments or aspects, settlement system 316 may aggregate a plurality of settlement reports, including the first settlement report, for transmission at regular intervals (e.g., end of day), including by SMS.

In step 68B, a second settlement report may be transmitted to the issuer system 314. For example, the settlement system 316 may transmit a second settlement report (e.g., a message including data of metrics pertaining to one or more transactions settled in relation to the issuer system 314) to the issuer system 314. In some non-limiting embodiments or aspects, settlement system 316 may aggregate a plurality of settlement reports, including the second settlement report, for transmission at regular intervals (e.g., end of day), including by SMS.

In steps 69A and 69B, net settlement for the transaction may be completed. For example, settlement system 316, through communications with issuer system 314, payment gateway 308, and/or acquirer system 310, may complete settlement for the transaction by crediting the merchant account of the merchant for the transaction amount, and by debiting the issuer account of the user for the transaction amount.

Figure 4:
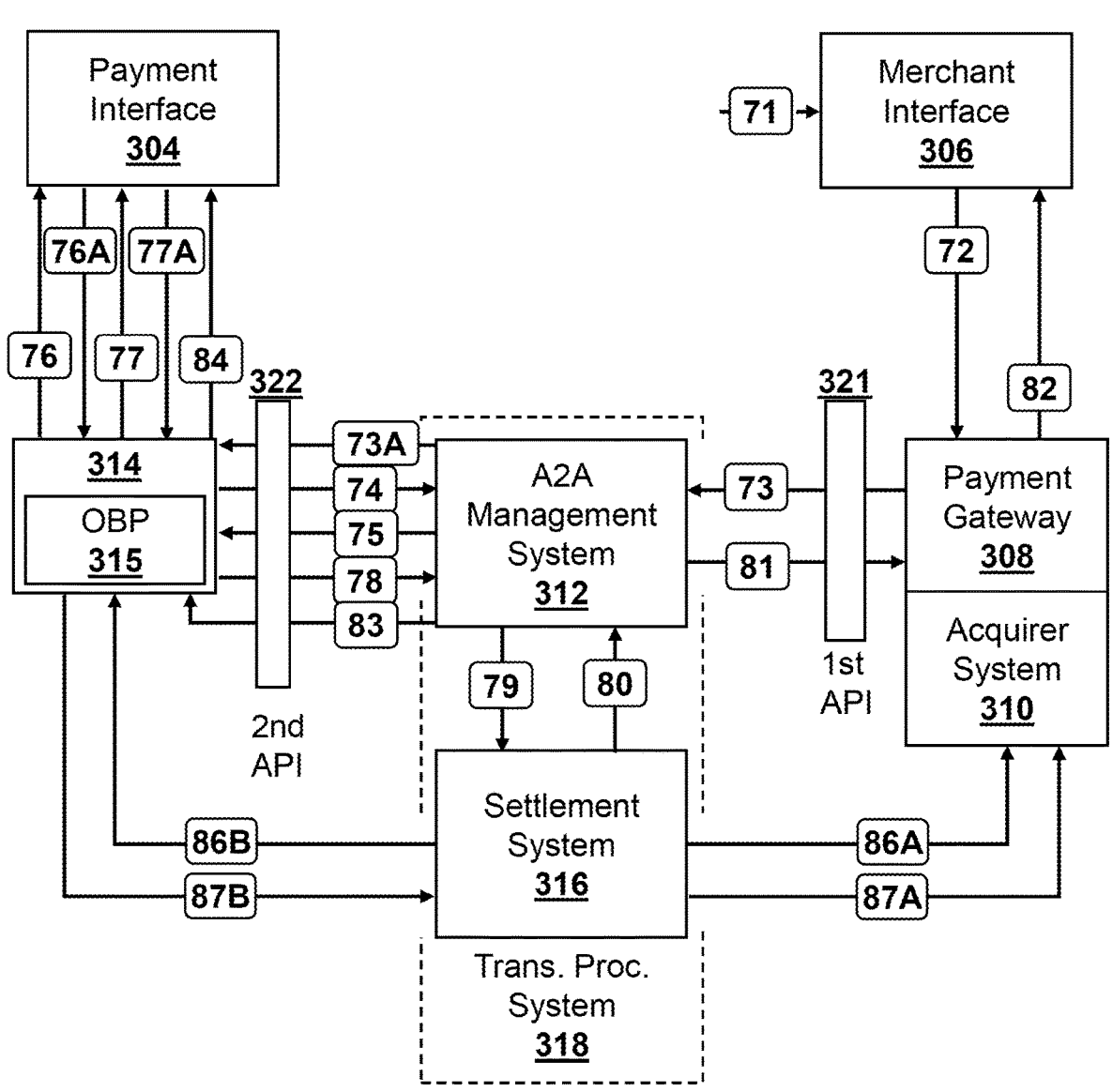
FIG. 4 is a diagram of a non-limiting embodiment or aspect of an environment in which systems, apparatuses, and/or methods, as described herein, may be implemented.

Referring now to FIG. 4, illustrated is a schematic diagram of an environment 300d according to non-limiting embodiments or aspects of the present disclosure. In particular, the arrangement and steps of environment 300d may be used for P2M transactions using a payment interface 304 and merchant interface 306 executed on separate computing devices, and using an OBP protocol. The environment 300d may include a payment interface 304 executed on a first computing device (e.g., a client device 302), a merchant interface 306 executed on a second computing device, payment gateway 308, acquirer system 310, A2A management system 312, issuer system 314 (which may include or be associated with an OBP provider 315), settlement system 316, and transaction processing system 318. Transaction processing system 318 may include A2A management system 312 and settlement system 316. A2A management system 312, settlement system 316, and/or transaction processing system 318 may comprise the same computing devices, servers, and/or processors. Non-limiting embodiments or aspects of the computing devices in environment 300d may be the same as those devices described in environment 300a, shown in FIG. 1.

Environment 300d is further shown in FIG. 4 with an internal communication flow diagram demonstrating non-limiting embodiments or aspects of a method for an A2A transaction network (described below).

In step 71, a transaction may be initiated. For example, a user may initiate a transaction by selecting a payment option in the merchant interface 306, inputting an issuer identifier in the merchant interface 306, and expressing intent to complete the transaction by submitting one or more inputs to the merchant interface 306. The merchant interface 306 may be executed on a second computing device, separate from a computing device executing the payment interface 304.

In step 72, a message representative of the intent for the transaction is transmitted to the payment gateway 308. For example, the merchant system (e.g., backend servers) associated with the merchant interface 306 may transmit a message representative of the transaction intent to the payment gateway 308. The message received by the payment gateway 308 may include a transaction amount, the issuer identifier selected by the user, the payer identifier, and/or the like.

In step 73, payment details may be transmitted to the A2A management system 312. For example, the payment gateway 308 may connect with the A2A management system 312 via the first API 321 and transmit a message including payment details for the transaction between the user and the merchant. The message transmitted by the payment gateway 308 may include a transaction amount, the issuer identifier, the payer identifier, a merchant name, a merchant identifier, and/or the like.

In step 73A, the payment details may be transmitted to the OBP provider 315 associated with the issuer system 314. For example, the A2A management system 312 may generate a new intent identifier and connect with the OBP provider 315 via a second API 322 to transmit a message to the OBP provider 315. The message transmitted to the OBP provider 315 may include the generated intent identifier, the transaction amount, the issuer identifier, the payer identifier, the merchant name, the merchant identifier, and/or the like.

In step 74, a consent identifier may be transmitted to the A2A management system 312. For example, the OBP provider 315 may generate a consent identifier corresponding to the intent identifier and transmit a message to the A2A management system 312 via the second API 322 including the consent identifier.

In step 75, the A2A management system 312 may, in response to receiving the consent identifier from the OBP provider 315, transmit a payment instruction to the OBP provider 315 that may cause the issuer system 314 to interact with the payment interface 304 to confirm payment for the transaction.

In step 76, the payment interface 304 may be triggered on the first computing device. For example, the issuer system 314, after receiving instructions from the OBP provider 315, may trigger the payment interface 304 to update on the first computing device via a transmitted message. The user may be prompted to complete a second client-side transaction step. For example, the payment interface 304 may update to prompt the user to log in to an issuer payment process for the purpose of authentication. The user may log in by providing their user credentials.

In step 76A, the user credentials may be transmitted from the payment interface 304 to the issuer system 314 for authentication of the user. The user credentials may include, but are not limited to, username, password, biometric data, and/or the like. The user credentials may be used to authenticate the user and to continue processing the transaction.

In step 77, transaction data may be communicated to the payment interface 304. For example, in response to successful authentication of the user, the issuer system 314 may transmit transaction data to the payment interface 304, which may include transaction amount, merchant name, and/or the like. The user may then view the transaction data in the payment interface 304 so that the details of the transaction may be confirmed.

In step 77A, the user may confirm the intent to complete payment for the transaction. For example, the transaction data received from the issuer system 314 may be displayed in the payment interface 304, and the user may review the transaction data to assure satisfaction with the transaction. After reviewing the transaction data, the user may confirm the intent to complete payment for the transaction by providing an input (e.g., selection of an "OK", "Pay", or "Submit" button) to the payment interface 304.

In step 78, in response to confirmation from the user of their intent to complete payment for the transaction, the issuer system 314 and/or the OBP provider 315 may authenticate and transmit the consent identifier corresponding to the intent identifier for the transaction. The authenticated consent identifier may be transmitted from the issuer system 314 and/or OBP provider 315 to the A2A management system 312 via the second API 322.

In step 79, the payer and/or merchant identifiers may be translated into (e.g., corresponded to) account identifiers and a push payment may be triggered. For example, the A2A management system 312 may translate the payer identifier into a payer PAN and the merchant identifier into a merchant PAN, such as by performing a lookup in a lookup table based at least partly on the corresponding identifier. The A2A management system 312 may trigger the push payment using OCT protocol in the transaction processing system 318. The A2A management system 312 may transmit the merchant PAN and the payer PAN to the settlement system 316 and/or transaction processing system 318 for completion of the transaction. In step 80, the settlement system 316 and/or transaction processing system 318 may transmit a message back to the A2A management system 312 indicating that the transaction has been approved (e.g., STIP approved).

In step 81, a success message may be transmitted to the payment gateway 308. For example, the A2A management system 312 may transmit a message to the payment gateway 308 via the first API 321 indicating that the transaction was successful.

In step 82, a success message may be transmitted to the merchant system. For example, in response to receiving the success message from the A2A management system 312, the payment gateway 308 may transmit a success message to the merchant system, including the merchant interface 306, indicating that the transaction was successful. The merchant interface 306 may be updated to display a notification indicating that the transaction was successful.

In step 83, a success message may also be transmitted to the OBP provider 315. For example, the A2A management system 312 may transmit a message via the second API 322 to the OBP provider 315 indicating that the transaction was successful. The success message may therein be forwarded to the issuer system 314.

In step 84, a success message may be further transmitted to the payment interface 304. For example, issuer system 314, in response to receiving a success message from the A2A management system 312, may trigger a message to the payment interface 304 indicating that the transaction was successful. The payment interface 304 may be updated to display a notification indicating that the transaction was successful.

In step 86A, a first settlement report may be transmitted to the payment gateway 308 and/or the acquirer system 310. For example, the settlement system 316 may transmit a first settlement report (e.g., a message including data of metrics pertaining to one or more transactions settled in relation to the payment gateway 308 and/or acquirer system 310) to the payment gateway 308 and/or acquirer system 310. In some non-limiting embodiments or aspects, settlement system 316 may aggregate a plurality of settlement reports, including the first settlement report, for transmission at regular intervals (e.g., end of day), including by SMS.

In step 86B, a second settlement report may be transmitted to the issuer system 314. For example, the settlement system 316 may transmit a second settlement report (e.g., a message including data of metrics pertaining to one or more transactions settled in relation to the issuer system 314) to the issuer system 314. In some non-limiting embodiments or aspects, settlement system 316 may aggregate a plurality of settlement reports, including the second settlement report, for transmission at regular intervals (e.g., end of day), including by SMS.

In steps 87A and 87B, net settlement for the transaction may be completed. For example, settlement system 316, through communications with issuer system 314, payment gateway 308, and/or acquirer system 310, may complete settlement for the transaction by crediting the merchant account of the merchant for the transaction amount, and by debiting the issuer account of the user for the transaction amount.

Figure 5:
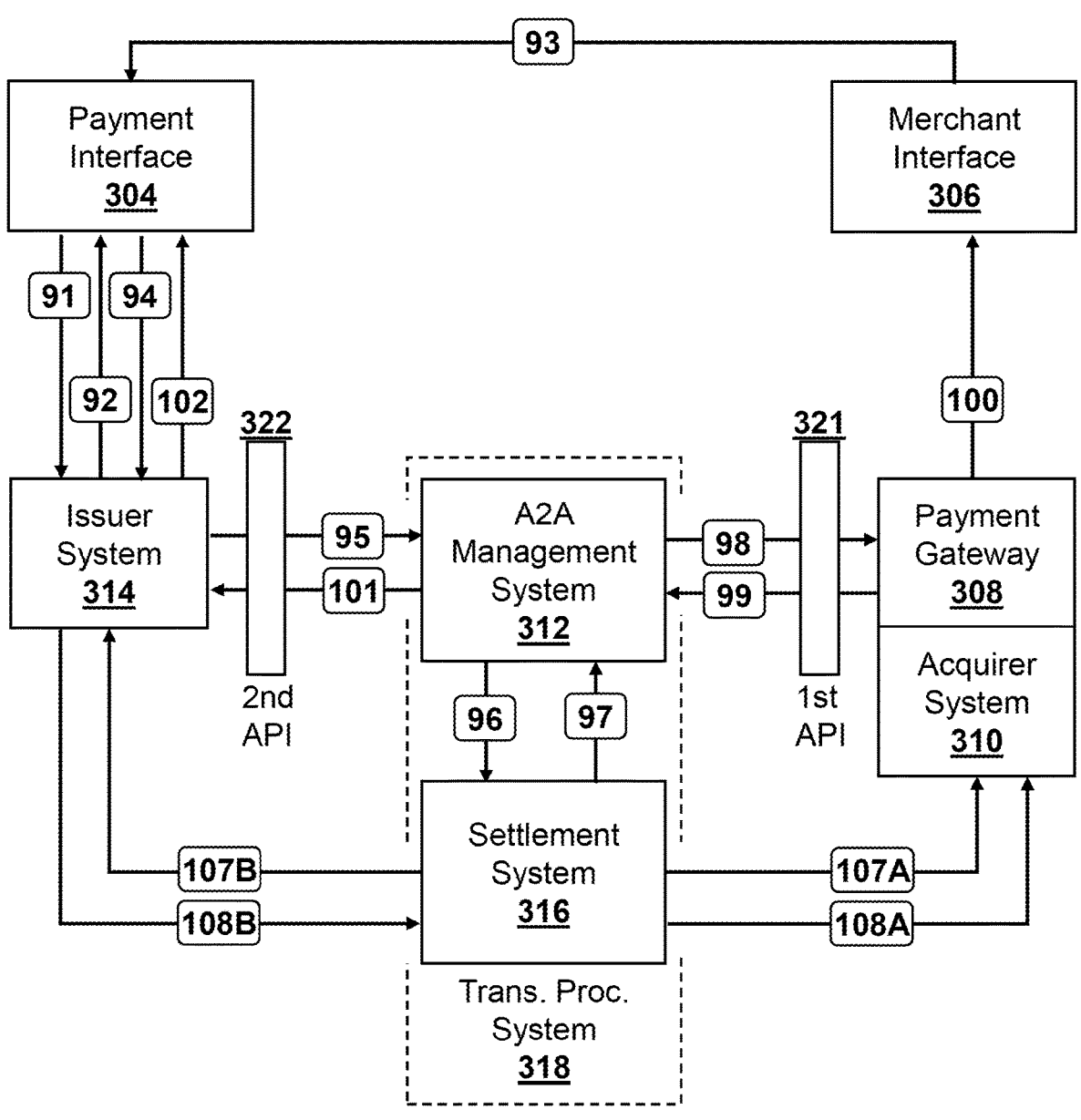
FIG. 5 is a diagram of a non-limiting embodiment or aspect of an environment in which systems, apparatuses, and/or methods, as described herein, may be implemented.

Referring now to FIG. 5, illustrated is a schematic diagram of an environment 300e according to non-limiting embodiments or aspects of the present disclosure. In particular, the arrangement and steps of environment 300e may be used for P2M transactions in a face-to-face (F2F) interaction between a payment interface 304 on a first computing device (e.g., a client device 302) and a merchant interface of a second computing device (e.g., a POS device). The environment 300e may include a payment interface 304 executed on a first computing device, a merchant interface 306 executed on a second computing device, payment gateway 308, acquirer system 310, A2A management system 312, issuer system 314, settlement system 316, and transaction processing system 318. Transaction processing system 318 may include A2A management system 312 and settlement system 316. A2A management system 312, settlement system 316, and/or transaction processing system 318 may comprise the same computing devices, servers, and/or processors. Non-limiting embodiments or aspects of the computing devices in environment 300e may be the same as those devices described in environment 300a, shown in FIG. 1.

Environment 300e is further shown in FIG. 5 with an internal communication flow diagram demonstrating non-limiting embodiments or aspects of a method for an A2A transaction network (described below).

In step 91, a transaction may be initiated. For example, the user may provide an input in their payment interface 304 (e.g., through a login window of an issuer application) to authenticate themselves and request completion of a transaction with a merchant. The user's action may trigger a message from the payment interface 304 to the issuer system 314 to complete authentication of the user, and the message may include user credentials used for authentication.

In step 92, the issuer system 314 may authenticate the user based on the user credentials and transmit a successful authentication response message to the payment interface 304. In response, the payment interface 304 may be triggered to update to display an option to the user, which may prompt the user to complete a transaction using the depicted system (e.g., a payment type option, such as "Pay by Bank").

In step 93, the payment interface 304 may communicate with the merchant interface 306 to receive transaction data for the completion of a transaction between the user and the merchant. For example, the user may use the computing device executing the payment interface 304 (e.g., a client device 302) to scan a code, transmit data over a short-range wireless signal, and/or the like, to receive transaction data. The transaction data received by the payment interface 304 from the merchant interface 306 may include, but is not limited to, the merchant identifier, a transaction amount, transaction description, and/or the like.

In step 94, the payment interface 304 may transmit a message to the issuer system 314 to provide transaction details and to trigger the transaction using the depicted system. For example, the payment interface 304 may generate and transmit a message to the issuer system 314 including transaction data including, but not limited to, the merchant identifier, the transaction amount, and/or the like.

In step 95, in response to receiving the message from the payment interface 304, the issuer system 314 may transmit a message to the A2A management system 312 to execute the transaction. For example, the issuer system 314 may generate and transmit, via the second API 322, a message including, but not limited to, a consent identifier, the transaction amount, the merchant name, the merchant identifier, the payer identifier, and/or the like. In parallel or before the above steps, the user may be presented with the merchant name in the payment interface 304 to receive final confirmation of the transaction. The user may review the merchant name and provide an input in the payment interface 304 to transmit a final confirmation to the issuer system 314 to proceed with the transaction.

In step 96, data for processing the transaction may be transmitted to the settlement system 316 and/or transaction processing system 318. For example, the A2A management system 312 may translate (e.g., correspond) the payer identifier to a payer PAN and the merchant identifier to a merchant PAN, and transmit the merchant PAN and the payer PAN to the settlement system 316 and/or transaction processing system 318 for completion of the transaction. In step 97, the settlement system 316 and/or transaction processing system 318 may transmit a message back to the A2A management system 312 indicating that the transaction has been approved (e.g., STIP approved).

In step 98, a success message may be transmitted to the payment gateway 308. For example, the A2A management system 312 may transmit a message to the payment gateway 308 via the first API 321 indicating that the transaction was successful. In step 99, the payment gateway 308 may transmit an acknowledgement message back through the first API 321 to the A2A management system 312 to provide acknowledgment of the transaction and confirm that the merchant was notified accordingly.

In step 100, a success message may be transmitted to the merchant system. For example, in response to receiving the success message from the A2A management system 312, the payment gateway 308 may transmit a success message to the merchant system, including the merchant interface 306, indicating that the transaction was successful. The merchant interface 306 may be updated to display a notification indicating that the transaction was successful.

In step 101, a success message may also be transmitted to the issuer system 314. For example, the A2A management system 312 may transmit a message via the second API 322 to the issuer system 314 indicating that the transaction was successful.

In step 102, a success message may be further transmitted to the payment interface 304. For example, issuer system 314, in response to receiving a success message from the A2A management system 312, may trigger a message to the payment interface 304 indicating that the transaction was successful. The payment interface 304 may be updated to display a notification indicating that the transaction was successful.

In step 107A, a first settlement report may be transmitted to the payment gateway 308 and/or the acquirer system 310. For example, the settlement system 316 may transmit a first settlement report (e.g., a message including data of metrics pertaining to one or more transactions settled in relation to the payment gateway 308 and/or acquirer system 310) to the payment gateway 308 and/or acquirer system 310. In some non-limiting embodiments or aspects, settlement system 316 may aggregate a plurality of settlement reports, including the first settlement report, for transmission at regular intervals (e.g., end of day), including by SMS.

In step 107B, a second settlement report may be transmitted to the issuer system 314. For example, the settlement system 316 may transmit a second settlement report (e.g., a message including data of metrics pertaining to one or more transactions settled in relation to the issuer system 314) to the issuer system 314. In some non-limiting embodiments or aspects, settlement system 316 may aggregate a plurality of settlement reports, including the second settlement report, for transmission at regular intervals (e.g., end of day), including by SMS.

In steps 108A and 108B, net settlement for the transaction may be completed. For example, settlement system 316, through communications with issuer system 314, payment gateway 308, and/or acquirer system 310, may complete settlement for the transaction by crediting the merchant account of the merchant for the transaction amount, and by debiting the issuer account of the user for the transaction amount.

Referring now to FIG. 6, illustrated is a schematic diagram of an environment 300f according to non-limiting embodiments or aspects of the present disclosure. In particular, the arrangement and steps of environment 300f may be used for P2P transactions between a payment interface 304 and a receiver interface 320, where the payer initiates the transaction on the payment interface 304. The environment 300f may include a payment interface 304 executed on a first computing device (e.g., a payer's client device 302), a receiver interface 320 (e.g., a payee's payment interface 304 provided by a financial institution to send and receive payments) executed on a second computing device (e.g., a payee's client device 302), payee institution system 319 (e.g., like issuer system 314, but associated with a payment account of the payee), A2A management system 312, issuer system 314, settlement system 316, and transaction processing system 318. Transaction processing system 318 may include A2A management system 312 and settlement system 316. A2A management system 312, settlement system 316, and/or transaction processing system 318 may comprise the same computing devices, servers, and/or processors. The receiver interface 320 may be functionally equivalent to the payment interface 304. The payee institution system 319 may be functionally equivalent to the issuer system 314, and/or comprised in a same system. Non-limiting embodiments or aspects of the computing devices in environment 300f may be the same as those devices described in environment 300a, shown in FIG. 1. The process shown in FIG. 6 is further illustrated in the depicted screens of FIGS. 13-18.

Environment 300f is further shown in FIG. 6 with an internal communication flow diagram demonstrating non-limiting embodiments or aspects of a method for an A2A transaction network (described below).

In step 111, a transaction may be initiated by the user (shown in FIG. 6 as the payer). For example, the user may provide an input in their payment interface 304 (e.g., through a login window of an issuer application) to authenticate themselves and request completion of a transaction with a payee. The user's action may trigger a message from the payment interface 304 to the issuer system 314 to complete authentication of the user, and the message may include user credentials used for authentication.

In step 112, the issuer system 314 may authenticate the user based on the user credentials and transmit a successful authentication response message to the payment interface 304. In response, the payment interface 304 may be triggered to update to display an option to the user, which may prompt the user to complete a transaction using the depicted system (e.g., a payment type option, such as "Pay by Bank").

In step 113, the user may enter details for the transaction in the payment interface 304, which will be forwarded to the issuer system 314. For example, the user may use the computing device executing the payment interface 304 (e.g., a client device 302) to provide transaction data, including, but not limited to, a transaction amount and a payee identifier (e.g., by inputting the identifier, selecting the identifier from a list, etc.). The payment interface 304 may transmit a message to the issuer system 314 to provide transaction details and to trigger the transaction using the depicted system. For example, the payment interface 304 may generate and transmit a message to the issuer system 314 including the transaction data.

In step 114, in response to receiving the message from the payment interface 304, the issuer system 314 may transmit a message to the A2A management system 312 to obtain the payee name. For example, the issuer system 314 may generate and transmit, via the second API 322, a message including, but not limited to, the transaction amount, the payee identifier, and/or the like.

In step 115, the A2A management system may transmit a response message to the issuer system 314. For example, the A2A management system 312 may generate an intent identifier for the transaction and determine a payee name corresponding to the payee identifier. The A2A management system 312 may further generate and transmit a response message to the issuer system 314 via the second API 322. The response message to the issuer system 314 may include, but is not limited to, an intent identifier for the transaction, the payee name, and/or the like.

In step 116, the issuer system 314 may transmit a message to the payment interface 304 to cause the payment interface 304 to display the payee name. For example, in response to receiving the response message from the A2A management system 312, the issuer system 314 may transmit a message to the payment interface 304 including the payee name. The message may cause the payment interface 304 to display the payee name. This provides the user with the opportunity to review the payee name and confirm the payee's identity.

In step 117, after reviewing the payee name received from the issuer system 314, the user may input confirmation of the payee name. For example, after the payee name is displayed in the payment interface 304, the user may review and input confirmation to the payment interface 304.

In step 118, in response to receiving confirmation of the payee name from the user, the issuer system 314 may generate a consent identifier corresponding to the intent identifier and transmit the consent identifier to the A2A management system 312.

In step 119, data for processing the transaction may be transmitted to the settlement system 316 and/or transaction processing system 318. For example, the A2A management system 312 may translate (e.g., correspond) the payer identifier to a payer PAN and the payee identifier to a payee PAN, and transmit the payer PAN and the payee PAN to the settlement system 316 and/or transaction processing system 318 for completion of the transaction. The message from the A2A management system 312 may further include the transaction amount. In step 120, the settlement system 316 and/or transaction processing system 318 may transmit a message back to the A2A management system 312 indicating that the transaction has been approved (e.g., STIP approved).

In step 121, the A2A management system 312 may trigger payment from the user's account with the issuer institution 314 to the payee's account with the payee institution 319. For example, A2A management system 312 may communicate with the payee institution system 319 via the first API 321 to complete processing of the transaction for payment from the user to the payee. In response, in step 122, the payee institution system 319 may transmit a success message to the A2A management system 312 via the first API 321, indicating that the transaction was successful.

In step 123, a success message may be transmitted to the receiver interface 320. For example, in response to communicating with the A2A management system 312 in steps 121 and 122, the payee institution system 319 may transmit a message to the receiver interface 320 to notify the payee that the transaction was completed. The receiver interface 320 may be updated to display a notification indicating that the transaction was successful.

In step 124, a success message may also be transmitted to the issuer system 314. For example, the A2A management system 312 may transmit a message via the second API 322 to the issuer system 314 indicating that the transaction was successful.

In step 125, a success message may be further transmitted to the payment interface 304. For example, issuer system 314, in response to receiving a success message from the A2A management system 312, may trigger a message to the payment interface 304 indicating that the transaction was successful. The payment interface 304 may be updated to display a notification indicating that the transaction was successful.

In step 127A, a first settlement report may be transmitted to the payee institution system 319. For example, the settlement system 316 may transmit a first settlement report (e.g., a message including data of metrics pertaining to one or more transactions settled in relation to the payee institution system 319) to the payee institution system 319. In some non-limiting embodiments or aspects, settlement system 316 may aggregate a plurality of settlement reports, including the first settlement report, for transmission at regular intervals (e.g., end of day), including by SMS.

In step 127B, a second settlement report may be transmitted to the issuer system 314. For example, the settlement system 316 may transmit a second settlement report (e.g., a message including data of metrics pertaining to one or more transactions settled in relation to the issuer system 314) to the issuer system 314. In some non-limiting embodiments or aspects, settlement system 316 may aggregate a plurality of settlement reports, including the second settlement report, for transmission at regular intervals (e.g., end of day), including by SMS.

In steps 128A and 128B, net settlement for the transaction may be completed. For example, settlement system 316, through communications with issuer system 314 and payee institution system 319, may complete settlement for the transaction by crediting the account of the payee for the transaction amount, and by debiting the issuer account of the user for the transaction amount.

Referring now to FIG. 7, illustrated is a schematic diagram of an environment 300g according to non-limiting embodiments or aspects of the present disclosure. In particular, the arrangement and steps of environment 300g may be used for P2P transactions between a payment interface 304 and a receiver interface 320, where the payee initiates the transaction on the receiver interface 320. The environment 300f may include a payment interface 304 executed on a first computing device, a receiver interface 320 executed on a second computing device, payee institution system 319, A2A management system 312, issuer system 314, settlement system 316, and transaction processing system 318. Transaction processing system 318 may include A2A management system 312 and settlement system 316. A2A management system 312, settlement system 316, and/or transaction processing system 318 may comprise the same computing devices, servers, and/or processors. Non-limiting embodiments or aspects of the computing devices in environment 300g may be the same as those devices described in environment 300a, shown in FIG. 1, and/or environment 300f, shown in FIG. 6. The process flow described in connection with FIG. 7 is further illustrated in the screens depicted in FIGS. 19-25.

Environment 300g is further shown in FIG. 7 with an internal communication flow diagram demonstrating non-limiting embodiments or aspects of a method for an A2A transaction network (described below).

In step 131, a transaction may be initiated by the payee. For example, the payee may provide input in their receiver interface 304 regarding details of a transaction to be requested. The details may include a transaction amount, payer identifier, payee identifier, and/or the like.

In step 132, the payee may further initiate the transaction by causing a message to be transmitted from the receiver interface 320 to the payee institution system 319. The message may be triggered by an input of the payee (e.g., a selection of an "OK", "Submit", or "Request" button) and may include the details of the transaction input by the payee.

In step 133, the payment details may be forwarded to the A2A management system 312. For example, in response to receiving the message from the receiver interface 320, the payee institution system 319 may generate and transmit a message via the first API 321 to the A2A management system 312. The message may include, but is not limited to, the transaction amount, payer identifier, payee identifier, and/or the like.

In step 134, the request for a transaction may be routed to the issuer system 314. For example, in response to receiving the message from the payee institution system 319, the A2A management system 312 may determine a payer name associated with the payer identifier, generate an intent identifier for the transaction, and generate and transmit a message to the issuer system 314 via the second API 322. The message from the A2A management system 312 may include, but is not limited to, the generated intent identifier, the transaction amount, the payer identifier, the payee identifier, and the payer name.

In step 135, the user may be alerted to the requested payment transaction. For example, in response to receiving the message from the A2A management system 312, the issuer system 314 may transmit a message to the payment interface 304 to notify them that a payee is requesting payment for a transaction. Before the details of the transaction are displayed to the user in the payment interface 304, however, the user may be prompted to authenticate themselves by inputting user credentials into the payment interface 304.

In step 136, the user provides input in the payment interface 304 to authenticate the user. For example, the user may input user credentials to the payment interface 304, which may be transmitted in a message to the issuer system 314 for authentication of the user. In step 137, in response to successful authentication of the user, the transaction data may be transmitted from the issuer system 314 to the payment interface 304 for the user to review the transaction and provide confirmation.

In step 138, the user may review the transaction data received from the issuer system 314 displayed in the payment interface 304 and may provide confirmation for the transaction. For example, after reviewing the transaction data, the user may communicate their confirmation to proceed with the transaction by providing an input to the payment interface 304 (e.g., selecting an "OK" or "Confirm"

button). The issuer system 314 may receive the confirmation from the user's payment interface 304 in a message.

In step 139, in response to receiving confirmation from the user, the issuer system 314 may generate a consent identifier corresponding to the intent identifier and transmit a message to the A2A management system 312 to continue with processing the transaction. For example, the issuer system 314 may generate a message including, but not limited to, the consent identifier, the intent identifier, and/or the like and transmit the message to the A2A management system 312 via the second API 322.

In step 140, data for processing the transaction may be transmitted to the settlement system 316 and/or transaction processing system 318. For example, the A2A management system 312 may translate (e.g., correspond) the payer identifier to a payer PAN and the payee identifier to a payee PAN, and transmit the payer PAN and the payee PAN to the settlement system 316 and/or transaction processing system 318 for completion of the transaction. The message from the A2A management system 312 may further include the transaction amount. In step 141, the settlement system 316 and/or transaction processing system 318 may transmit a message back to the A2A management system 312 indicating that the transaction has been approved (e.g., STIP approved).

In step 142, the A2A management system 312 may trigger payment from the user's account with the issuer institution to the payee's account with the payee institution. For example, A2A management system 312 may communicate with the payee institution system 319 via the first API 321 to complete processing of the transaction for payment from the user to the payee. In response, in step 143, the payee institution system 319 may transmit a success message to the A2A management system 312 via the first API 321, indicating that the transaction was successful.

In step 144, a success message may be transmitted to the receiver interface 320. For example, in response to communicating with the A2A management system 312 in steps 142 and 143, the payee institution system 319 may transmit a message to the receiver interface 320 to notify the payee that the transaction was completed. The receiver interface 320 may be updated to display a notification indicating that the transaction was successful.

In step 145, a success message may also be transmitted to the issuer system 314. For example, the A2A management system 312 may transmit a message via the second API 322 to the issuer system 314 indicating that the transaction was successful.

In step 146, a success message may be further transmitted to the payment interface 304. For example, issuer system 314, in response to receiving a success message from the A2A management system 312, may trigger a message to the payment interface 304 indicating that the transaction was successful. The payment interface 304 may be updated to display a notification indicating that the transaction was successful.

In step 148A, a first settlement report may be transmitted to the payee institution system 319. For example, the settlement system 316 may transmit a first settlement report (e.g., a message including data of metrics pertaining to one or more transactions settled in relation to the payee institution system 319) to the payee institution system 319. In some non-limiting embodiments or aspects, settlement system 316 may aggregate a plurality of settlement reports, including the first settlement report, for transmission at regular intervals (e.g., end of day), including by SMS.

In step 148B, a second settlement report may be transmitted to the issuer system 314. For example, the settlement system 316 may transmit a second settlement report (e.g., a message including data of metrics pertaining to one or more transactions settled in relation to the issuer system 314) to the issuer system 314. In some non-limiting embodiments or aspects, settlement system 316 may aggregate a plurality of settlement reports, including the second settlement report, for transmission at regular intervals (e.g., end of day), including by SMS.

In steps 149A and 149B, net settlement for the transaction may be completed. For example, settlement system 316, through communications with issuer system 314 and payee institution system 319, may complete settlement for the transaction by crediting the account of the payee for the transaction amount, and by debiting the issuer account of the user for the transaction amount.

Referring now to FIG. 8, illustrated is a diagram of example components of device 400. Device 400 may correspond to one or more devices of client device 302, payment gateway 308, acquirer system 310, computing devices operating a payment interface 304, merchant interface 306, and/or receiver interface 320, A2A management system 312, issuer system 314, settlement system 316, transaction processing system 318, payee institution system 319, and/or one or more communication networks for communication therebetween. In some non-limiting embodiments or aspects, one or more devices of the foregoing may include at least one device 400 and/or at least one component of device 400. As shown in FIG. 8, device 400 may include bus 402, processor 404, memory 406, storage component 408, input component 410, output component 412, and communication interface 414.

Bus 402 may include a component that permits communication among the components of device 400. In some non-limiting embodiments or aspects, processor 404 may be implemented in hardware, software, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read-only memory (ROM), and/or another type of dynamic or static storage device (e.g., flash memory, magnetic memory, optical memory, etc.) that stores information and/or instructions for use by processor 404.

Storage component 408 may store information and/or software related to the operation and use of device 400. For example, storage component 408 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 410 may include a component that permits device 400 to receive information, such as via user input (e.g., a touchscreen display, a keyboard, a keypad, a mouse, a button, a switch, a microphone, a camera, etc.). Additionally or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.).

Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 406 and/or storage component 408 may include data storage or one or more data structures (e.g., a database, and/or the like). Device 400 may be capable of receiving information from, storing information in, communicating information to, or searching information stored in the data storage or one or more data structures in memory 406 and/or storage component 408. For example, the information may include encryption data, input data, output data, transaction data, account data, or any combination thereof.

The number and arrangement of components shown in FIG. 8 are provided as an example. In some non-limiting embodiments or aspects, device 400 may include additional components, fewer components, different components, or differently arranged components than those shown in FIG. 8. Additionally or alternatively, a set of components (e.g., one or more components) of device 400 may perform one or more functions described as being performed by another set of components of device 400.

Referring now to FIG. 9, illustrated is a flow diagram of a method 500 for an A2A transaction network. One or more steps of method 500 may be executed by one or more processors of transaction processing system 318, including the A2A management system 312 and/or settlement system 316. Additionally or alternatively, one or more steps of method 500 may be executed (e.g., completely, partially, and/or the like) by another system, another device, another group of systems, or another group of devices, separate from or including transaction processing system 318, such as payment gateway 308, acquirer system 310, issuer system

314, and/or the like. Each step of method 500 may be performed by a same or different processor.

In step 502, a transaction request may be received via a first API 321. For example, A2A management system 312 may receive, from a payment gateway 308 and/or an acquirer system 310 via a first API 321, a transaction request for a transaction. The transaction request may include a transaction amount, an issuer identifier, and/or a merchant identifier. In some non-limiting embodiments or aspects, the transaction request received from the payment gateway 308 and/or the acquirer system 310 via the first API 321 may be originated by a merchant interface 306 of a client device 302 of a user associated with an issuer account.

In step 504, an issuer URL may be determined. For example, A2A management system 312 may determine, based on the issuer identifier, an issuer URL. The issuer URL may be stored in a database in association with the issuer identifier. The issuer URL may be predetermined and provided by an issuer system 314. In some non-limiting embodiments or aspects, the issuer URL may be based on the client device 302, the merchant interface 306, and/or the payment interface 304. For example, if the client device 302 is a mobile device, and the merchant interface 306 is a web browser accessing a merchant's online store, then the issuer URL may be a web address for an issuer account management website.

In step 506, an intent identifier may be generated. For example, the A2A management system 312 may generate an intent identifier associated with the transaction request. The intent identifier may be used to verify that two devices are referring to a same transaction. The intent identifier may also be used as a lookup to identify a transaction among a plurality of transactions being processed by the A2A management system 312.

In step 508, the issuer URL and the intent identifier may be transmitted to the payment gateway 308 and/or the acquirer system 310 via the first API 321. For example, the A2A management system 312 may, after determining the issuer URL and generating the intent identifier, transmit the issuer URL and the intent identifier to the payment gateway 308 and/or the acquirer system 310 via the first API 321 integrated with the payment gateway 308 and/or the acquirer system 310. The issuer URL transmitted to the payment gateway 308 and/or the acquirer system 310 may be forwarded to a merchant interface 306 of the client device 302 to trigger the payment interface 304 (e.g., load, display, redirect, etc.).

In step 510, the intent identifier, transaction amount, and merchant identifier may be transmitted to the issuer system 314 via a second API 322. For example, the A2A management system 312 may, after generation of the intent identifier, transmit the intent identifier, the transaction amount received in the transaction request, and the merchant identifier received in the transaction request to the issuer system 314 via the second API 322 integrated with the issuer system 314.

In step 512, an authenticated consent identifier and payer identifier may be received from the issuer system 314 via the second API 322. For example, the A2A management system 312 may receive an authenticated consent identifier representative of the transaction associated with the intent identifier being reviewed and approved by a user authenticated to the issuer system 314. The A2A management system 312 may also receive a payer identifier, which may be a globally unique identifier associated with an issuer account. In some non-limiting embodiments or aspects, the payer identifier may include a unique account identifier, an institution identifier associated with the issuer system 314, and a regional identifier. Additionally or alternatively, the unique account identifier may be a device address of the client device 302. The authenticated consent identifier may be originated by a payment interface 304 of the client device 302, by being generated in response to user authentication using the payment interface 304.

In step 514, a merchant account identifier and an issuer account identifier may be determined. For example, the A2A management system 312 may determine a merchant account identifier associated with the merchant identifier (e.g., received in the transaction request). By way of further example, the A2A management system 312 may determine an issuer account identifier associated with the payer identifier (e.g., received from the issuer system 314). In some non-limiting embodiments or aspects, step 514 may be triggered in response to the A2A management system 312 receiving the authenticated consent identifier. Additionally or alternatively, the A2A management system 312 may correspond the authenticated consent identifier with the intent identifier before triggering step 514.

In step 516, the merchant account identifier and the issuer account identifier may be transmitted in a combined authorization and settlement message. For example, the A2A management system 312 may transmit the transaction amount, the merchant account identifier, and the issuer account identifier in a combined authorization and settlement message configured to cause settlement for the transaction amount between a merchant account associated with the merchant account identifier and an issuer account associated with the issuer account identifier. In some non-limiting embodiments or aspects, step 516 may be triggered in response to the A2A management system 312 receiving the authenticated consent identifier. Additionally or alternatively, the A2A management system 312 may correspond the authenticated consent identifier with the intent identifier before triggering step 516.

Figure 10:
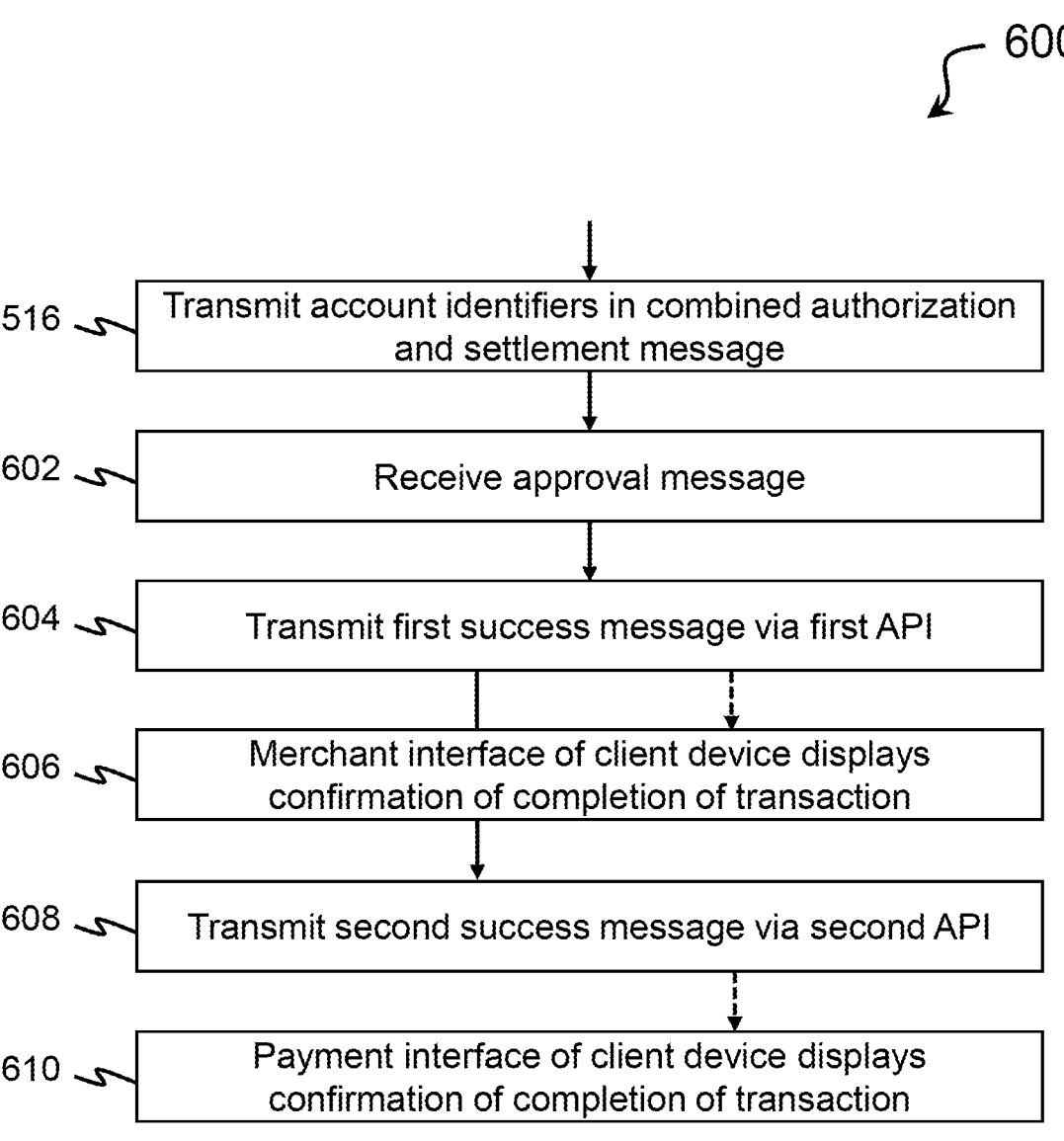
FIG. 10 is a flowchart illustrating a non-limiting embodiment or aspect of a method for an A2A transaction network, according to the principles of the present disclosure.

Referring now to FIG. 10, illustrated is a flow diagram of a method 600 for an A2A transaction network. One or more steps of method 600 may be executed by one or more processors of transaction processing system 318, including the A2A management system 312 and/or settlement system 316. Additionally or alternatively, one or more steps of method 600 may be executed (e.g., completely, partially, and/or the like) by another system, another device, another group of systems, or another group of devices, separate from or including transaction processing system 318, such as payment gateway 308, acquirer system 310, issuer system 314, and/or the like. Each step of method 600 may be performed by a same or different processor.

In continuance of the steps shown in FIG. 9, in step 516, the merchant account identifier and the issuer account identifier may be transmitted in a combined authorization and settlement message. For example, the A2A management system 312 may transmit the transaction amount, the merchant account identifier, and the issuer account identifier in a combined authorization and settlement message configured to cause settlement for the transaction amount between a merchant account associated with the merchant account identifier and an issuer account associated with the issuer account identifier.

In step 602, an approval message may be received. For example, the A2A management system 312 may receive an approval message associated with approval of the combined authorization and settlement message. In some non-limiting embodiments or aspects, the settlement system 316 may transmit the approval message to the A2A management system 312. The approval message may represent an assertion that the transaction will be settled and cleared between the transacting parties.

In step 604, a first success message may be transmitted via the first API 321. For example, the A2A management system 312 may transmit a first success message to the payment gateway 308 and/or acquirer system 310 via the first API 321. In some non-limiting embodiments or aspects, the first success message may be routed as is, modified, or replaced by another first success message to the merchant interface 306 of the client device 302.

In step 606, the merchant interface 306 of the client device 302 may display confirmation of completion of the transaction. For example, the merchant interface 306 may receive the first success message and generate a confirmation message on the display of the client device 302.

In step 608, a second success message may be transmitted via the second API 322. For example, the A2A management system 312 may transmit a second success message to issuer system 314 via the second API 322. In some non-limiting embodiments or aspects, the second success message may be routed as is, modified, or replaced by another second success message to the payment interface 304 of the client device 302.

In step 610, the payment interface 304 of the client device 302 may display confirmation of completion of the transaction. For example, the payment interface 304 may receive the second success message and generate a confirmation message on the display of the client device 302.

Referring now to FIG. 11, illustrated is a flow diagram of a method 700 for an A2A transaction network. One or more steps of method 700 may be executed by one or more processors of transaction processing system 318, including the A2A management system 312 and/or settlement system 316. Additionally or alternatively, one or more steps of method 700 may be executed (e.g., completely, partially, and/or the like) by another system, another device, another group of systems, or another group of devices, separate from or including transaction processing system 318, such as payment gateway 308, acquirer system 310, issuer system 314, and/or the like. Each step of method 700 may be performed by a same or different processor.

In continuance of the steps shown in FIG. 9, in step 516, the merchant account identifier and the issuer account identifier may be transmitted in a combined authorization and settlement message. For example, the A2A management system 312 may transmit the transaction amount, the merchant account identifier, and the issuer account identifier in a combined authorization and settlement message configured to cause settlement for the transaction amount between a merchant account associated with the merchant account identifier and an issuer account associated with the issuer account identifier. The settlement system 316 of the transaction processing system 318 may receive the combined authorization and settlement message.

In step 702, the transaction may be settled. For example, the settlement system 316 may settle the transaction as a credit to the merchant account for the transaction amount and a debit from the issuer account for the transaction amount. The settlement system 316 may settle the transaction by communicating with the issuer system 314, the payment gateway 308, and/or the acquirer system 310.

In step 704, settlement reports may be transmitted. For example, the settlement system 316 may generate and transmit a first settlement report associated with the transaction to the payment gateway 308 and/or acquirer system 310. By way of further example, the settlement system 316 may generate and transmit a second settlement report associated with the transaction to the issuer system 314. In some non-limiting embodiments or aspects, the first settlement report may be transmitted via the first API 321, and the second settlement report may be transmitted via the second API 322.

Referring now to FIG. 12, illustrated is a schematic diagram of a party identifier 800 for an A2A transaction network. The party identifier 800 may be used as a payer identifier (e.g., of a user), a payee identifier (e.g., of a merchant, of a personal payee), and/or the like. The party identifier 800 may include a unique account identifier 802, an institution identifier 804, and a regional identifier 806. The party identifier 800 may be a globally unique identifier per account (e.g., banking account) and may be used for sending and/or receiving payments. In some non-limiting embodiments or aspects, the party identifier 800 may be generated for a user in the A2A transaction network at the time of onboarding the user with its respective institution (e.g., financial institution, which may be an issuer or acquirer) and account. The A2A management system 312 may map each new party identifier 800 to an account identifier (e.g., PAN) of the account it may represent. In some non-limiting embodiments or aspects, the party identifier 800 may be associated with more than one account. The party identifier 800, as shown, provides the technical benefits of data obfuscation, accuracy in transacting, and global system enablement.

The unique account identifier 802 may be unique to the issuing institution, the A2A network, or globally. In some non-limiting embodiments or aspects, the individual or entity associated with the identifier may select the unique account identifier 802. In some non-limiting embodiments or aspects, the unique account identifier 802 may be a device address (e.g., a phone number, a MAC address, etc.) of a client device 302. The unique account identifier 802 may be a local identifier within the domain of the institution identifier 804.

The institution identifier 804 may be associated with and identify a financial institution associated with the account for which the party identifier 800 is associated. The institution identifier 804 may be associated with an issuer and/or issuer system 314. The institution identifier 804 may be associated with an acquirer and/or acquirer system 310.

The regional identifier 806 may be associated with and identify a deployment area, country, group of countries, region, and/or the like, designating the location of the account associated with the party identifier 800. The regional identifier 806 may be useful as a delineator for deployment of the A2A transaction network in cross-border transactions.

The party identifier 800 may include a concatenation of the unique account identifier 802, the institution identifier 804, and the regional identifier 806, in the format as shown in FIG. 12. For example, a user may open an account with an issuer institution in Canada; therefore, the regional identifier 806 may be "ca". The user may have a client device 302 having a phone number of 416-367-8472 and may designate their unique account identifier 802 as "4163678472". The financial institution of the account may be the Toronto-Dominion Bank, for which the institution identifier 804 may be "tdb". In the foregoing illustration, the party identifier 800 may, therefore, be "4163678472@tdb.ca", which may be a globally unique identifier. When using the party identifier 800, multiple aliases (e.g., alternative identifiers) may be mapped with the same party identifier 800, to allow flexibility in implementing the A2A transaction network, and to obfuscate the actual party identifier 800 associated with a party. It will be appreciated that the foregoing examples are for the purpose of illustration only, and that other configurations and arrangements are possible.

With further reference to the foregoing figures, P2M transactions using the foregoing systems and methods may be merchant initiated or payer initiated.

In some non-limiting embodiments or aspects, for merchant-initiated P2M transactions, the payer may use a single client device 302 for transacting. For example, the intent for the transaction (e.g., intent identifier) may originate from the merchant interface 306 (e.g., merchant application, browser accessing merchant website) of the client device 302. The merchant interface 306 may, for example, include a "Pay by Bank" option at checkout. The merchant interface 306 may receive an issuer URL from the A2A transaction network and invoke an associated payment interface 304 (e.g., banking application, banking website, etc.). The user may authenticate themselves (e.g., sign-in) to the payment interface 304. The consent for the transaction (e.g., consent identifier) may originate from the payment interface 304 (e.g., financial institution application, browser accessing financial institution website) on the same client device 302. For example, the payment interface 304 may display the transaction amount for the transaction, and the user may select one or more linked accounts to fund the transaction, thereafter submitting a confirmation for payment. Notification of completion of the transaction may then be sent to the merchant system, the payment interface 304 of the client device, and the merchant interface 306 of the client device 302.

In some non-limiting embodiments or aspects, for merchant-initiated P2M transactions, the payer may use multiple client devices 302 for transacting. For example, the intent for the transaction (e.g., intent identifier) may originate from the merchant interface 306 (e.g., browser accessing merchant website) of a first client device 302 (e.g., a desktop computer), and the consent for the transaction (e.g., consent identifier) may originate from the payment interface 304 (e.g., financial institution application, browser accessing financial institution website) on a second client device 302 (e.g., a mobile device). Notification of completion of the transaction may then be sent to the merchant system, payment interface 304 on the second client device 302, and the merchant interface 306 on the first client device 302.

In some non-limiting embodiments or aspects, for payer-initiated P2M transactions, the payer may use a single client device 302 for transacting. For example, the intent for the transaction (e.g., intent identifier) may originate from the payment interface 304 (e.g., a payment application) on a client device 302 (e.g., a mobile device). For example, the client device 302 may scan a code, the client device 302 may receive a communication with transaction information, the user may enter transaction information into the client device 302, and/or the like. The payment interface 304 may take the place of the merchant interface 306 for payer-initiated P2M transactions. Consent for the transaction (e.g., consent identifier) may originate from the payment interface 304 on the client device 302. Notification of completion of the transaction may then be sent to the merchant system.

In some non-limiting embodiments or aspects, a payer-initiated P2M transaction flow may be implemented in a system including an internet-of-things (IOT) enabled computing device that facilitates the payment interface 304 and/or merchant interface 306. For example, the merchant checkout process may be enabled for use with an IOT device, such as a virtual assistance device (e.g., Amazon Echo®, Google Home®, etc.). By way of further example, the user may initiate the transaction through a voice command (e.g., by saying "Pay with my account", which may be detected by a microphone of the IOT device). After initiation, the P2M transaction flow may proceed according to the steps shown in any of FIGS. 1-5.

With further reference to the foregoing figures, P2P transactions using the foregoing systems and methods may be payer or payee initiated.

In some non-limiting embodiments or aspects, for payer-initiated P2P transactions, the intent for the transaction (e.g., intent identifier) may originate from the payer's payment interface 304 on the payer's client device 302 (e.g., in substitution of the merchant interface 306 shown in FIG. 1). For example, the payer may enter information identifying the payee for the transaction (e.g., selecting the payee from a list of contacts). The payer may input a transaction amount to send and select one or more linked accounts for funding the transaction. The consent for the transaction (e.g., consent identifier) may also originate from the payer's payment interface 304 on the payer's client device 302. The payer may submit the transaction request, and after processing in the system shown in FIG. 1, notification of completion of the transaction may then be sent to the payee's payment interface 304 (also referred to herein as a "receiver interface") on the payee's client device 302. The payee's payment interface 304 may display the transaction amount, information about the payer, and the transaction may be reflected in the balance shown in the payee's payment interface 304.

In some non-limiting embodiments or aspects, for payee-initiated P2P transactions, the intent for the transaction (e.g., intent identifier) may originate from the payee's payment interface 304 on the payee's client device 302 (e.g., in substitution of the merchant interface 306 shown in FIG. 1). For example, the payee may enter information identifying the payer for the transaction (e.g., selecting the payer from a list of contacts). The payee may input a transaction amount to receive and submit the request for sending to the payer. The transaction status may show as "pending" in the payee's payment interface 304 until the transaction is completed. The consent for the transaction (e.g., consent identifier) may originate from the payer's payment interface 304 on the payer's client device 302. The payer's client device 302 may receive a request for the transaction and display the request in the payment interface 304. The payer may confirm the amount of the transaction and select one or more linked accounts for funding the transaction, thereafter submitting the transaction request. Notification of completion of the transaction may then be sent to the payee's payment interface 304 on the payee's client device 302.

In some non-limiting embodiments or aspects, the user may engage in an enrollment and/or onboarding process to enable use of the described A2A transaction network. For example, the user may enroll with the A2A transaction network prior to initiating a transaction in the A2A transaction network. The user may use the payment interface 304 on a client device 302 to provide user credentials (e.g., through a log in or sign-up process), at which point the user may be prompted to enroll with the A2A transaction network. The user may interact with the payment interface 304 to generate a new user identifier, which may be transmitted from the payment interface 304 to the issuer system 314. The issuer system 314 may verify and forward the user identifier to the A2A management system 312, which may associate the user identifier with an account identifier (e.g., a PAN), or otherwise generate an account identifier that may be associated with the user identifier. The A2A management system 312 may store the user identifier in association with (e.g., linked to, corresponded to, in reference to, etc.) the account identifier. After associating the user identifier with an account identifier, the A2A management system 312 may generate and transmit a message back to the issuer system 314 that includes the user identifier, account identifier, and/or the like. The issuer system 314 may then map the account identifier with the user identifier in one or more storage devices associated with the issuer system 314. The issuer system 314 may then transmit a success message to the payment interface 304 to notify the user that the user has been successfully enrolled in the A2A transaction network.

By way of further example, the user may enroll with the A2A transaction network as part of an initial transaction process flow. For example, in any of the P2M or P2P transaction flows described herein, when the user is prompted to authenticate a transaction, the user may be likewise prompted to enroll with the A2A transaction network to complete the transaction. In such a scenario, before the transaction is formally authenticated, the user may interact with the payment interface 304 to generate a new user identifier, which may trigger the issuer system 314 and/or A2A management system 312 to generate/associate a new account identifier with the user identifier, store the user identifier in association with the account identifier, and notify the user that the user has been successfully enrolled (e.g., as described above).

In some non-limiting embodiments or aspects, a merchant may engage in an enrollment and/or onboarding process to enable use of the described A2A transaction network. For example, the merchant may use a computing device to generate/select a new merchant identifier, which may be communicated to an acquirer system 310 and/or payment gateway 308. The acquirer system 310 and/or payment gateway 308 may forward the new merchant identifier to the A2A management system 312, which may generate and/or identify a merchant account identifier and associate the merchant account identifier with the new merchant identifier. The A2A management system 312 may store the merchant account identifier in association with the new merchant identifier. The A2A management system 312 may then transmit a message back to the acquirer system 310 and/or payment gateway 308 including the merchant identifier, merchant account identifier, and/or the like. The acquirer system 310 and/or payment gateway 308 may also map the merchant identifier to the merchant account identifier in one or more storage devices associated with the acquirer system 310 and/or payment gateway 308. The acquirer system 310 and/or payment gateway 308 may then transmit a success message to the computing device of the merchant to notify the merchant that the merchant has been successfully enrolled in the A2A transaction network.

With further reference to the foregoing figures, and in some non-limiting embodiments or aspects, the depicted transaction flows may be executed in cross-border transaction scenarios where the paying party and the receiving party are located in different operational territories (e.g., in different countries). In such a scenario, communications routed through the first API 321 may be forwarded to a first gateway (e.g., a routing system, such as an outbound gateway), which may further route the communications to a first workflow orchestrator. A workflow orchestrator may be a system configured to translate identifiers using local account identifier directories associated with the respective operational territory. The first workflow orchestrator in a first operational territory may communicate with a second workflow orchestrator in a second operational territory to allow transfer of communications between the transacting parties. The second workflow orchestrator may receive the communications from the first workflow orchestrator and route the communications to a second gateway (e.g., a routing system, such as an inbound gateway), which may further route the communications through the second API 322 to the relevant computing device.

Referring now to FIGS. 13-18, depicted are a series of illustrations of interfaces displayed on computing devices that are interacting in a payer-initiated P2P transaction process of an A2A transaction network, according to non-limiting embodiments or aspects. It will be appreciated that the illustrations are provided for exemplary purposes only and are not to be taken as limiting on the disclosure. It will also be appreciated that the interfaces represent user-facing screens and do not represent all possible steps that are not visible to the users of the system.

Figure 13:
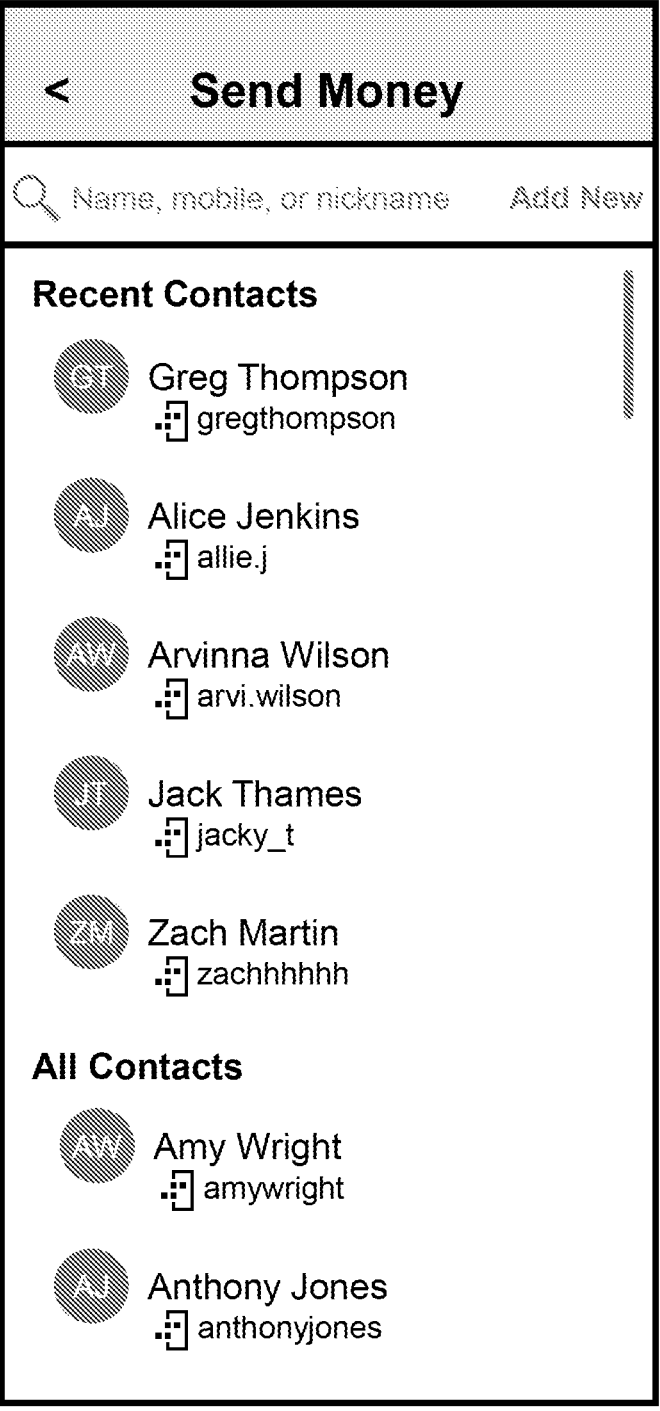
FIG. 13 is an illustration of an interface on a computing device interacting in a payer-initiated P2P transaction process in an A2A transaction network, according to principles of the present disclosure.

With specific reference to FIG. 13, depicted is an illustration of a first displayed screen in a payment interface 304 on a client device 302 of a user, in a first step of a payer-initiated P2P transaction process. As shown, the user (referred to in connection with FIGS. 13-18 as the exemplary "Johnathan Smith") is presented with a list of contacts that may be selected for the sending of money for a payment transaction. The user may select a payee to receive payment in the payment interface 304. Options of payees may be presented in the form of "Recent Contacts" in addition to "All Contacts", to assist with identifying contacts that are likely recipients based on recency. The payee contacts may be shown alongside user identifiers, such as usernames (e.g., "gregthompson" for "Greg Thompson"). For illustration, the user may select the payee "Greg Thompson" from the list of options by touching the option on their client device 302 screen. Doing so may update the displayed screen in the payment interface 304 to the second displayed screen shown in FIG. 14.

Figure 14:
FIG. 14 is an illustration of an interface on a computing device interacting in a payer-initiated P2P transaction process in an A2A transaction network, according to principles of the present disclosure.

With specific reference to FIG. 14, depicted is an illustration of a second displayed screen in a payment interface 304 on a client device 302 of the user, in a second step of a payer-initiated P2P transaction process. As shown, the user has selected the payee "Greg Thompson", and the user is now prompted to enter a transaction amount in the center of the screen (e.g., shown where the user has typed in "$15.00"). By way of further example, the user may be presented with the option to enter additional transaction details (e.g., shown as a text field titled "Note", where the user has entered "For pizza") and select a funding account for making the payment (e.g., shown as a dropdown field titled "Pay using", where the user has selected a "FDNB Savings" account). Funding account details may be previously entered by the user in a separate screen, such that the funding account option is already available, or the user may enter the funding account details in the depicted screen. For illustration, the user may touch the button titled "Pay $15.00" to cause the payment transaction to "Greg Thompson" to be executed, which may trigger the displayed screen in the payment interface 304 to update to a third displayed screen shown in FIG. 15.

Figure 15:
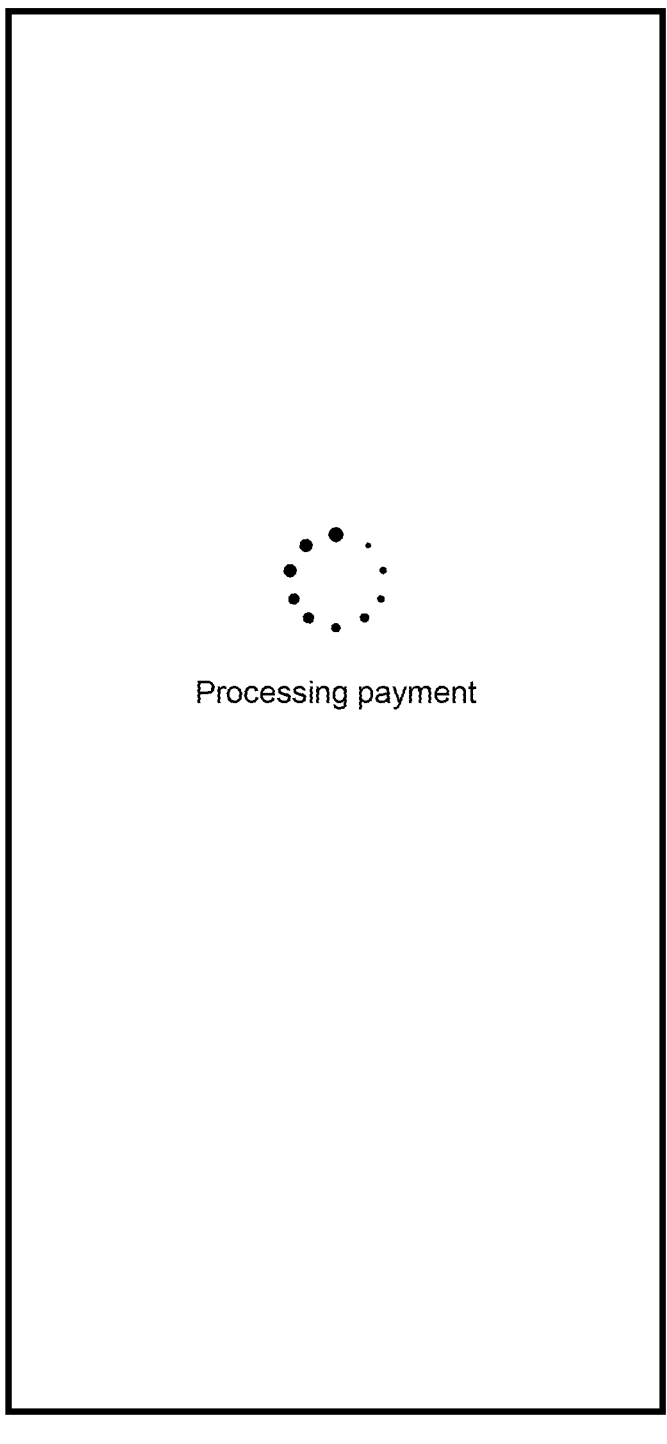
FIG. 15 is an illustration of an interface on a computing device interacting in a payer-initiated P2P transaction process in an A2A transaction network, according to principles of the present disclosure.

With specific reference to FIG. 15, depicted is an illustration of a third displayed screen in a payment interface 304 on a client device 302 of the user, in an intermediary step of a payer-initiated P2P transaction process. As shown, a "Processing payment" hold screen is displayed to the user. The third displayed screen of FIG. 15 may also be overlaid on the screen of FIG. 14, such as in a semi-transparent panel covering the second displayed screen. The "Processing payment" hold screen may be shown while the A2A transaction network works to complete the transaction process behind the scenes. For example, one or more steps shown in FIG. 6 between the issuer system 314, A2A management system 312, payee institution system 319, settlement system 316, and/or transaction processing system 318 may be executed while the "Processing payment" hold screen is displayed in the payment interface 304. For illustration, after the payment transaction from the user to the payee is completed, the payment interface 304 may be updated to a fourth displayed screen shown in FIG. 16.

Figure 16:
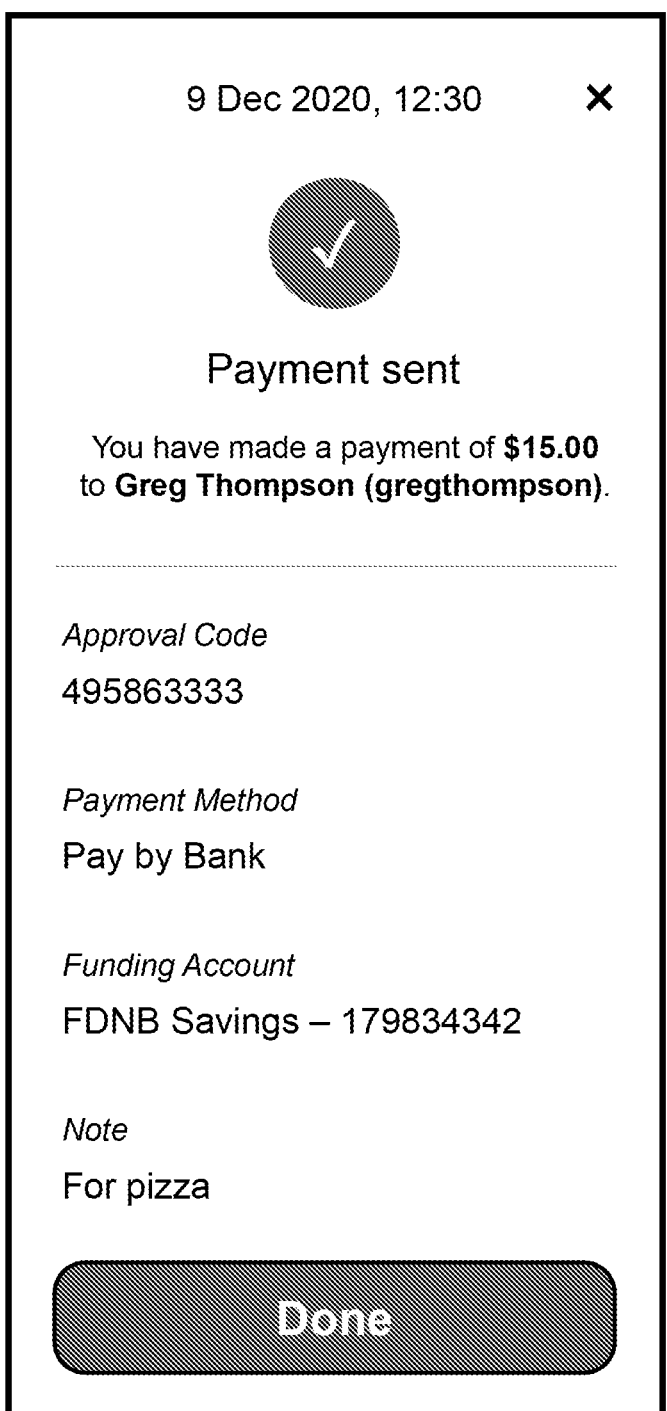
FIG. 16 is an illustration of an interface on a computing device interacting in a payer-initiated P2P transaction process in an A2A transaction network, according to principles of the present disclosure.

With specific reference to FIG. 16, depicted is an illustration of a fourth displayed screen in a payment interface 304 on a client device 302 of the user, in a post-payment step of a payer-initiated P2P transaction process. For example, the user may be presented with a confirmation message indicating that the payment was sent to the payee, including additional transaction data, such as the transaction time, transaction amount, confirmation (approval) code, payment method, funding account, transaction details (e.g., "note"), and/or the like. For illustration, when the user is done reviewing the transaction data of the completed payment to the payee, the user may close the active window shown in the payment interface 304 by clicking the "Done" button or selecting the "X" icon.

Figure 17:
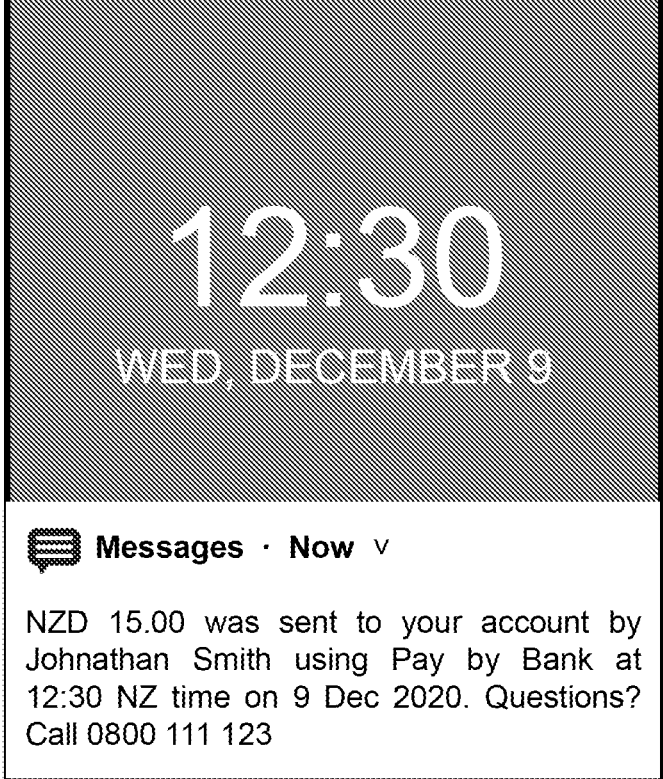
FIG. 17 is an illustration of an interface on a computing device interacting in a payer-initiated P2P transaction process in an A2A transaction network, according to principles of the present disclosure.

With specific reference to FIG. 17, depicted is an illustration of a first displayed screen on a computing device of the payee, in a post-payment step of a payer-initiated P2P transaction process. For example, the payee's computing device may receive a push notification associated with a confirmation message of receiving payment from the user. By way of example, the payee's home screen may display a notification window containing transaction data, including, but not limited to, transaction amount, payer (user) name, transaction method, transaction time, contact information, and/or the like. For illustration, the payee may click on the notification window and unlock their computing device to access a second displayed screen in a receiver interface 320 on the payee computing device, as shown in FIG. 18.

Figure 18:
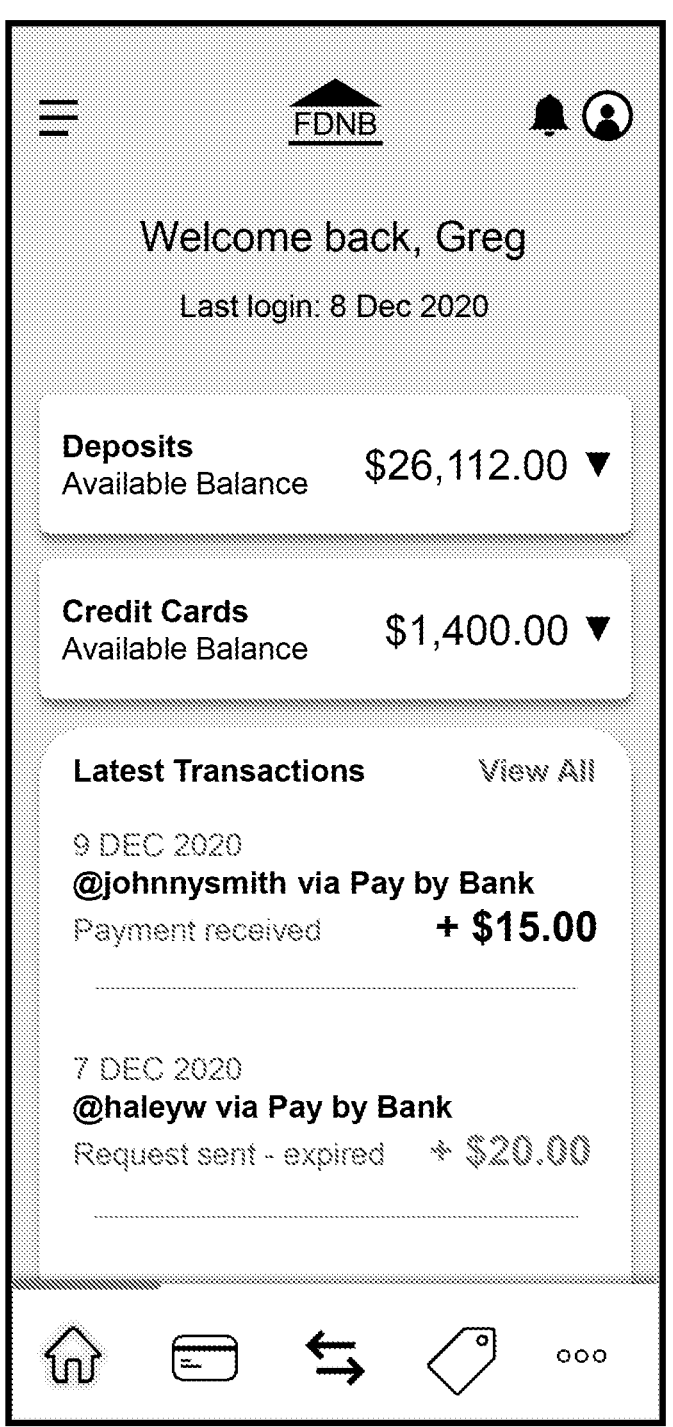
FIG. 18 is an illustration of an interface on a computing device interacting in a payer-initiated P2P transaction process in an A2A transaction network, according to principles of the present disclosure.

With specific reference to FIG. 18, depicted is an illustration of a second displayed screen in a receiver interface 320 on the payee computing device, in a post-payment step of a payer-initiated P2P transaction process. For example, the payee may open an application on their computing device associated with their payee institution system 319 to view more information about the received payment. The application may also be opened automatically upon clicking the notification window on the home screen of the payee computing device. For illustration, the application may show payment account information, including latest transactions, which may include transaction data of the payment received from the user. As shown, the payment initiated by user "@johnnysmith" for the amount of $15.00 is displayed among the latest transactions of the payee.

Referring now to FIGS. 19-25, depicted are a series of illustrations of interfaces displayed on computing devices that are interacting in a payee-initiated P2P transaction process of an A2A transaction network, according to non-limiting embodiments or aspects. It will be appreciated that the illustrations are provided for exemplary purposes only and are not to be taken as limiting on the disclosure. It will also be appreciated that the interfaces represent user-facing screens and do not represent all possible steps that are not visible to the users of the system.

Figure 19:
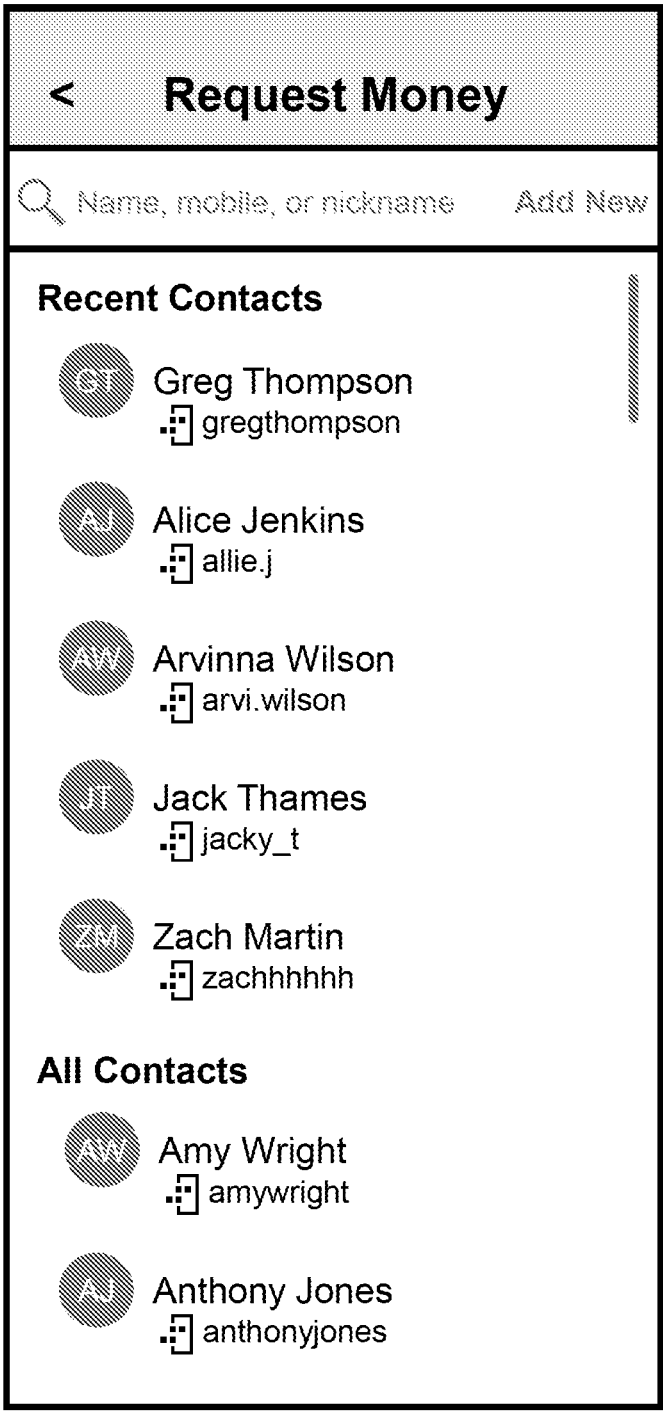
FIG. 19 is an illustration of an interface on a computing device interacting in a payee-initiated P2P transaction process in an A2A transaction network, according to principles of the present disclosure.

With specific reference to FIG. 19, depicted is an illustration of a first displayed screen in a receiver interface 320 on a computing device of a payee in a first step of a payee-initiated P2P transaction process. As shown, the payee (referred to in connection with FIGS. 19-25 as the exemplary "Johnathan Smith") is presented with a list of contacts that may be selected for the requesting of money for a payment transaction. The payee may select a payer from which to request payment in the receiver interface 320. Options of payers may be presented in the form of "Recent Contacts" in addition to "All Contacts", to assist with identifying contacts that are likely payers based on recency. The contacts may be shown alongside user identifiers, such as usernames (e.g., "gregthompson" for "Greg Thompson"). For illustration, the payee may select the payer "Alice Jenkins" from the list of options by touching the option on their computing device screen. Doing so may update the displayed screen in the receiver interface 320 to the second displayed screen shown in FIG. 20.

Figure 20:
FIG. 20 is an illustration of an interface on a computing device interacting in a payee-initiated P2P transaction process in an A2A transaction network, according to principles of the present disclosure.

With specific reference to FIG. 20, depicted is an illustration of a second displayed screen in a receiver interface 320 on a computing device of the payee, in a second step of a payee-initiated P2P transaction process. As shown, the payee has selected the payer "Alice Jenkins", and the payee is now prompted to enter a transaction amount in the center of the screen (e.g., shown where the payee has typed in "$95.50"). By way of further example, the payee may be presented with the option to enter additional transaction details (e.g., shown as a text field titled "Note", where the user has entered "For wedding invite illustration"). For illustration, the payee may touch the button titled "Request $95.50" to cause a payment transaction request to "Alice Jenkins" to be executed, which may trigger the displayed screen in the receiver interface 320 to update to a third displayed screen shown in FIG. 21.

Figure 21:
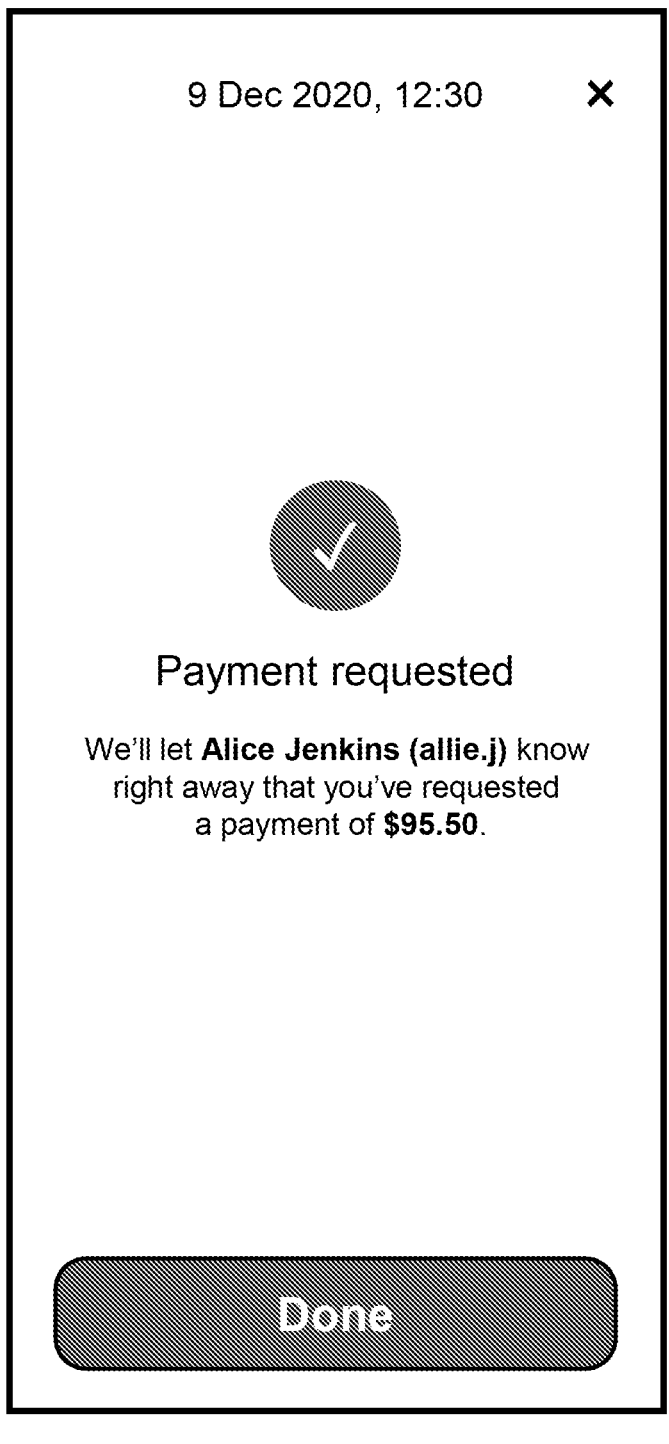
FIG. 21 is an illustration of an interface on a computing device interacting in a payee-initiated P2P transaction process in an A2A transaction network, according to principles of the present disclosure.

With specific reference to FIG. 21, depicted is an illustration of a third displayed screen in a receiver interface 320 on a computing device of the payee, in a post-request-transmission step of a payee-initiated P2P transaction process. For example, the payee may be presented with a confirmation message indicating that the payment request was sent to the payer, including additional transaction data, such as the transaction time, transaction amount, and/or the like. For illustration, when the payee is done reviewing the transaction data of the completed request to the payer, the payee may close the active window shown in the receiver interface 320 by clicking the "Done" button or selecting the "X" icon.

Figure 22:
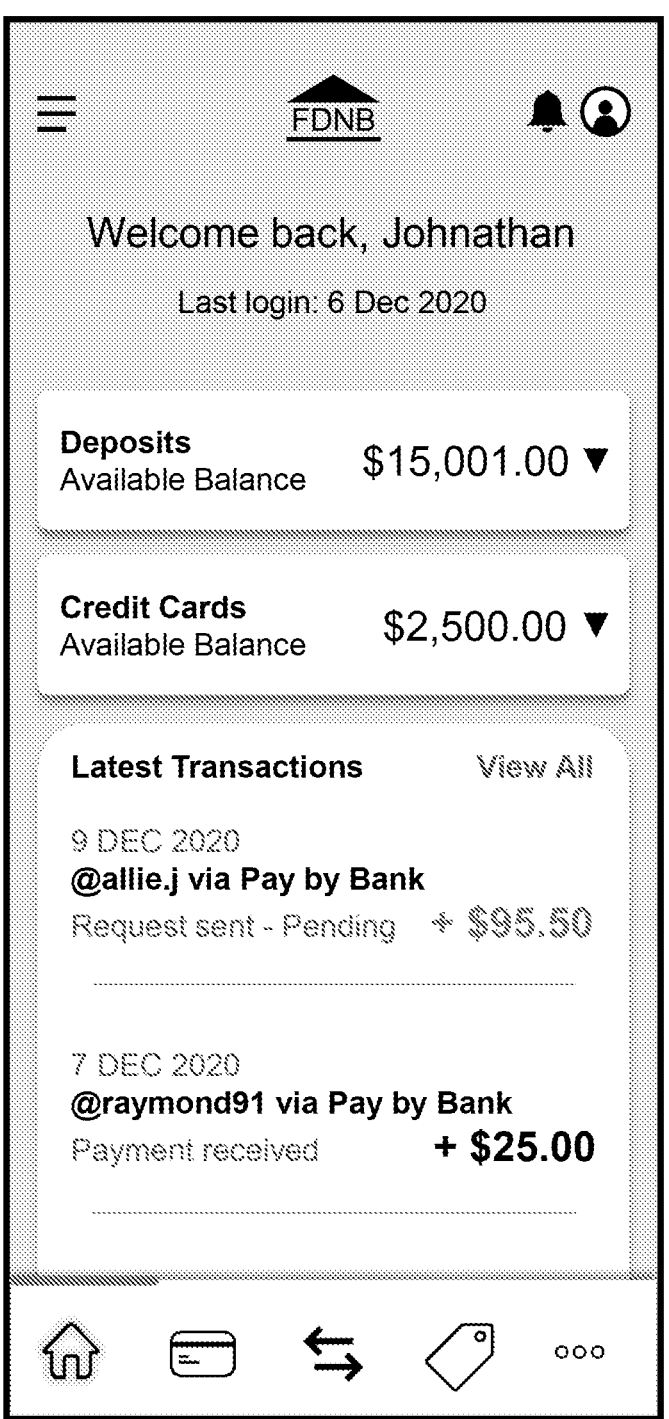
FIG. 22 is an illustration of an interface on a computing device interacting in a payee-initiated P2P transaction process in an A2A transaction network, according to principles of the present disclosure.

With specific reference to FIG. 22, depicted is an illustration of a fourth displayed screen in a receiver interface 320 on a computing device of the payee, in a post-request-transmission step of a payee-initiated P2P transaction process. The fourth displayed screen may be shown automatically in response to the payee exiting the third displayed screen shown in FIG. 21, or the payee may specifically seek out the fourth displayed screen to monitor the progress of the payment transaction request. For example, the payee may open an application on their computing device associated with their payee institution system 319 to view more information about the requested payment. For illustration, the application may show payment account information, including latest transactions, which may include transaction data of the payment requested from the payer. As shown, the payment requested of payer "@allie.j" for the amount of $95.50 is displayed among the latest transactions of the payee, with the status of "Pending." The fourth displayed screen may be shown in the receiver interface 320.

Figure 23:
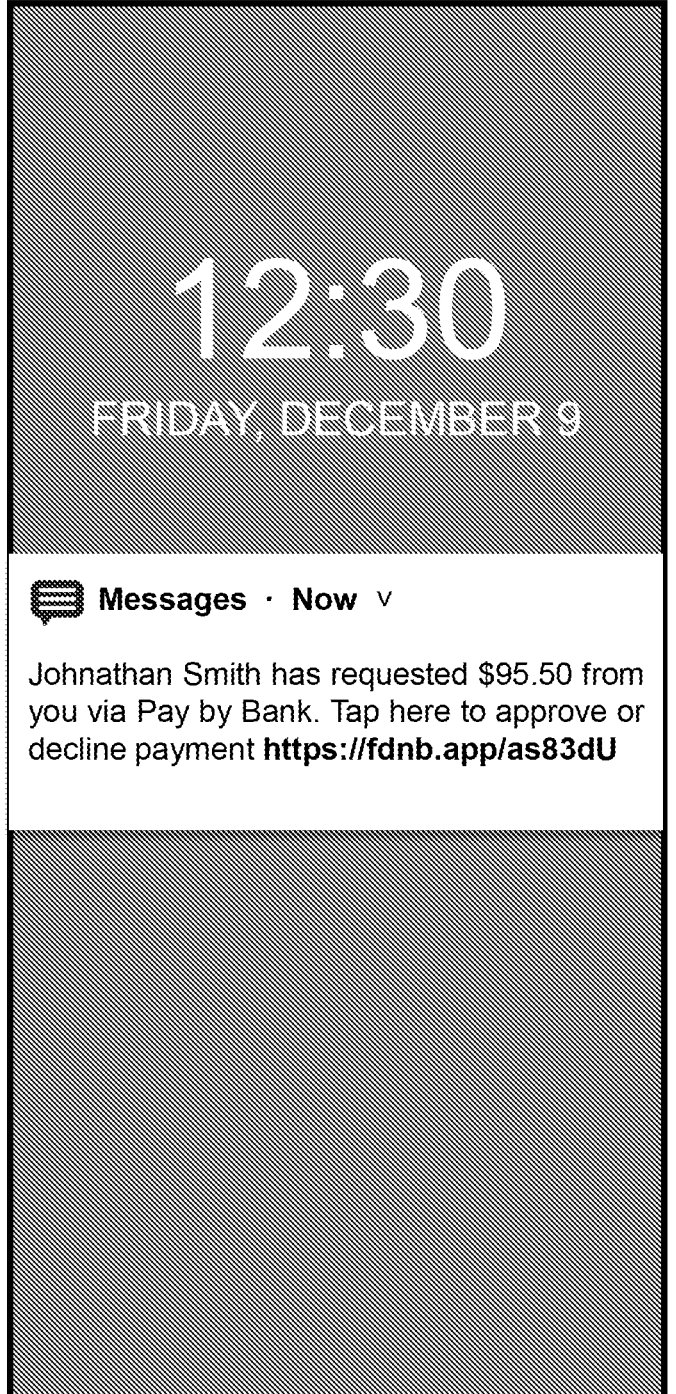
FIG. 23 is an illustration of an interface on a computing device interacting in a payee-initiated P2P transaction process in an A2A transaction network, according to principles of the present disclosure.

With specific reference to FIG. 23, depicted is an illustration of a first displayed screen on a client device 302 of the payer (referred to in connection with FIGS. 23-25 as the exemplary "Alice Jenkins"), in a post-request-transmission step of a payee-initiated P2P transaction process. For example, the payer's client device 302 may receive a push notification associated with a message of a requested payment from the payee. By way of example, the payer's home screen may display a notification window containing transaction data, including, but not limited to, transaction amount, payee (user) name, transaction method, transaction time, contact information, hyperlink, and/or the like. For illustration, the payer may click on the notification window and unlock their client device 302 to access a second displayed screen in a payment interface 304 on the client device 302, as shown in FIG. 24.

Figure 24:
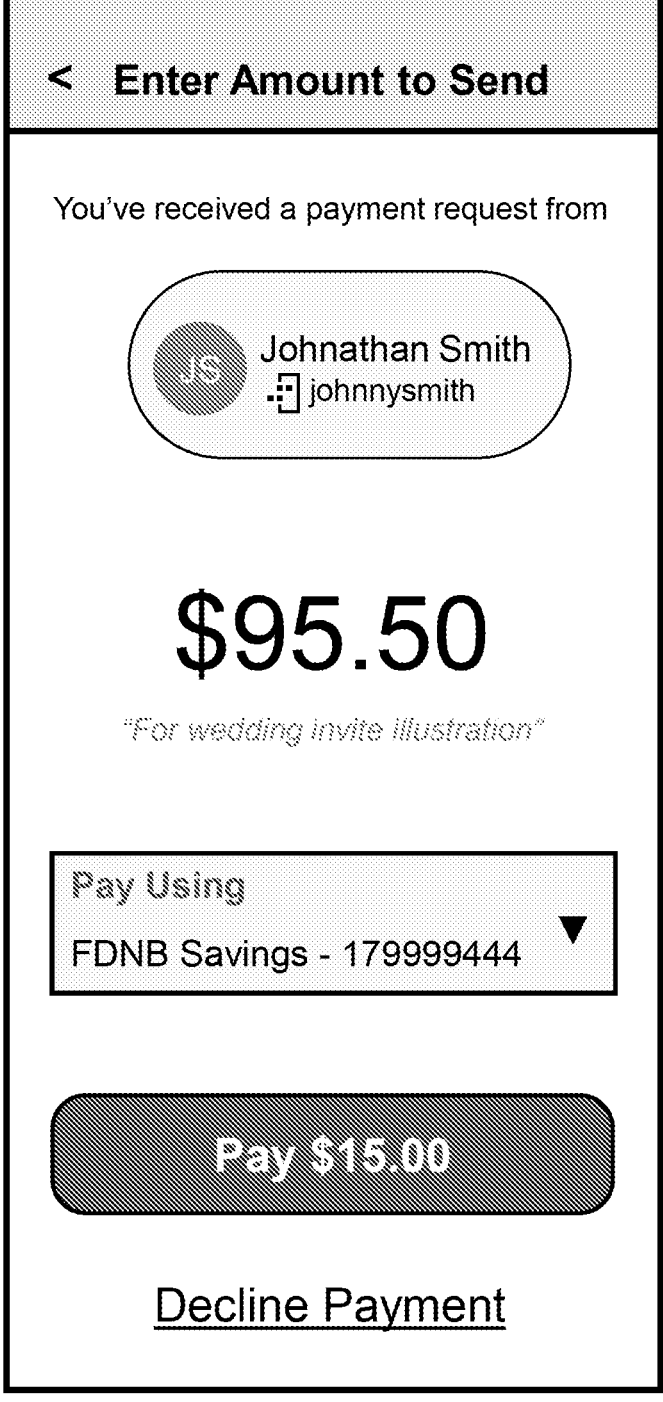
FIG. 24 is an illustration of an interface on a computing device interacting in a payee-initiated P2P transaction process in an A2A transaction network, according to principles of the present disclosure.

With specific reference to FIG. 24, depicted is an illustration of a second displayed screen in a payment interface 304 on a client device 302 of the payer, in a step of a payee-initiated P2P transaction process. As shown, the payer is notified that a payment request has been received from the payee "Johnathan Smith", and the transaction amount requested is displayed in the center of the screen (e.g., shown as "$95.50"). If the payer desires to complete the transaction, the payer may select a funding account for making the payment (e.g., shown as a dropdown field titled "Pay using", where the user has selected a "FDNB Savings" account). The payer may also modify the amount to send. Funding account details may be previously entered by the payer in a separate screen, such that the funding account option is already available, or the payer may enter the funding account details in the depicted screen. For illustration, the payer may touch the button titled "Pay $95.50" to cause the payment transaction to "Johnathan Smith" to be executed, which may trigger the displayed screen in the payment interface 304 to update to a third displayed screen shown in FIG. 25. Alternatively, the payer may decline to make the payment by inputting accordingly, such as by selecting "Decline Payment."

Figure 25:
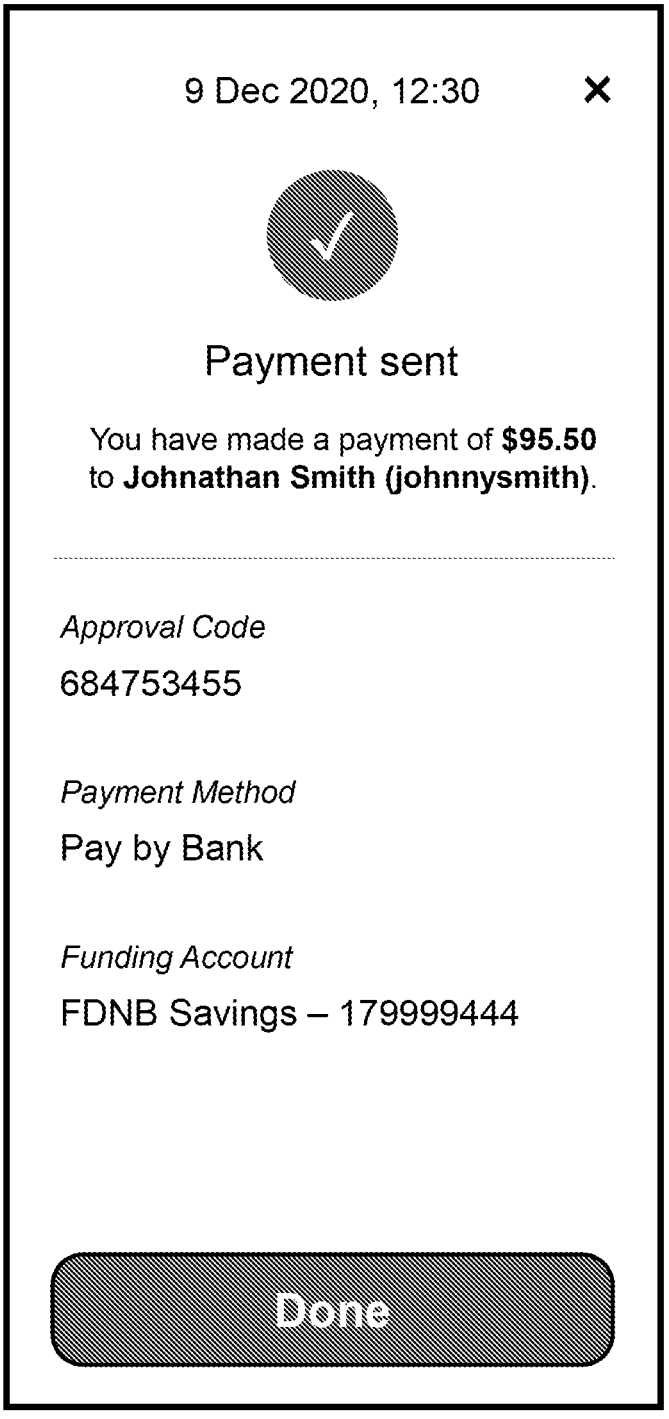
FIG. 25 is an illustration of an interface on a computing device interacting in a payee-initiated P2P transaction process in an A2A transaction network, according to principles of the present disclosure.

With specific reference to FIG. 25, depicted is an illustration of a fourth displayed screen in a payment interface 304 on a client device 302 of the payer, in a post-payment step of a payee-initiated P2P transaction process. For example, the payer may be presented with a confirmation message indicating that the payment was sent to the payee, including additional transaction data, such as the transaction time, transaction amount, confirmation (approval) code, payment method, funding account, transaction details (e.g., "note"), and/or the like. For illustration, when the payer is done reviewing the transaction data of the completed payment to the payee, the payer may close the active window shown in the payment interface 304 by clicking the "Done" button or selecting the "X" icon. It will be appreciated that should the payment processing steps that are not shown take some time (e.g., several seconds), the payer may be presented with a "Processing payment" screen, as shown in FIG. 15, before being presented with the fourth displayed screen, as shown in FIG. 25.

Referring now to FIGS. 26-31, depicted are a series of illustrations of interfaces displayed on computing devices that are interacting in a P2M transaction process of an A2A transaction network, according to non-limiting embodiments or aspects. It will be appreciated that the illustrations are provided for exemplary purposes only and are not to be taken as limiting on the disclosure. It will also be appreciated that the interfaces represent user-facing screens and do not represent all possible steps that are not visible to the users of the system.

Figure 26:
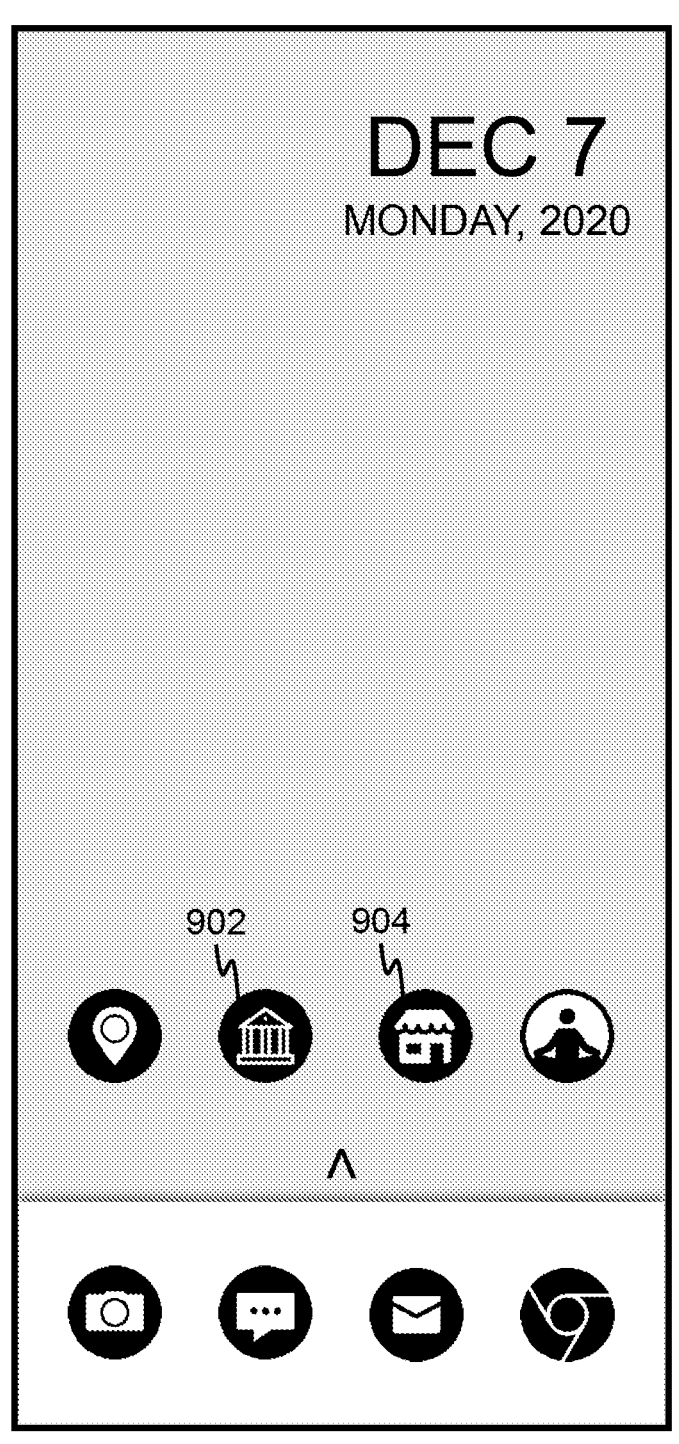
FIG. 26 is an illustration of an interface on a computing device interacting in a P2M transaction process in an A2A transaction network, according to principles of the present disclosure.

With specific reference to FIG. 26, depicted is an illustration of a first displayed screen on a client device 302 of a user, in a first step of a P2M transaction process. For example, the user (referred to in connection with FIGS. 26-31 as the exemplary "Johnathan Smith") may be presented with a starting screen of the client device 302, which may include a first icon 902 of a payment interface 304 application and a second icon 904 of a merchant interface 306 application, among other icons. The payment interface 304 application and the merchant interface 306 application may execute at least some software locally on the client device 302, and both applications may access data stored remotely from the client device 302. For illustration, when the user selects the second icon 904 of the merchant interface 306 application, the client device 302 may launch an online merchant store application that is accessed through the client device 302. Alternatively, the merchant interface 306 may be accessible through an internet-enabled browser of the client device 302.

Figure 27:
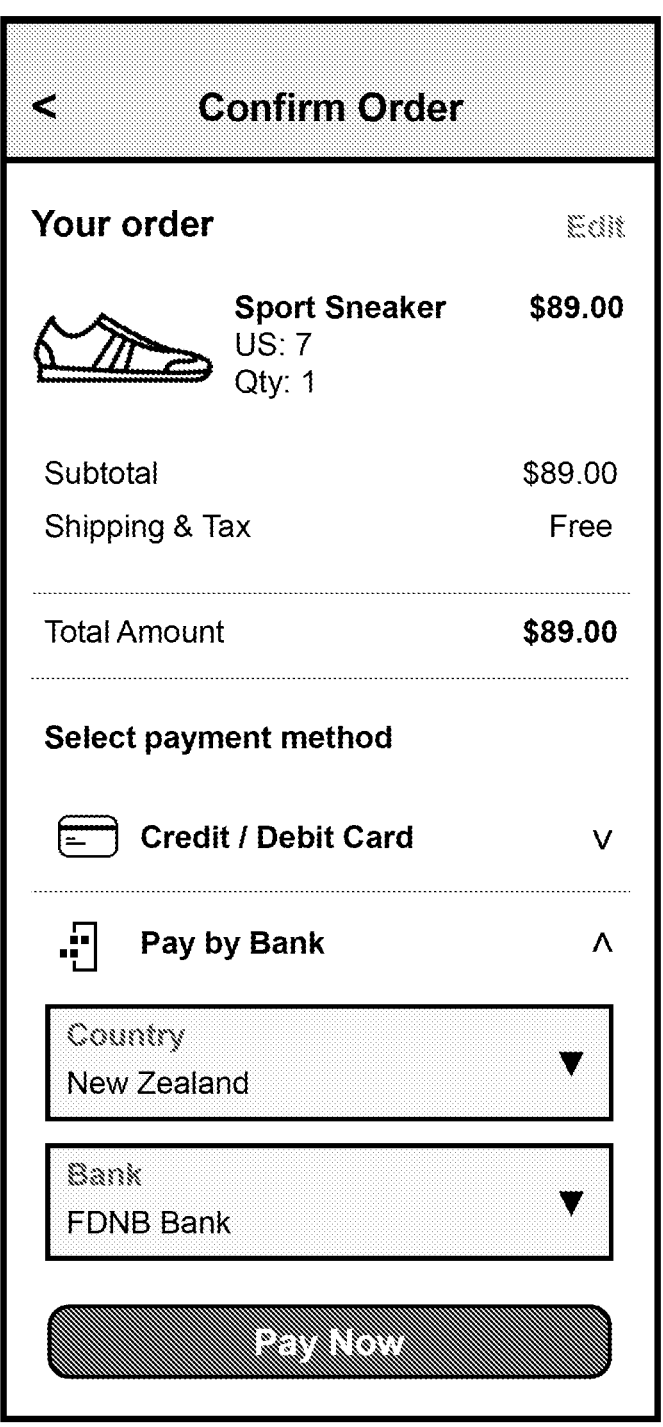
FIG. 27 is an illustration of an interface on a computing device interacting in a P2M transaction process in an A2A transaction network, according to principles of the present disclosure.

With specific reference to FIG. 27, depicted is an illustration of a second displayed screen in a merchant interface 306 on a client device 302 of the user, in a second step of a P2M transaction process. As shown, the user has selected an item for purchase from the merchant, and the user desires to complete a payment transaction to the merchant to receive shipment of the item. The user is presented with initial transaction data, such as the transaction description, transaction amount, optional payment methods, and/or the like. The user may select, among the possible payment methods, the option to complete payment using the described A2A transaction network (e.g., shown as "Pay by Bank"). Using the "Pay by Bank" option, the user may input information to identify their issuer institution associated with an account of the user. By way of example, the user has identified their issuer institution by first selecting the country of "New Zealand" from a corresponding dropdown, which updated a "Bank" dropdown, from which the user could select their issuer (e.g., "FDNB Bank"). It will be appreciated, however, that other methods of identifying the user's issuer may be used, such as a search-and-refine dropdown field, a geolocation-filtering dropdown field, a list, a text entry, and/or the like. For illustration, the user has input information identifying their issuer and may choose the "Pay Now" button to advance to a third displayed screen on the client device 302 of the user.

Figure 28:
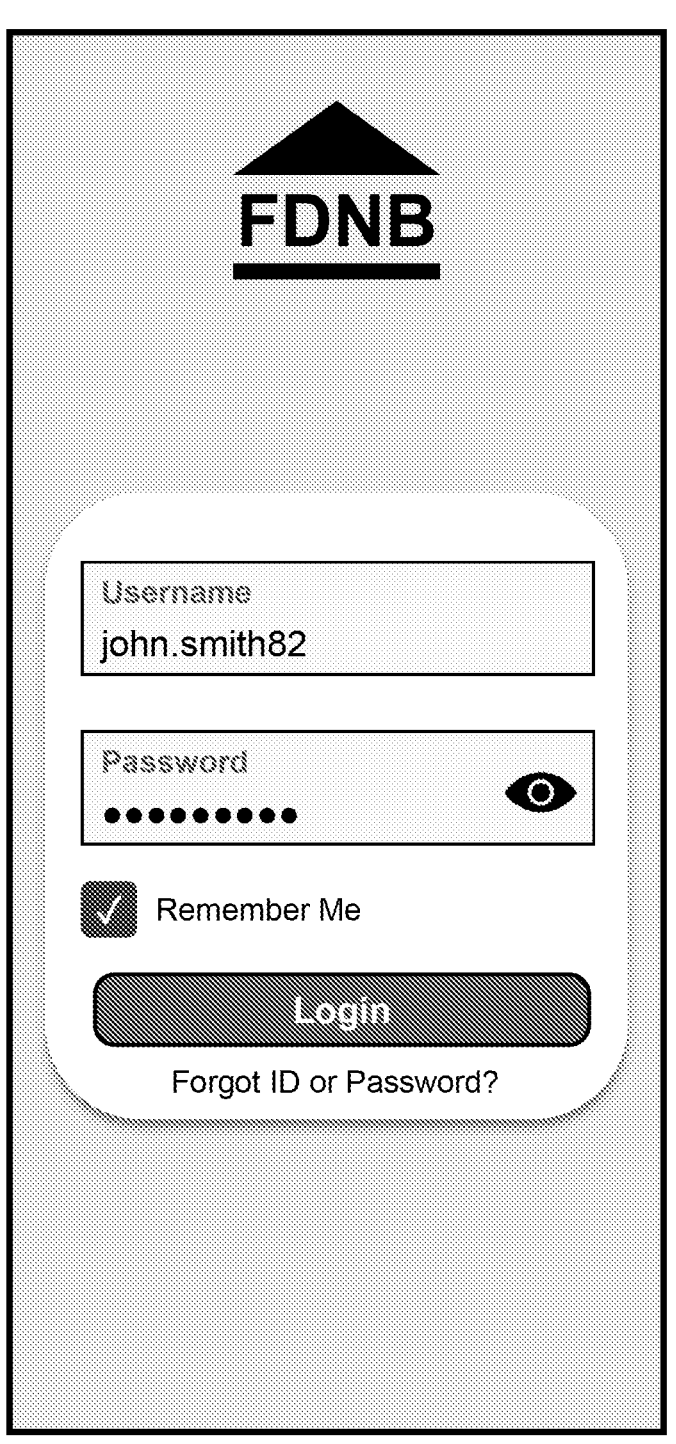
FIG. 28 is an illustration of an interface on a computing device interacting in a P2M transaction process in an A2A transaction network, according to principles of the present disclosure.

With specific reference to FIG. 28, depicted is an illustration of a third displayed screen in a payment interface 304 on a client device 302 of the user, in a third step of a P2M transaction process. As shown, the user's selection of the "Pay Now" button has caused the client device 302 to redirect the user from the merchant interface 306 to the payment interface 304. By way of example, the user may be presented with a login screen of a payment interface 304 application on the client device 302, so that the user may enter user credentials that may be used to authenticate the user (and thereby, the transaction). It will be appreciated that the payment interface 304 may also be presented in an internet-enabled browser of the client device 302. For illustration, the user has input their user credentials to the login window (e.g., username "john.smith82" and a password), and the user may select the "Login" button to transmit the user credentials to the issuer system 314 so that the user may be authenticated. Upon submission of the user credentials, the client device 302 may update to a fourth displayed screen, as shown in FIG. 29.

Figure 29:
FIG. 29 is an illustration of an interface on a computing device interacting in a P2M transaction process in an A2A transaction network, according to principles of the present disclosure.
Figure 30:
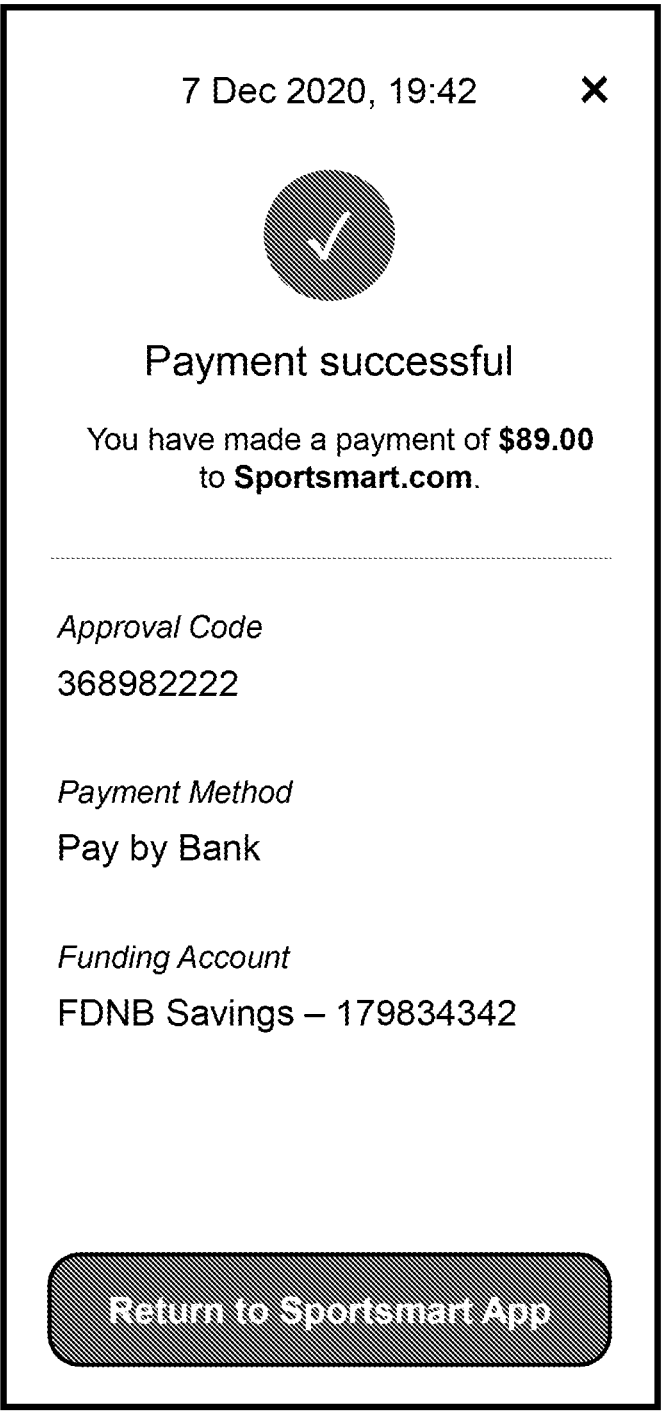
FIG. 30 is an illustration of an interface on a computing device interacting in a P2M transaction process in an A2A transaction network, according to principles of the present disclosure.

With specific reference to FIG. 29, depicted is an illustration of a fourth displayed screen in a payment interface 304 on a client device 302 of the user, in a fourth step of a P2M transaction process. As shown, after the user has logged in and the issuer system 314 has authenticated the user, the user may be presented with the option to review the transaction data of the transaction with the merchant and confirm the transaction. The transaction data shown to the user may include, but is not limited to, transaction amount, merchant name, merchant identifier, transaction method, and/or the like. The user may also input a funding account by which to complete the payment of the transaction to the merchant (e.g., shown as a selection of a "FDNB Savings" account). Funding account details may be previously entered by the user in a separate screen, such that the funding account option is already available, or the user may enter the funding account details in the depicted screen. When the user has reviewed and verified the transaction data, and has additionally confirmed the funding account for payment to the merchant, the user may complete the payment transaction by selecting an option in the payment interface 304 (e.g., the "Pay $89.00" button). For illustration, the user desires to complete the transaction, presses the "Pay $89.00" button, and may be redirected to a fifth displayed screen in a payment interface 304 on a client device 302, as shown in FIG. 30. It will also be appreciated that, should the transaction processing steps that are conducted separately from the client device 302 take some time (e.g., several seconds) to complete, the user may be presented with an intermediary "Processing payment" screen, such as shown in FIG. 15, before being presented with the fifth displayed screen as shown in FIG. 30.

With specific reference to FIG. 30, depicted is an illustration of a fifth displayed screen in a payment interface 304 on a client device 302 of the user, in a post-payment step of a P2M transaction process. For example, the user may be presented with a confirmation message indicating that the payment was sent to the merchant, including additional transaction data, such as the transaction time, transaction amount, confirmation (approval) code, payment method, funding account, transaction details, merchant name, merchant identifier, and/or the like. For illustration, when the user is done reviewing the transaction data of the completed payment to the merchant, the user may close the active window shown in the payment interface 304 by clicking the "Done" button or selecting the "X" icon. Closing the fifth displayed screen may also automatically redirect the user to a sixth displayed screen in the merchant interface 306 of the client device 302, as shown in FIG. 31.

Figure 31:
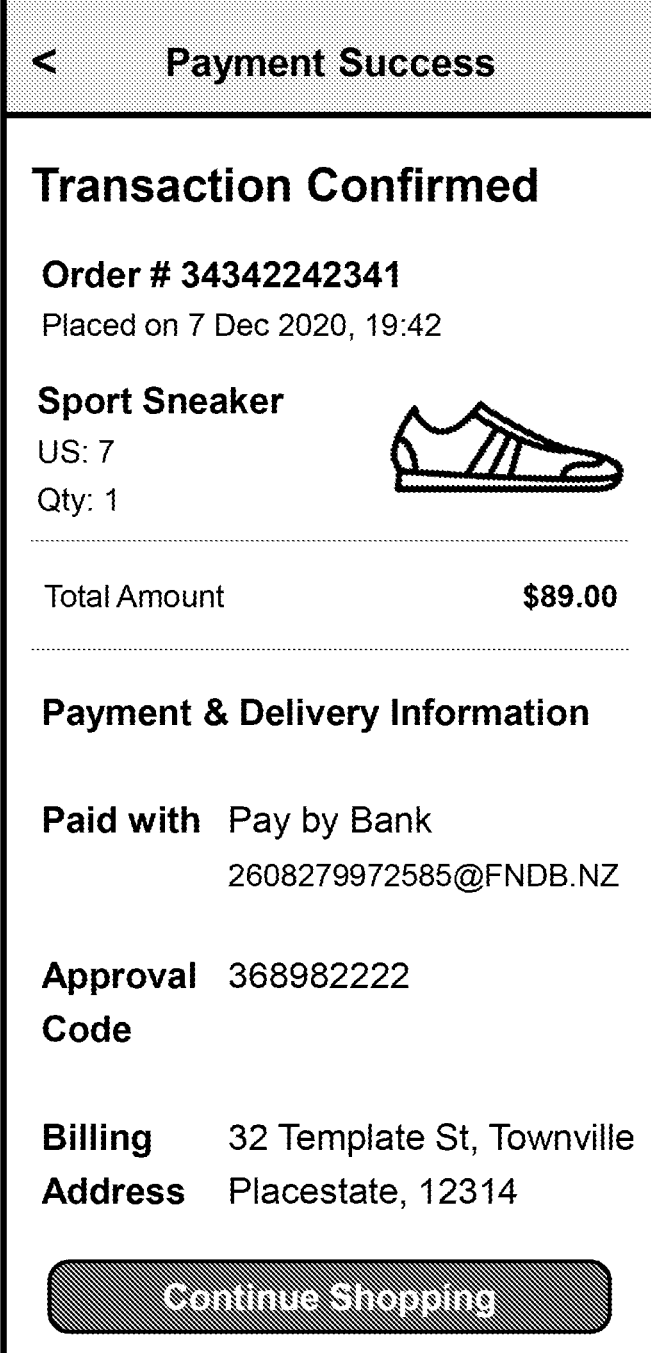
FIG. 31 is an illustration of an interface on a computing device interacting in a P2M transaction process in an A2A transaction network, according to principles of the present disclosure.

With specific reference to FIG. 31, depicted is an illustration of a sixth displayed screen in a merchant interface 306 on the client device 302 of the user, in a post-payment step of a P2M transaction process. After the payment is completed, transaction data of the processed payment may be pushed to the merchant interface 306 as well. As shown, the merchant interface 306 may reflect that the transaction was completed (e.g., "Transaction Confirmed") and may include additional information relevant to the payment transaction, including, but not limited to, order number, transaction time, transaction description, transaction amount, transaction method, confirmation (approval) code, billing address, merchant identifier, payer identifier, and/or the like. After being presented with a confirmation message in the merchant interface 306, the user may continue shopping in the merchant interface 306 (e.g., by selecting the "Continue Shopping" button) or may exit the merchant interface 306. It will be appreciated that similar screens of the illustrated interfaces of FIGS. 26-31 may be presented for other procedural flows of P2M transaction processes as described herein.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:

receiving, with at least one processor, from a payment gateway or an acquirer system via a first application programming interface (API), a transaction request for a transaction, the transaction request comprising a transaction amount, an issuer identifier, and a merchant identifier, wherein the transaction request is originated via a merchant interface accessed on a client device of a user associated with an issuer account, and wherein neither the issuer identifier nor the merchant identifier comprises an identifier of a transaction account;

determining, with the at least one processor, an issuer uniform resource locator (URL) based on the issuer identifier;

generating, with the at least one processor, an intent identifier associated with the transaction request;

causing, with the at least one processor, the client device to access a payment interface separate from the merchant interface by transmitting, via the first API, the issuer URL and the intent identifier to the client device via the payment gateway or the acquirer system;

transmitting, with the at least one processor, the intent identifier, the transaction amount, and the merchant identifier to an issuer system associated with the issuer identifier via a second API;

receiving, with the at least one processor, from the issuer system via the second API, an authenticated consent identifier and a payer identifier, wherein the authenticated consent identifier is originated via the payment interface, and wherein the payer identifier does not comprise an identifier of a transaction account; and in response to receiving the authenticated consent identifier from the issuer system:

determining, with the at least one processor, a merchant account identifier associated with the merchant identifier and an issuer account identifier associated with the payer identifier; and transmitting, with the at least one processor, the transaction amount, the merchant account identifier, and the issuer account identifier in a combined authorization and settlement message configured to cause settlement for the transaction amount between a merchant account associated with the merchant account identifier and the issuer account associated with the issuer account identifier.

2. The computer-implemented method of claim 1, wherein the issuer URL is transmitted to the payment gateway or the acquirer system and is forwarded to the merchant interface to trigger the payment interface.

3. The computer-implemented method of claim 2, further comprising:

receiving, with the at least one processor, an approval message associated with approval of the combined authorization and settlement message;

transmitting, with the at least one processor, a first success message to the payment gateway or the acquirer system via the first API, the first success message configured to cause the merchant interface of the client device to display a confirmation of completion of the transaction; and transmitting, with the at least one processor, a second success message to the issuer system via the second API, the second success message configured to cause the payment interface of the client device to display confirmation of completion of the transaction.

4. The computer-implemented method of claim 2, wherein the payer identifier comprises a unique account identifier, an institution identifier associated with the issuer system, and a regional identifier, the payer identifier further being a globally unique identifier.

5. The computer-implemented method of claim 4, wherein the unique account identifier is a device address of the client device.

6. The computer-implemented method of claim 1, wherein the transaction request is received from the payment gateway via the first API, the issuer URL and the intent identifier are transmitted to the payment gateway via the first API, and the payment gateway is configured to communicate on behalf of the acquirer system for completion of the transaction.

7. The computer-implemented method of claim 1, further comprising:

settling, with the at least one processor, the transaction as a credit to the merchant account for the transaction amount and a debit from the issuer account for the transaction amount, by communicating with the issuer system and the payment gateway, or with the issuer system and the acquirer system; and transmitting, with the at least one processor, a first settlement report associated with the transaction to the payment gateway or the acquirer system, and a second settlement report associated with the transaction to the issuer system.

8. A system comprising a server comprising at least one processor, the server being programmed or configured to:

receive, from a payment gateway or an acquirer system via a first application programming interface (API), a transaction request for a transaction, the transaction request comprising a transaction amount, an issuer identifier, and a merchant identifier, wherein the transaction request is originated via a merchant interface accessed on a client device of a user associated with an issuer account, and wherein neither the issuer identifier nor the merchant identifier comprises an identifier of a transaction account;

determine an issuer uniform resource locator (URL) based on the issuer identifier;

generate an intent identifier associated with the transaction request;

cause the client device to access a payment interface separate from the merchant interface by transmitting, via the first API, the issuer URL and the intent identifier to the client device via the payment gateway or the acquirer system;

transmit the intent identifier, the transaction amount, and the merchant identifier to an issuer system associated with the issuer identifier via a second API;

receive, from the issuer system via the second API, an authenticated consent identifier and a payer identifier; and in response to receiving the authenticated consent identifier from the issuer system:

determine a merchant account identifier associated with the merchant identifier and an issuer account identifier associated with the payer identifier, wherein the authenticated consent identifier is originated via the payment interface, and wherein the payer identifier does not comprise an identifier of a transaction account; and transmit the transaction amount, the merchant account identifier, and the issuer account identifier in a combined authorization and settlement message configured to cause settlement for the transaction amount between a merchant account associated with the merchant account identifier and the issuer account associated with the issuer account identifier.

9. The system of claim 8, wherein the issuer URL is transmitted to the payment gateway or the acquirer system and is forwarded to the merchant interface to trigger the payment interface.

10. The system of claim 9, wherein the server is further programmed or configured to:

receive an approval message associated with approval of the combined authorization and settlement message;

transmit a first success message to the payment gateway or the acquirer system via the first API, the first success message configured to cause the merchant interface of the client device to display a confirmation of completion of the transaction; and transmit a second success message to the issuer system via the second API, the second success message configured to cause the payment interface of the client device to display confirmation of completion of the transaction.

11. The system of claim 9, wherein the payer identifier comprises a unique account identifier, an institution identifier associated with the issuer system, and a regional identifier, the payer identifier further being a globally unique identifier.

12. The system of claim 11, wherein the unique account identifier is a device address of the client device.

13. The system of claim 8, wherein the transaction request is received from the payment gateway via the first API, the issuer URL and the intent identifier are transmitted to the payment gateway via the first API, and the payment gateway is configured to communicate on behalf of the acquirer system for completion of the transaction.

14. The system of claim 8, wherein the server is further programmed or configured to:

settle the transaction as a credit to the merchant account for the transaction amount and a debit from the issuer account for the transaction amount, by communicating with the issuer system and the payment gateway, or with the issuer system and the acquirer system; and transmit a first settlement report associated with the transaction to the payment gateway or the acquirer system, and a second settlement report associated with the transaction to the issuer system.

15. A computer program product comprising at least one non-transitory computer-readable medium including program instructions that, when executed by at least one processor, cause the at least one processor to:

receive, from a payment gateway or an acquirer system via a first application programming interface (API), a transaction request for a transaction, the transaction request comprising a transaction amount, an issuer identifier, and a merchant identifier, wherein the transaction request is originated via a merchant interface accessed on a client device of a user associated with an issuer account, and wherein neither the issuer identifier nor the merchant identifier comprises an identifier of a transaction account;

determine an issuer uniform resource locator (URL) based on the issuer identifier;

generate an intent identifier associated with the transaction request;

cause the client device to access a payment interface separate from the merchant interface by transmitting, via the first API, the issuer URL and the intent identifier to the client device via the payment gateway or the acquirer system;

transmit the intent identifier, the transaction amount, and the merchant identifier to an issuer system associated with the issuer identifier via a second API;

receive, from the issuer system via the second API, an authenticated consent identifier and a payer identifier; and in response to receiving the authenticated consent identifier from the issuer system:

determine a merchant account identifier associated with the merchant identifier and an issuer account identifier associated with the payer identifier, wherein the authenticated consent identifier is originated via the payment interface, and wherein the payer identifier does not comprise an identifier of a transaction account; and transmit the transaction amount, the merchant account identifier, and the issuer account identifier in a combined authorization and settlement message configured to cause settlement for the transaction amount between a merchant account associated with the merchant account identifier and the issuer account associated with the issuer account identifier.

16. The computer program product of claim 15, wherein the issuer URL is transmitted to the payment gateway or the acquirer system and is forwarded to the merchant interface to trigger the payment interface.

17. The computer program product of claim 16, wherein the program instructions further cause the at least one processor to:

receive an approval message associated with approval of the combined authorization and settlement message;

transmit a first success message to the payment gateway or the acquirer system via the first API, the first success message configured to cause the merchant interface of the client device to display a confirmation of completion of the transaction; and transmit a second success message to the issuer system via the second API, the second success message configured to cause the payment interface of the client device to display confirmation of completion of the transaction.

18. The computer program product of claim 16, wherein the payer identifier comprises a unique account identifier, an institution identifier associated with the issuer system, and a regional identifier, the payer identifier further being a globally unique identifier, and wherein the unique account identifier is a device address of the client device.

19. The computer program product of claim 16, wherein the transaction request is received from the payment gateway via the first API, the issuer URL and the intent identifier are transmitted to the payment gateway via the first API, and the payment gateway is configured to communicate on behalf of the acquirer system for completion of the transaction.

20. The computer program product of claim 15, wherein the program instructions further cause the at least one processor to:

settle the transaction as a credit to the merchant account for the transaction amount and a debit from the issuer account for the transaction amount, by communicating with the issuer system and the payment gateway, or with the issuer system and the acquirer system; and transmit a first settlement report associated with the transaction to the payment gateway or the acquirer system, and a second settlement report associated with the transaction to the issuer system.

* * * * *